US011850786B2

United States Patent
Shinozaki et al.

(10) Patent No.: US 11,850,786 B2
(45) Date of Patent: Dec. 26, 2023

(54) DIE PLATE, RESIN MACHINE, AND METHOD OF HEATING NOZZLES OF DIE PLATE

(71) Applicant: KOBE STEEL, LTD., Hyogo (JP)

(72) Inventors: Takahiro Shinozaki, Kobe (JP); Shin Iwasaki, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 17/387,945

(22) Filed: Jul. 28, 2021

(65) Prior Publication Data
US 2022/0048235 A1    Feb. 17, 2022

(30) Foreign Application Priority Data

Aug. 11, 2020   (JP) ................................ 2020-135999
Dec. 25, 2020   (JP) ................................ 2020-217132

(51) Int. Cl.
*B29C 48/345*   (2019.01)
*B29C 48/86*    (2019.01)
(Continued)

(52) U.S. Cl.
CPC .............. *B29C 48/345* (2019.02); *B29B 9/10* (2013.01); *B29C 48/3003* (2019.02); *B29C 48/865* (2019.02); *B29B 9/06* (2013.01)

(58) Field of Classification Search
CPC ..... B29C 48/0022; B29C 48/04; B29C 48/05; B29C 48/345; B29B 9/06; B29B 9/065
See application file for complete search history.

(56) References Cited

U.S. PATENT DOCUMENTS 3,287,764 A * 11/1966 Swickard, Jr. .......... B29B 9/065
                                                      425/379.1
3,452,394 A *  7/1969 McNeal, Jr. ............ B29C 48/06
                                                      425/197
(Continued)

FOREIGN PATENT DOCUMENTS

GB    2 060 474 A      5/1981
JP    S49-54465 A      5/1974
(Continued)

OTHER PUBLICATIONS

Kajiyama et al., Dice for Manufacturing Resin Pellet and Method for Controlling Its Temperature, ( 2009), English Translation (Year: 2009).*

(Continued)

*Primary Examiner* — Seyed Masoud Malekzadeh
(74) *Attorney, Agent, or Firm* — Studebaker & Brackett PC

(57) ABSTRACT

There is provided a die plate, a resin machine, and a method of heating nozzles of the die plate that can suppress temperature unevenness of the nozzles and increase the temperature rise performance of the nozzles. The die plate includes a nozzle group including a plurality of nozzles through which molten resin passes, and a heating medium guidance part that guides a heating medium for heating a nozzle wall of each nozzle. The heating medium guidance part includes an inlet that receives the heating medium, an outlet that discharges the heating medium from a heating medium channel, and a guidance wall that defines a heating channel that causes the inlet and the outlet to be in communication with each other together with an outer peripheral surface of the nozzle wall of each of the plurality of nozzles.

16 Claims, 33 Drawing Sheets

(51) Int. Cl.
  *B29C 48/30* (2019.01)
  *B29B 9/10* (2006.01)
  *B29B 9/06* (2006.01)

(56) References Cited

U.S. PATENT DOCUMENTS

| | | | | |
|---|---|---|---|---|
| 3,599,286 A * | 8/1971 | Karet | ................... | B29B 7/582 228/159 |
| 3,749,539 A | 7/1973 | Galbreath et al. | | |
| 3,857,665 A * | 12/1974 | Kennedy | ................ | B29B 9/065 425/464 |
| 4,187,067 A * | 2/1980 | Mizuno | .................. | B29B 7/826 425/464 |
| 4,378,964 A * | 4/1983 | Wolfe, Jr. | ............... | B29C 48/05 264/142 |
| 4,752,196 A * | 6/1988 | Wolfe, Jr. | ............. | B29B 48/919 264/142 |
| 4,856,974 A * | 8/1989 | Wolfe, Jr. | ............... | B29B 7/582 425/313 |
| 9,481,121 B2 * | 11/2016 | Robertson | ............ | B29C 48/345 |
| 2001/0005516 A1 * | 6/2001 | Yoshii | ................... | B29B 7/826 425/6 |
| 2005/0221102 A1 * | 10/2005 | Tatsuda | ................ | B23K 1/0008 425/313 |
| 2010/0129479 A1 * | 5/2010 | Banerjee | ................. | B29C 48/87 427/135 |
| 2012/0321737 A1 * | 12/2012 | Makida | .................. | B29B 7/582 425/378.1 |
| 2015/0132424 A1 * | 5/2015 | Robertson | ............... | B29C 48/05 29/525.01 |
| 2018/0002832 A1 * | 1/2018 | Brown | ................... | D01D 4/025 |

FOREIGN PATENT DOCUMENTS

| | | | |
|---|---|---|---|
| JP | H11-277528 A | | 10/1999 |
| JP | 2003-220606 A | | 8/2003 |
| JP | 2009292043 A | * | 12/2009 |
| JP | 2013-111891 A | | 6/2013 |

OTHER PUBLICATIONS

The extended European search report issued by the European Patent Office dated Jan. 18, 2022, which corresponds to European Patent Application No. 21187105.8-1014 and is related to U.S. Appl. No. 17/387,945.

* cited by examiner

DIE PLATE, RESIN MACHINE, AND METHOD OF HEATING NOZZLES OF DIE PLATE

This application is based on Japanese Patent Application No. 2020-135999 filed with the Japan Patent Office on Aug. 11, 2020 and Japanese Patent Application No. 2020-217132 filed with the Japan Patent Office on Dec. 25, 2020, the contents of which are incorporated by reference.

BACKGROUND

The present disclosure relates to a die plate, a resin machine, and a method of heating nozzles of the die plate.

Conventionally, as a resin pellet granulation device, devices including a die plate and a cutter device are known (see, for example, Japanese Patent Application Laid-Open No. 2013-111891). The die plate includes a large number of nozzles installed on the downstream side of an extruder to discharge molten resin. The cutter device cuts the resin extruded from the nozzles into pellets. The surface of the die plate from which the resin is discharged is exposed to circulating water for transporting the cut pellets. Therefore, in order to prevent the resin from sticking to the nozzles, a heating channel is provided inside the die plate to allow a heating medium such as steam or heat medium oil for heating the nozzles to pass through.

Japanese Patent Application Laid-Open No. 2013-111891 discloses a disc-shaped die plate in which a large number of nozzles are formed. This die plate is divided into four regions every 90 degrees in a circumferential direction thereof, one of which is shown under magnification. The die plate includes an inside ring-shaped heating passage formed in the radially inner portion, an outside ring-shaped heating passage formed in the radially outer portion, and a plurality of nozzle groups each including a large number of nozzles arranged between the inside ring-shaped heating passage and the outside ring-shaped heating passage.

One nozzle group is arranged in each of the four regions of the die plate. Each nozzle group has a plurality of nozzle heating regions. The plurality of nozzle heating regions is partitioned by a plurality of heat channels extending in a certain direction (crossing direction) crossing the circumferential direction, and the inside ring-shaped heating passage and the outside ring-shaped heating passage each extending in the circumferential direction. In each nozzle heating region, a plurality of nozzles is arranged in three rows in the above-described crossing direction.

In addition, a heating medium entrance is formed in the outside ring-shaped heating passage, and a heating medium exit is formed in the inside ring-shaped heating passage. A heating medium such as steam and heating medium oil heated to a predetermined temperature is supplied to each heating passage through the heating medium entrance. The heating medium is discharged from the heating medium exit through the outside ring-shaped heating passage, each heat channel, and the inside ring-shaped heating passage, and returns to a heating device (not shown). Then, the heating medium heated to the predetermined temperature again by the heating device is returned to the heating medium entrance. In this way, the heating medium circulates in the above-described each channel.

The die plate disclosed in Japanese Patent Application Laid-Open No. 2013-111891 has a problem that temperature unevenness is likely to occur between the plurality of nozzles and quality of manufactured resin members also varies. Specifically, in each nozzle heating region, nozzle holes of a plurality of nozzles are formed in three rows at different positions in the circumferential direction. Therefore, when the heating medium F flows through the plurality of heat channels, a difference arises in the amount of heat input to the nozzles between the rows near the heat channel (rows at both ends) and the row far from the heat channel (row in the center), and temperature unevenness is likely to occur in each nozzle heating region. If resin sticks to the vicinity of a discharge part of the nozzle at a relatively low temperature, the shape of resin pellets cut by the cutter device is likely to vary.

SUMMARY

An object of the present disclosure is to provide a die plate, a resin machine, and a method of heating nozzles of the die plate capable of suppressing temperature unevenness among a plurality of nozzles.

Based on the problem of the conventional die plate as described above, as a result of diligent studies on reducing the difference in distance from the heating channels between a plurality of nozzles (heat channels), instead of opening a plurality of nozzle holes in a region surrounded by a plurality of heating channels as in the past, the inventor of the present disclosure has come up with a new idea of providing a plurality of nozzle walls surrounding resin channels of a plurality of nozzles and bringing the heating medium into contact with an outer peripheral surface of each nozzle wall.

The die plate provided according to the present disclosure based on the new idea as described above includes a nozzle group and at least one heating medium guidance part. The nozzle group includes a plurality of nozzles that each discharges molten resin in an axial direction. The plurality of nozzles includes a plurality of nozzle walls and a plurality of discharge parts. The plurality of nozzle walls each extends in the axial direction and includes an inner peripheral surface surrounding a resin channel that allows the molten resin to flow, and an outer peripheral surface arranged on an opposite side of the inner peripheral surface and along the inner peripheral surface. The plurality of discharge parts is arranged at tips of the plurality of nozzle walls in the axial direction and each discharges the molten resin. The at least one heating medium guidance part receives a heating medium and brings the heating medium into contact with the outer peripheral surface to heat the plurality of nozzles from outside. The at least one heating medium guidance part includes at least one reception port that receives the heating medium, at least one discharge port that discharges the heating medium, and at least one guidance wall. The guidance wall defines a heating channel through which the heating medium flows together with the outer peripheral surface of each of the plurality of nozzle walls. The guidance wall guides the heating medium to cause the heating medium flowing in from the at least one reception port to come into contact with the outer peripheral surface of each of the plurality of nozzle walls in a flow direction crossing the axial direction, and then to be discharged from the at least one discharge port.

The present disclosure also provides a resin machine. The resin machine includes: the die plate described above; a resin supply unit that supplies molten resin to the resin channel of the plurality of nozzles of the die plate; a medium supply unit that supplies the heating medium to the at least one heating medium guidance part of the die plate; and a processing unit that processes the molten resin discharged from the plurality of discharge parts.

The present disclosure also provides a method of heating nozzles of a die plate. The method of heating nozzles includes: preparing the die plate including: a plurality of nozzles including: a plurality of nozzle walls each extending in an axial direction and including an inner peripheral surface defining a resin channel that allows molten resin to flow, and an outer peripheral surface arranged on an opposite side of the inner peripheral surface and along the inner peripheral surface; and a plurality of discharge parts arranged at tips of the plurality of nozzle walls in the axial direction and each discharging the molten resin; and a guidance wall that defines a heating channel through which a heating medium flows together with at least the outer peripheral surface of each of the plurality of nozzle walls; and causing the heating medium to flow into an entrance of the heating channel, bringing the heating medium into contact with the outer peripheral surface of each of the plurality of nozzle walls along the guidance wall to heat the plurality of nozzles, and then discharging the heating medium from an exit of the heating channel.

DETAILED DESCRIPTION

Each embodiment of the present disclosure and modifications thereof will be described in detail below with reference to the drawings. A die plate according to each embodiment of the present disclosure is used for a resin pellet granulation device. The die plate includes a large number of nozzles through which molten resin is extruded and passes, and at least one heating medium channel through which a heating medium for heating nozzle walls forming the nozzles flows. A cutter device (not shown) is disposed on a nozzle surface of the resin injection side of the die plate, and the resin extruded from the nozzle is cut by the cutter to form resin pellets. The resin is cut in water.

The heating medium heated by a heating device (not shown) is sent to the heating medium channel. As the heating medium, a fluid such as hot oil or steam is used. After flowing through the heating medium channel and performing heat exchange with the nozzle wall, the heating medium is discharged from the heating medium channel <Configuration of Die Plate>

Figure 1:
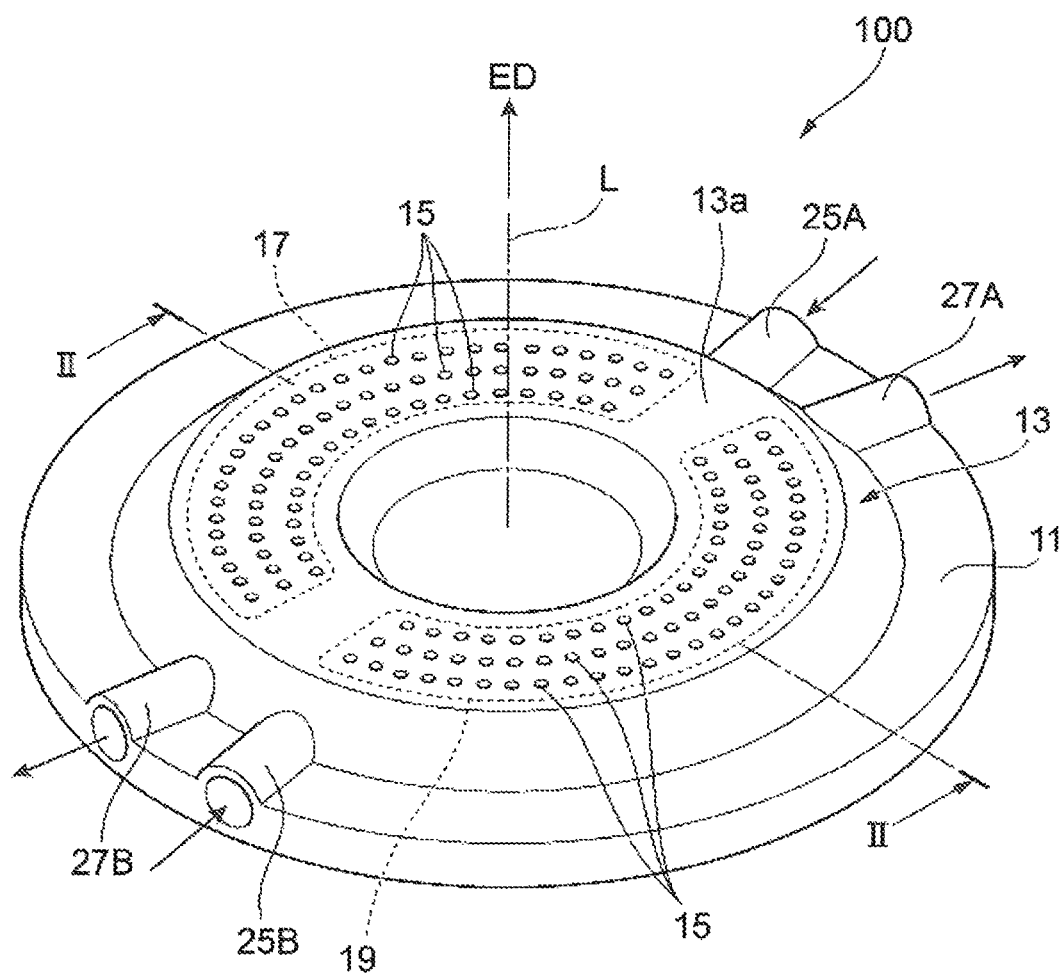
FIG. 1 is an external perspective view of a die plate according to a first embodiment of the present disclosure.
Figure 2:
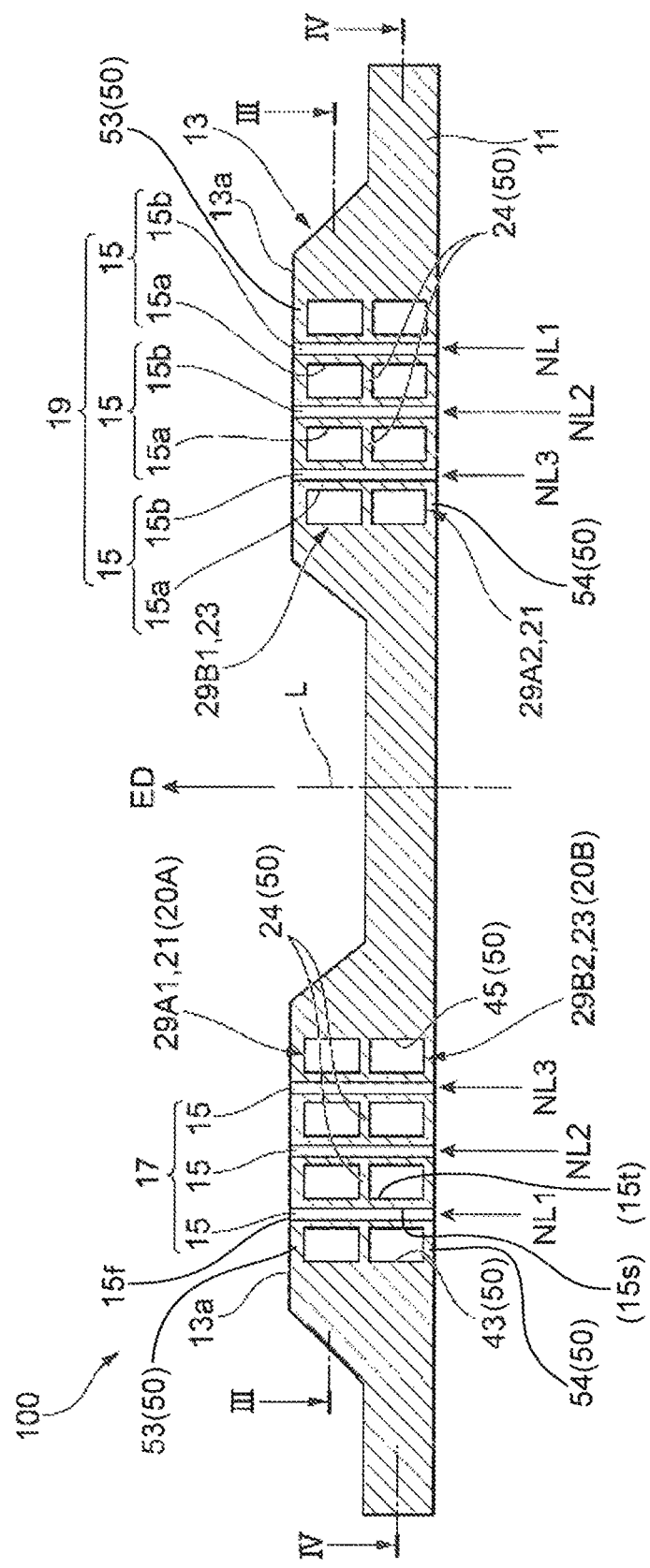
FIG. 2 is a cross sectional view of the die plate taken along the line II-II shown in FIG. 1.

FIG. 1 is an external perspective view of a die plate 100 according to a first embodiment of the present disclosure. FIG. 2 is a cross sectional view of the die plate taken along the line II-II shown in FIG. 1. As shown in FIGS. 1 and 2, the die plate 100 has a disk shape (ring shape) that is flat as a whole about an axis L (center line). The die plate 100 includes a nozzle arrangement part 13 and a flange part 11. The nozzle arrangement part 13 is disposed in a middle part (inner part) of the radial direction of the die plate 100. The flange part 11 is disposed in an outer part of the radial direction of the die plate 100. As shown in FIG. 1, in the present embodiment, a circular cavity is formed in the central portion of the die plate 100. That is, the die plate 100 has a ring shape. The nozzle arrangement part 13 is thicker than the flange part 11 and has a ring shape centered around the axis L.

In this nozzle arrangement part 13, a plurality of nozzles 15 is formed so as to penetrate the nozzle arrangement part 13 along the axis L. The plurality of nozzles 15 each discharges (extrudes) molten resin in an axial direction ED parallel to the axis L. Note that aggregate of the plurality of nozzles 15 is defined as a nozzle group. Each nozzle 15 includes a nozzle hole 15b formed inside a cylindrical nozzle wall 15a shown in FIG. 2. In more detail, each nozzle 15 includes the nozzle wall 15a extending in the axial direction ED and a discharge part 15f. In other words, the plurality of nozzles 15 includes the plurality of nozzle walls 15a and the plurality of discharge parts 15f. The nozzle wall 15a includes an inner peripheral surface 15s and an outer peripheral surface 15t. The inner peripheral surface 15s surrounds the nozzle hole 15b that allows the molten resin to flow, that is, a resin channel. The outer peripheral surface 15t is disposed along the inner peripheral surface 15s on the opposite side of the inner peripheral surface 15s. The discharge part 15f is disposed at the tip of the axial direction of the nozzle wall 15a and discharges the molten resin.

The nozzle arrangement part 13 includes a top surface 13a. The top surface 13a is a surface crossing (orthogonal to) the axis L on the tip side of a protruding direction of the nozzle arrangement part 13 protruding from the flange part 11. The top surface 13a is a flat surface for cutting the molten resin extruded from the nozzle 15. In other words, the top surface 13a determines a proximal surface of the molten resin to be cut. In the present embodiment, the axial direction ED of each nozzle 15 (resin extrusion direction) is parallel to the axis L, but the axial direction ED may be inclined to the axis L. The axial direction ED may be appropriately set in an up-and-down direction, a horizontal direction, and other direction according to structure of the resin pellet granulation device (resin machine).

The nozzle group arranged in the nozzle arrangement part 13 includes a first nozzle group 17 and a second nozzle group 19 divided into two in the circumferential direction. Each nozzle group includes a plurality of rows arranged side by side in the radial direction (three rows in the present embodiment), and the plurality of nozzles 15 is arranged in the circumferential direction in each row. Heating medium channels (heating medium guidance parts) are formed in the circumferential direction of the nozzle arrangement part 13 around the plurality of nozzles 15. The heating medium channels receive the heating medium and guide the heating medium to the plurality of nozzles 15 to heat the plurality of nozzles 15 from outside. As described above, by dividing the nozzle group in the circumferential direction, heating of the first nozzle group 17 and the second nozzle group 19 can be controlled individually, and more uniform temperature distribution can be easily obtained. Note that the nozzles 15 are preferably arranged in an aligned manner, but may be irregularly scattered as described later. Next, the heating medium channels will be described in detail.

<Heating Medium Channel>

Figure 3:
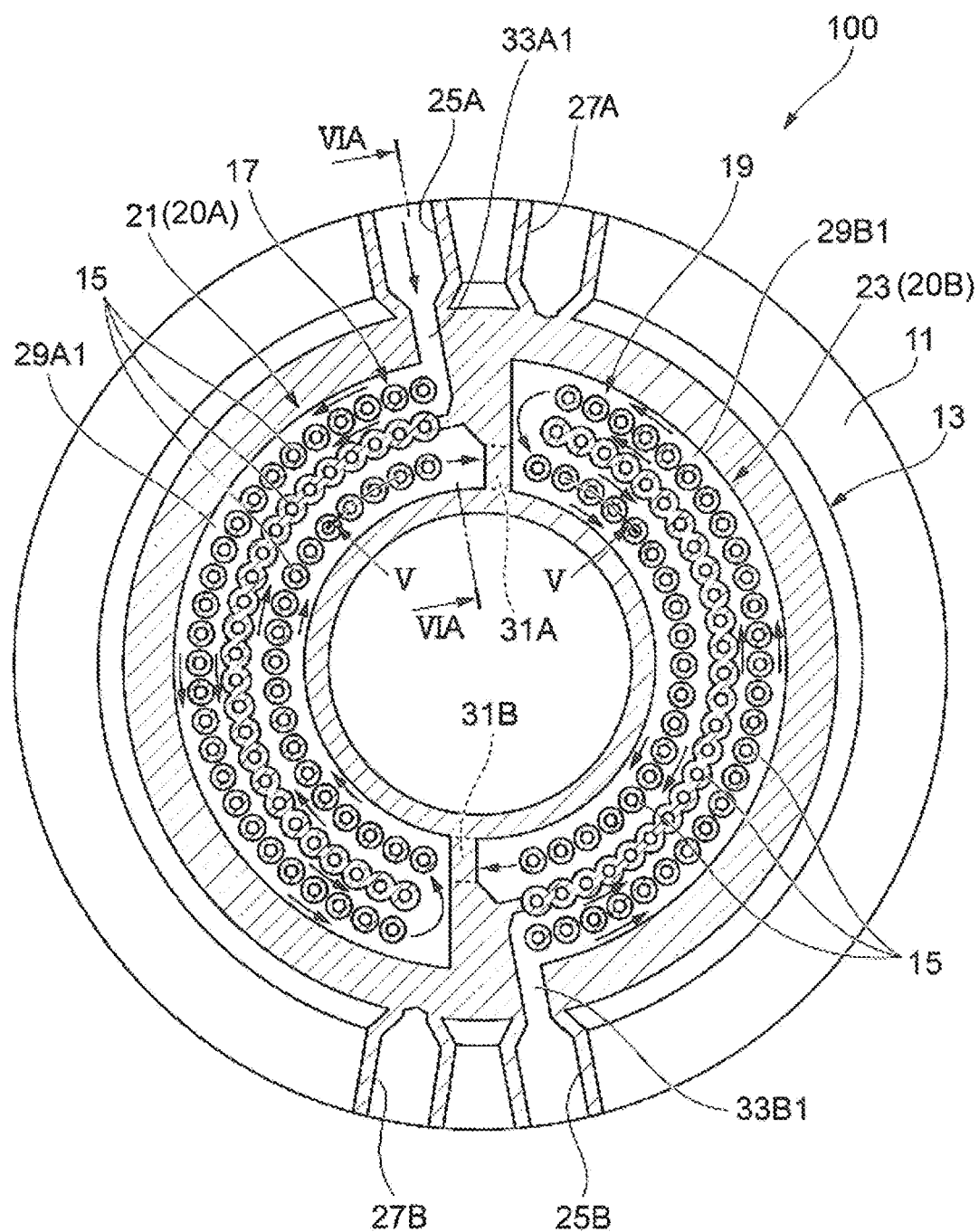
FIG. 3 is a cross sectional view of the die plate taken along the line shown in FIG. 2.
Figure 4:
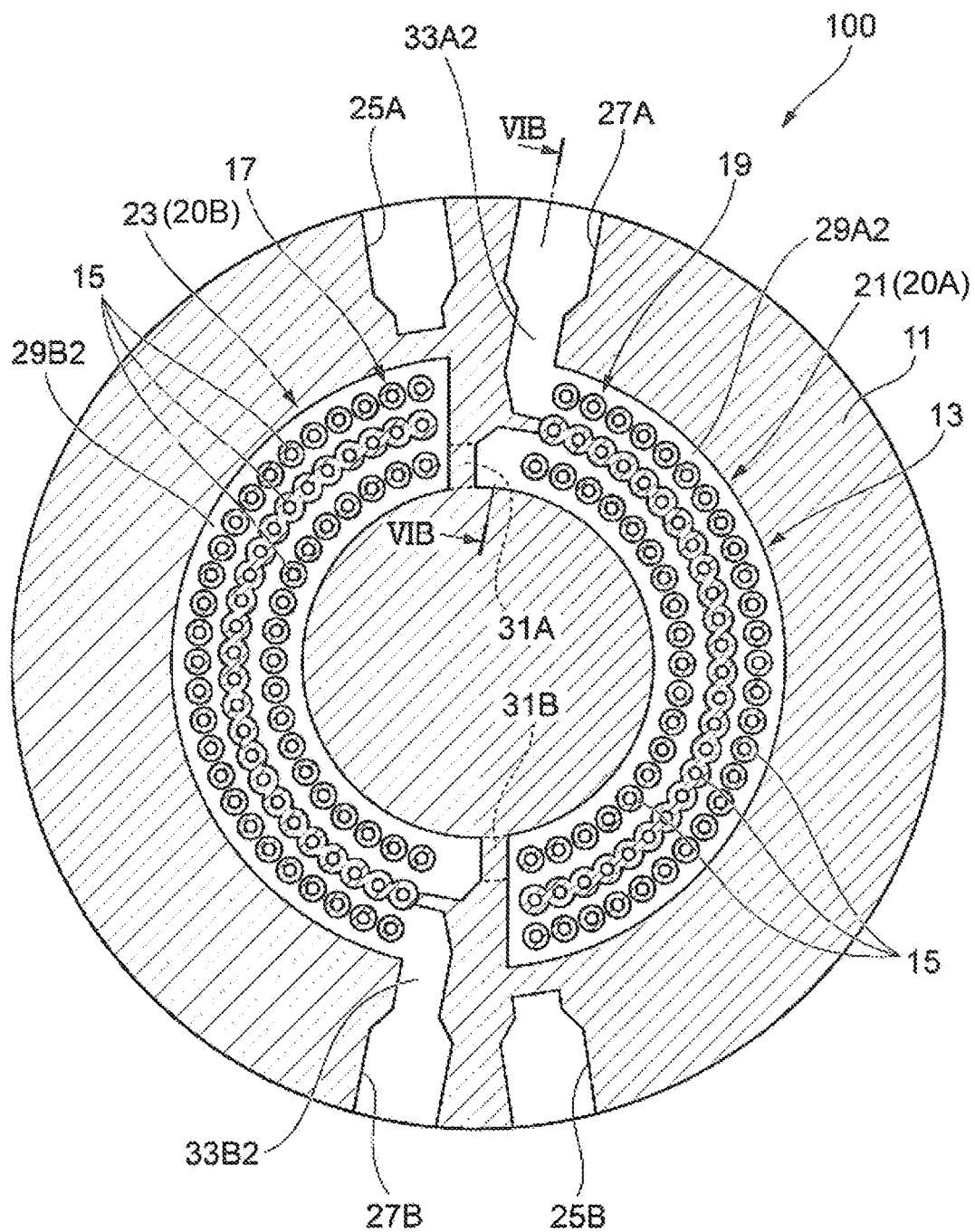
FIG. 4 is a cross sectional view of the die plate taken along the line IV-IV shown in FIG. 2.

FIG. 3 is a cross sectional view of the die plate taken along the line shown in FIG. 2. FIG. 4 is a cross sectional view of the die plate taken along the line IV-IV shown in FIG. 2. Note that FIG. 3 is also a cross section along the line shown in FIG. 6A described later. Two independent heating medium channels continuous over the entire length from an inlet to an outlet are formed inside the die plate 100. Specifically, the die plate 100 further includes a first heating medium guidance part 20A and a second heating medium guidance part 20B. Each heating medium guidance part receives the heating medium and guides the heating medium to the plurality of nozzles 15 for heating. The first heating medium guidance part 20A includes a first heating medium channel 21. The second heating medium guidance part 20B includes a second heating medium channel 23 independent of the first heating medium channel 21.

The first heating medium channel 21 and the second heating medium channel 23 are arranged at different positions in the axial direction ED (same as the axis L) of the nozzles 15 as described later, and form two-stage heating medium channels. In addition, as shown in FIG. 2, a partition part 24 (base wall) that separates the first heating medium channel 21 and the second heating medium channel 23 in the axial direction of the nozzles 15 is formed in the die plate 100.

The first heating medium channel 21 includes an inlet 25A (reception port) that receives the heating medium, an outlet 27A (discharge port) that discharges the heating medium, and a heating channel 29A1 (FIG. 3) (first sub-guidance part) and a heating channel 29A2 (FIG. 4) (second sub-guidance part) that cause the inlet 25A and the outlet 27A to be in communication with each other. Similarly, the second heating medium channel 23 also includes an inlet 25B (reception port), an outlet 27B (discharge port), and a heating channel 29B1 (FIG. 3) (third sub-guidance part) and a heating channel 29B2 (FIG. 4) (fourth sub-guidance part). Each of the heating channels 29A1, 29A2, 29B1, and 29B2 is defined by a guidance wall 50 described later. Multiple inlets 25A, multiple outlets 27A, multiple inlets 25B, and multiple outlets 27B may be provided.

The heating channel 29A1 of the first heating medium channel 21 is arranged on the resin injection side of the nozzles 15 (upper side in FIGS. 1 and 2) in the region of the first nozzle group 17. The heating channel 29A2 is arranged on the resin entry side of the nozzles 15 (lower side in FIGS. 1 and 2) in the region of the second nozzle group 19. The heating channel 29A1 and the heating channel 29A2 are connected by a first communication channel 31A (first communicating part).

Figure 5:
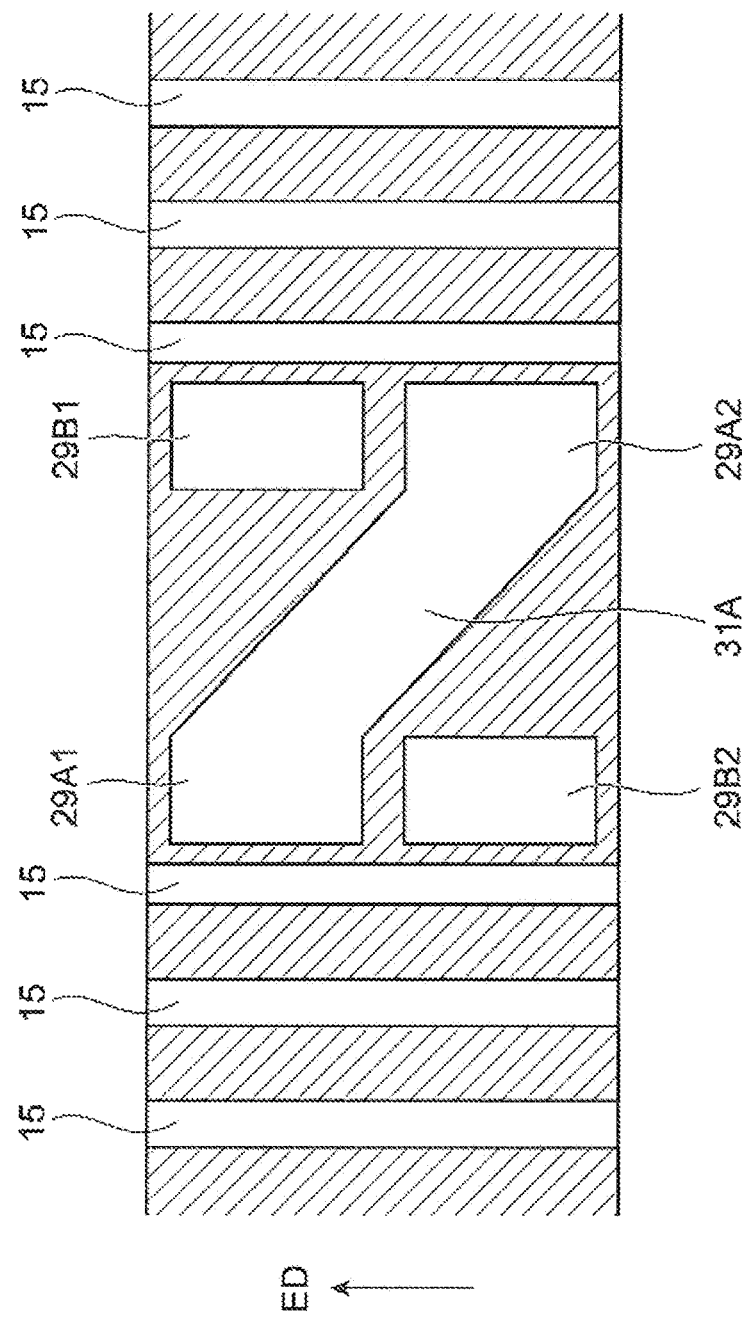
FIG. 5 is a cross sectional view of the die plate taken along the line V-V shown in FIG. 3.

FIG. 5 is a cross sectional view of the die plate taken along the line V-V shown in FIG. 3. The heating channel 29A1 on the resin injection side is connected to the heating channel 29A2 on the resin entry side through the first communication channel 31A formed with an inclination. Similarly, the heating channels 29B1 and 29B2 of the second heating medium channel 23 are also connected to each other through an inclined second communication channel 31B (second communicating part) shown in FIGS. 3 and 4.

Figure 6A:
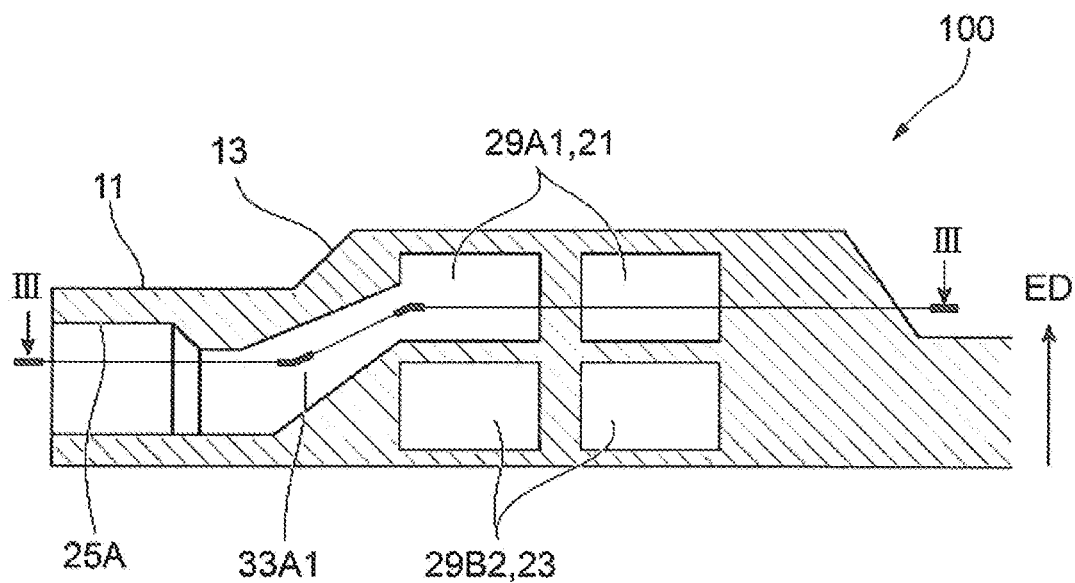
FIG. 6A is a cross sectional view of the die plate taken along the line VIA-VIA shown in FIG. 3.
Figure 6B:
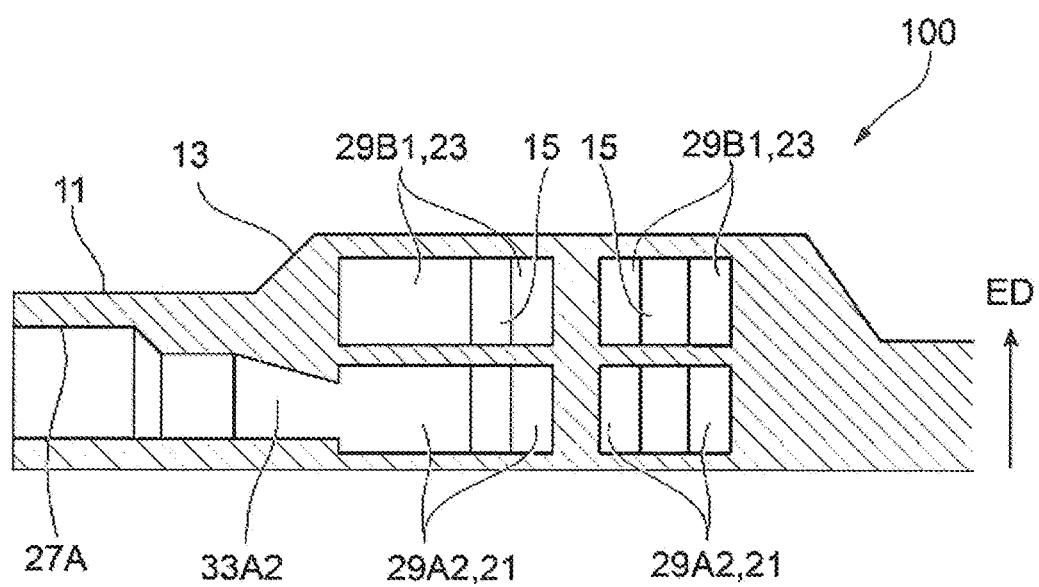
FIG. 6B is a cross sectional view of the die plate taken along the line VIB-VIB shown in FIG. 4.

FIG. 6A is a cross sectional view of the die plate taken along the line VIA-VIA shown in FIG. 3. FIG. 6B is a cross sectional view of the die plate taken along the line VIB-VIB shown in FIG. 4. As shown in FIG. 6A, the inlet 25A of the first heating medium channel 21 and the heating channel 29A1 arranged on the resin injection side are connected to each other through a first inflow side channel 33A1 that changes the channel position in the axial direction ED. As shown in FIG. 6B, the outlet 27A of the first heating medium channel 21 and the heating channel 29A2 arranged on the resin entry side are connected to each other through a first outflow side channel 33A2. Similarly, as shown in FIGS. 3 and 4, an inclined second inflow side channel 33B1 is connected to the inlet 25B of the second heating medium channel 23, and a second outflow side channel 33B2 is connected to the outlet 27B.

As described above, in the die plate 100 according to the present embodiment, the first nozzle group 17 and the second nozzle group 19 are arranged in a ring shape (note that the shape of the nozzle groups 17 and 19 can be said to be semicircular, arcuate, or curved). Each heating channel of the first heating medium channel 21 and the second heating medium channel 23 is formed in the circumferential direction of the ring shape, and the plurality of nozzles 15 is arranged in the channel. In other words, each heating channel is defined by the nozzle walls 15*a* of the plurality of nozzles 15.

Figure 7:
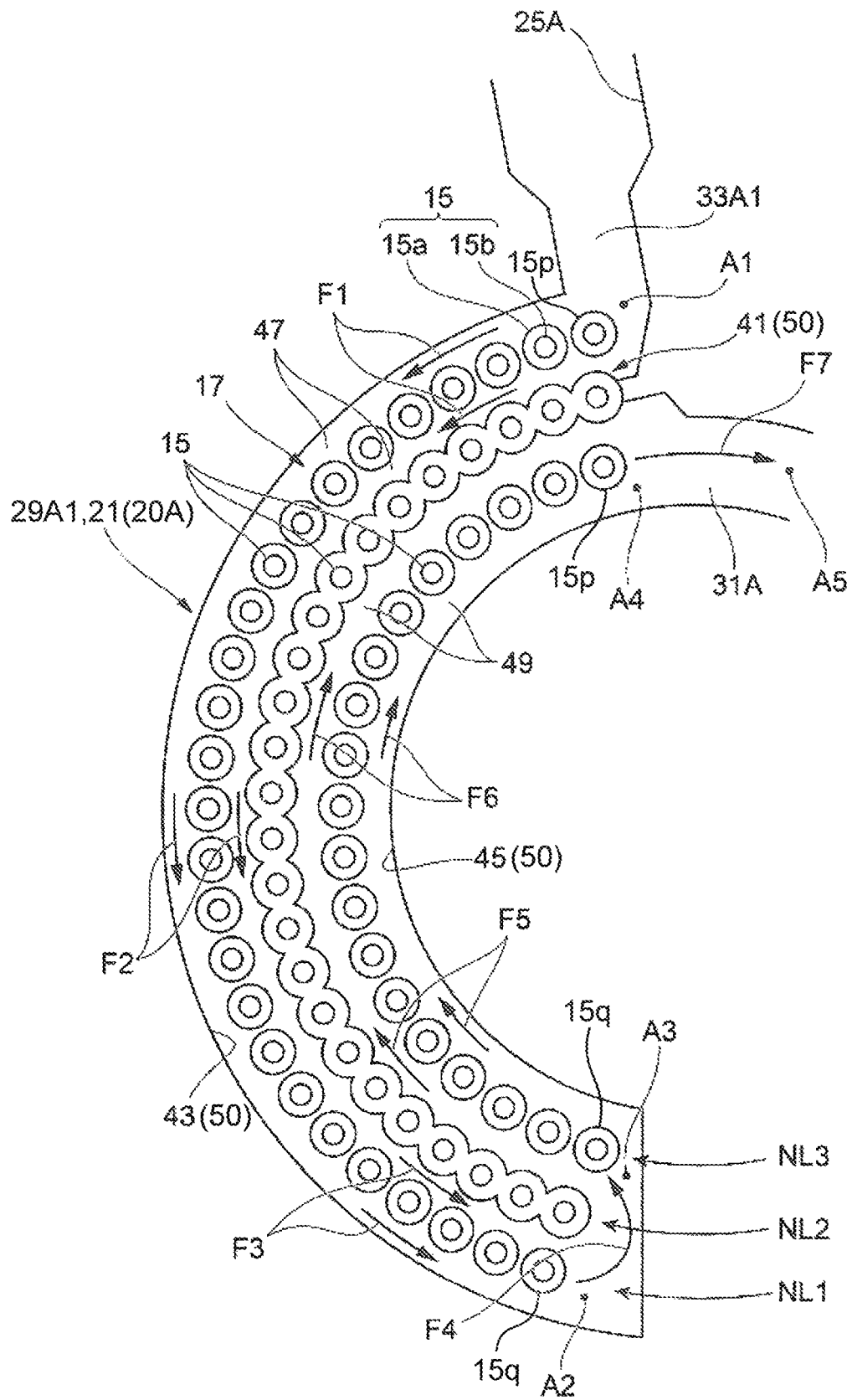
FIG. 7 is a schematic enlarged view of a heating channel of a first heating medium channel formed along nozzles of a first nozzle group of the die plate according to the first embodiment of the present disclosure.

FIG. 7 is a schematic enlarged view of the heating channel 29A1 of the first heating medium channel 21 formed along the nozzles 15 of the first nozzle group 17 (note that for convenience, hatching is omitted in FIG. 7). In the heating channel 29A1, in order from the radial outside, an outer diameter side nozzle row NL1, an intermediate nozzle row NL2, and an inner diameter side nozzle row NL3 each including the plurality of nozzles 15 are juxtaposed in an arc shape (see also FIG. 2). The nozzles 15 are evenly spaced in the circumferential direction.

In the outer diameter side nozzle row NL1 and the inner diameter side nozzle row NL3, there may be a gap in the circumferential direction between the nozzle walls 15*a* forming the nozzles 15, or the nozzle walls 15*a* may be connected to each other in the circumferential direction (details will be described later). In the example shown in FIG. 7, in the outer diameter side nozzle row NL1 and the inner diameter side nozzle row NL3, the outer peripheral surfaces 15*t* of the nozzle walls 15*a* are arranged independently of each other in the plurality of nozzles 15 (independent nozzles). In the intermediate nozzle row NL2, the nozzle walls 15*a* adjacent to each other in the circumferential direction of the plurality of nozzles 15 arranged in the circumferential direction are connected to each other to form a channel wall 41. In this case, the plurality of nozzles 15 of the intermediate nozzle row NL2 constitutes contact nozzles of the present disclosure. The heating channel shown in FIG. 7 is defined by the outer peripheral surfaces 15*t* of the plurality of nozzles 15 (FIG. 2).

A channel wall 43 is formed via a gap on the further outer diameter side of the outer diameter side nozzle row NL1. A channel wall 45 is formed via a gap on the further inner diameter side of the inner diameter side nozzle row NL3. The channel walls 43 and 45 are both formed by a part of the nozzle arrangement part 13. With this configuration, one pair of channels each continuous in the circumferential direction is formed between the channel wall 43 on the outer diameter side and the channel wall 41 by the intermediate nozzle row NL2, and between the channel wall 45 on the inner diameter side and the channel wall 41 by the intermediate nozzle row NL2. The one pair of channels are connected to (in communication with) each other on the opposite side of the inlet 25A side of the heating channel 29A1 extending in the circumferential direction (near points A2 and A3).

Therefore, the heating channel 29A1 includes an outward channel 47 that heads for one side of the circumferential direction (point A2 in FIG. 7), and a return channel 49 that turns back at a forward end of the outward channel 47 (points A2 and A3 in FIG. 7) and heads for the other side of the circumferential direction (point A4 in FIG. 7) along the outward channel 47. The outward channel 47 and the return channel 49 are juxtaposed with the intermediate nozzle row NL2 therebetween. The outward channel 47 is formed on both sides of the radial direction of the nozzles 15 of the outer diameter side nozzle row NL1. The return channel 49 is formed on both sides of the radial direction of the nozzles 15 of the inner diameter side nozzle row NL3. That is, the heating medium flowing through the heating channel 29A1 reaches the point A2 from a point A1 connected to the inlet 25A along arrows F1, F2, and F3, turns back from the point A2 to the point A3 as shown by an arrow F4, and reaches the point A4 along arrows F5 and F6. The heating medium that has reached the point A4 heads for the point A5 of the heating channel 29A2 (FIG. 8) through the first communication channel 31A along an arrow F7.

Figure 8:
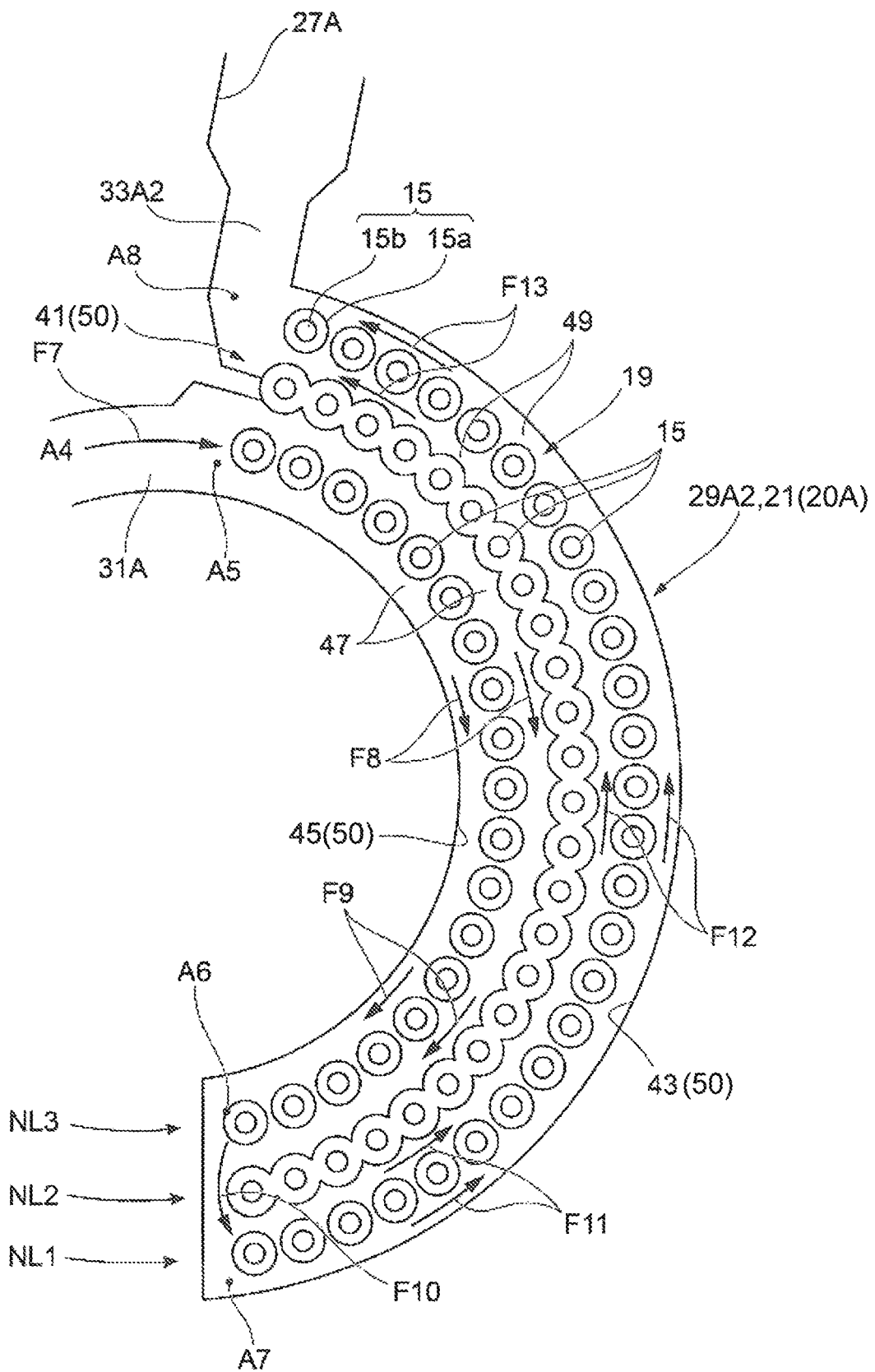
FIG. 8 is a schematic enlarged view of the heating channel of the first heating medium channel formed along nozzles of a second nozzle group of the die plate according to the first embodiment of the present disclosure.

FIG. 8 is a schematic enlarged view of the heating channel 29A2 of the first heating medium channel 21 formed along the nozzles 15 of the second nozzle group 19 (note that for convenience, hatching is omitted in FIG. 8). Similarly, the heating channel 29A2 is arranged with substantial line symmetry with respect to the heating channel 29A1. The outer diameter side nozzle row NL1, the intermediate nozzle row NL2, and the inner diameter side nozzle row NL3 are juxtaposed in an arc shape. The channel walls 41, 43, and 45 form one pair of channels including the outward channel 47 and the return channel 49.

In the heating channel 29A2, the heating medium sent to the point A5 reaches a point A6 along arrows F8 and F9, turns back from the point A6 to a point A7 as shown by an arrow F10, and reaches a point A8 along arrows F11, F12, and F13. The heating medium that has reached the point A8 is discharged from the outlet 27A. The outer diameter side nozzle row NL1 is arranged between the channel wall 43 on the outer diameter side and the channel wall 41 by the intermediate nozzle row NL2. The inner diameter side nozzle row NL3 is arranged between the channel wall 45 on the inner diameter side and the channel wall 41 by the intermediate nozzle row NL2. The present embodiment has taken an example in which one nozzle row is arranged between the channel walls in this way, but the present disclosure is not limited to this example, and a plurality of nozzle rows may be arranged between the channel walls. With such a configuration, the number of nozzles to arrange in the heating channel can be increased, and productivity of resin pellets can be improved.

To further describe the first heating medium channel 21 of the first heating medium guidance part 20A and the second heating medium channel 23 of the second heating medium guidance part 20B having the above-described configuration, the first heating medium guidance part 20A and the second heating medium guidance part 20B each have the guidance wall 50. The guidance wall 50 is a wall part (guidance surface) that defines the first heating medium channel 21 and the second heating medium channel 23, together with the outer peripheral surfaces 15t of the plurality of nozzles 15. Note that the guidance wall 50 defines a portion of each heating channel different from the outer peripheral surface 15t of each nozzle 15. In particular, the guidance wall 50 guides the heating medium such that, after the heating medium flowing in from the inlet 25A and the inlet 25B comes into contact with the outer peripheral surfaces 15t of the plurality of nozzles 15 in a flow direction crossing (orthogonal to) the axial direction ED, the heating medium is discharged from the outlet 27A and the outlet 27B.

In addition to the channel walls 43 and 45 (FIGS. 2, 7, 8) and the partition part 24 (FIG. 2) described above, the guidance wall 50 includes a top wall 53 and a bottom wall 54. The top wall 53 constitutes an upper surface portion of the nozzle arrangement part 13. The bottom wall 54 constitutes a lower surface portion of the nozzle arrangement part 13. The top wall 53 defines an upper surface portion (ceiling portion) of the heating channel 29A1 in the range from the inlet 25A to the first communication channel 31A. Meanwhile, the bottom wall 54 defines a lower surface portion (bottom portion) of the heating channel 29B2 in the range from the second communication channel 31B to the outlet 27B. The partition part 24 defines a lower surface portion of the heating channel 29A1 and an upper surface portion of the heating channel 29B2. The plurality of base walls is spaced apart from each other in the axial direction ED. The base walls have a function of partitioning (defining) both side portions of the axial direction ED of the heating channel 29A1 and the heating channel 29B2 (upper and lower portions in FIG. 2) in a direction parallel to the flow direction. That is, each heating channel is arranged between the plurality of base walls. Meanwhile, the nozzle walls 15a of the plurality of nozzles 15 connect the plurality of base walls to each other in the axial direction ED to isolate each nozzle hole 15b (resin channel) from the heating channel 29A1 and the heating channel 29B2. In the present embodiment, the plurality of base walls includes a part of the nozzle arrangement part 13.

The channel walls 43 and 45 extend in the flow direction of the heating medium as shown in FIG. 7, are arranged opposite the nozzle walls 15a of the plurality of nozzles 15 in a direction crossing the axial direction ED as shown in FIG. 2, and connect the plurality of base walls (top wall 53, partition part 24, bottom wall 54) to each other in the axial direction ED. In this case, the channel walls 43 and 45 define each heating channel in the circumferential direction together with the outer peripheral surfaces 15t of the plurality of nozzles 15 such that the heating medium moves in the circumferential direction of the nozzle group while coming into contact with the outer peripheral surfaces 15t of the plurality of nozzle 15.

In particular, as shown in FIG. 7, the nozzle group includes one nozzle 15p arranged at one end of the circumferential direction of the plurality of nozzles 15, and the other nozzle 15q arranged on the opposite side of the one nozzle and at the other end of the circumferential direction of the plurality of nozzles 15. The channel wall 43 of the guidance wall 50 is continuously arranged in the circumferential direction such that the heating medium coming into contact with the outer peripheral surface 15t of the one nozzle 15p comes into contact with the outer peripheral surface 15t of the other nozzle 15q. The channel wall 45 of the guidance wall 50 is continuously arranged in the circumferential direction such that the heating medium coming into contact with the outer peripheral surface 15t of the one nozzle 15q comes into contact with the outer peripheral surface 15t of the other nozzle 15p.

Furthermore, as shown in FIG. 7, the channel wall 43 (outward route guidance wall) is arranged so as to extend in the circumferential direction on one end side (radially outside) of the plurality of nozzles 15 in the radial direction of the nozzle group. The channel wall 43 guides the heating medium between the channel wall 43 and the plurality of nozzles 15 in a first direction of the circumferential direction. Meanwhile, the channel wall 45 (return route guidance wall) is arranged so as to extend in the circumferential direction at the other end side (radial inside) of the plurality of nozzles 15 in the radial direction. The channel wall 45 receives the heating medium guided by the channel wall 43 and guides the heating medium in a second direction opposite the first direction of the circumferential direction.

Note that the heating channel 29B1 and the heating channel 29A2 (FIG. 8) shown on the right side of FIG. 2 are also defined by each guidance wall 50 in the same manner as described above.

Figure 9:
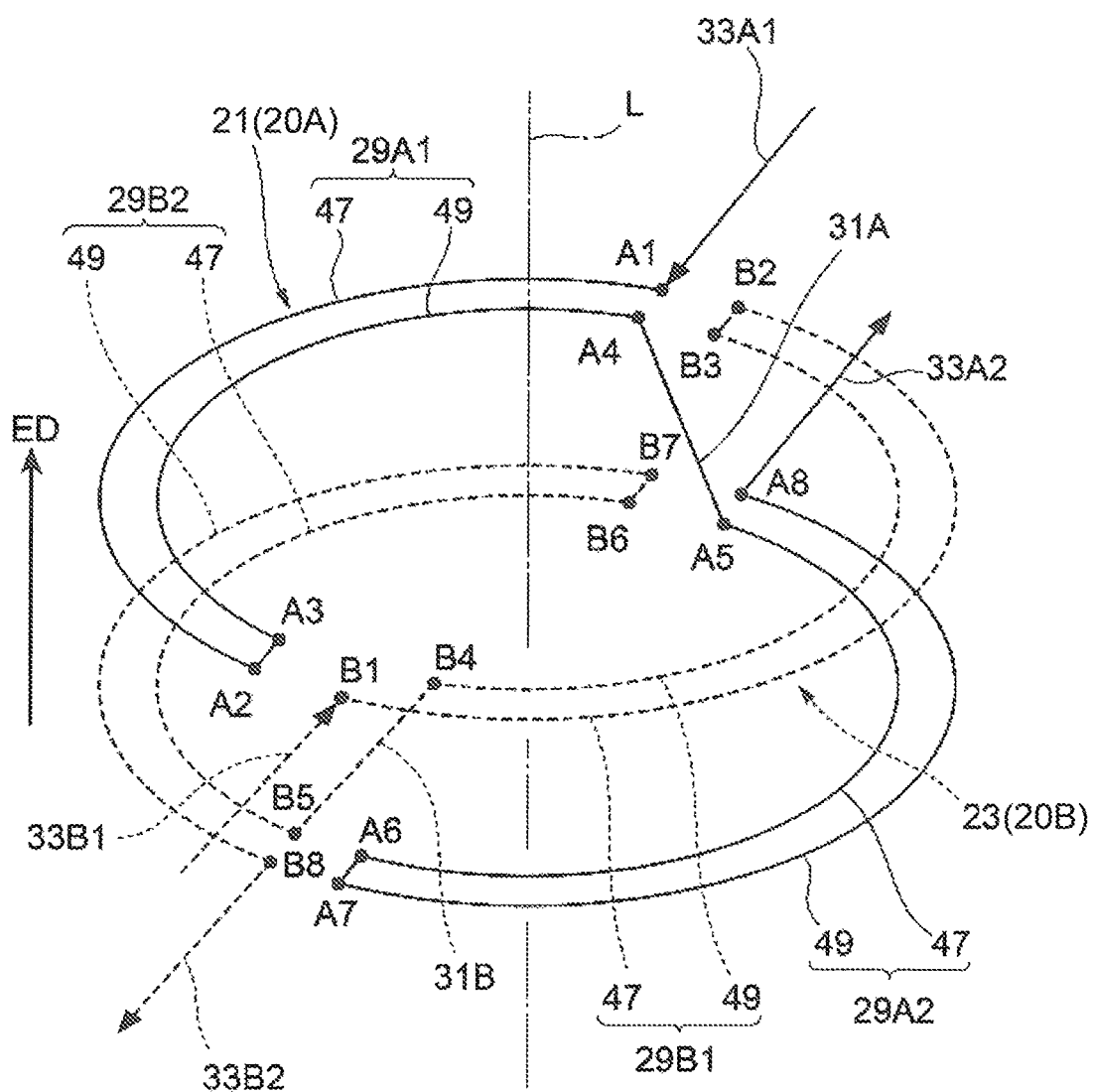
FIG. 9 is an explanatory diagram schematically showing channels of the first heating medium channel and a second heating medium channel of the die plate according to the first embodiment of the present disclosure.

FIG. 9 is an explanatory diagram schematically showing each of the first heating medium channel 21 and the second heating medium channel 23. In the first heating medium channel 21, as described with reference to FIGS. 7 and 8, the heating channel 29A1 is arranged on the resin injection side of the axial direction ED, and the heating channel 29A2 is arranged on the resin entry side. Meanwhile, the second heating medium channel 23 is arranged at a position with point symmetry at which the first heating medium channel 21 is inverted by about 180° centered around the axis L. Therefore, the heating medium flowing through the first heating medium channel 21 and the second heating medium channel 23 flows around the resin injection side part (discharge side outer peripheral surface) of the nozzle wall 15a of each nozzle 15 at the initial stage of flowing into each channel, and then flows around the resin entry side part (upstream side outer peripheral surface) of the nozzle wall 15a.

Figure 45:
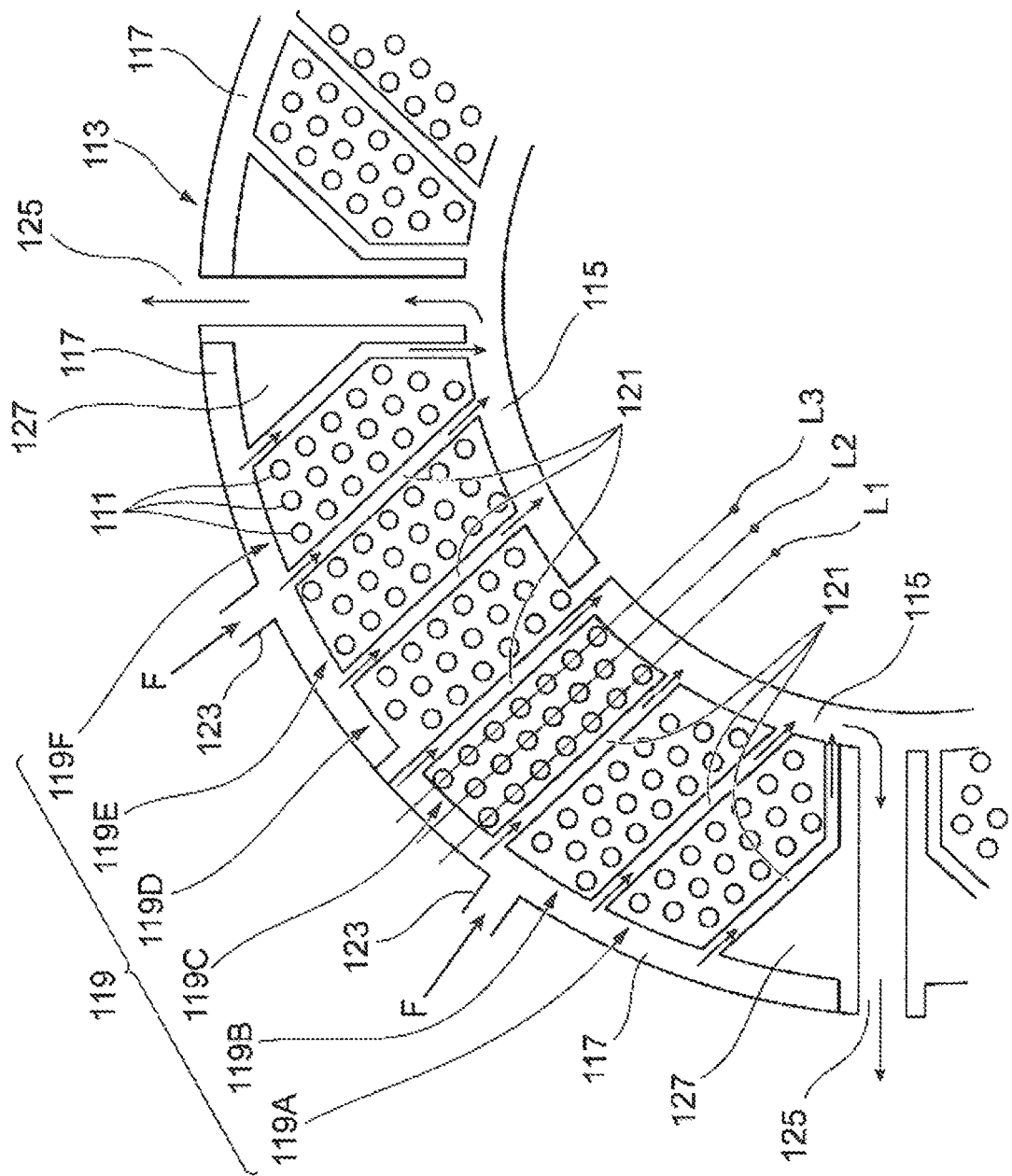
FIG. 45 is an enlarged sectional view showing arrangement of heating channels and nozzles of a conventional die plate.

That is, the heated heating medium supplied from the inlets 25A and 25B flows along the outer peripheral surfaces 15t of the nozzle walls 15a of the plurality of nozzles 15 arranged in the circumferential direction in the heating channels 29A1, 29A2, 29B1, and 29B2. This allows heat exchange to the nozzle walls 15a of the plurality of nozzles 15 to be continuously and efficiently performed in the flow direction of the heating medium. Note that when the plurality of nozzles 15 is arranged in the radial direction, as the nozzles are located radially outside more, the gap between the nozzles in the circumferential direction is longer and the space efficiency of the nozzle arrangement is relatively lowered. However, by arranging the plurality of nozzles 15 in the circumferential direction as in the present embodiment, it is less likely to generate wasted space (for example, empty space 127 in FIG. 45), and the arrangement density of the nozzles 15 can be improved. Note that as will be described in detail later, the plurality of nozzles 15 may be arranged in the radial direction.

Since the preheated heating medium first flows into the heating channels 29A1 and 29B1 near the top surface 13a of the nozzle arrangement part 13, the heat input into the nozzle wall 15a is large. Meanwhile, since the top surface 13a side of the nozzle arrangement part 13 of the die plate 100 is exposed to water, the heat removal is larger on the top surface 13a side than on the resin entry side where the heating channels 29A2 and 29B2 are arranged. In the present embodiment, since the inflowing heating medium first flows through the heating channels 29A1 and 29B1, the nozzle wall 15a on the resin injection side can be heated while supplementing the heat removal on the top surface 13a side.

After flowing through the heating channels 29A1 and 29B1, the heating medium flows into the heating channels 29A2 and 29B2 corresponding to the downstream side of the channels, respectively, and flows through the heating channels 29A2 and 29B2, thereby heating the nozzle walls 15a on the resin entry side. This allows the heating medium to uniformly heat the nozzles 15 in the nozzle axial direction ED.

Furthermore, according to the present embodiment, the nozzle group including the plurality of nozzles 15 is divided into the first nozzle group 17 and the second nozzle group 19 in the circumferential direction. A semicircle of the first nozzle group 17 and a semicircle of the second nozzle group 19 are heated by heating medium channels of different systems (first heating medium channel 21 and second heating medium channel 23) in both the resin injection side part and the resin entry side part of the nozzles 15. With this configuration, particularly the resin injection side part of the nozzles 15 is less susceptible to heat removal by water than when the heating medium channel of one system heats the nozzles 15 over one round of the circumferential direction, and the occurrence of nonuniform temperature distribution can be reduced. In this way, by dividing the plurality of nozzles 15 into the first nozzle group 17 and the second nozzle group 19 in the circumferential direction, heating of the divided first nozzle group 17 and the second nozzle group 19 can be individually controlled. Therefore, it becomes easy to obtain a more uniform temperature distribution in the plurality of nozzles 15.

Since the heating channels 29A1, 29A2, 29B1, and 29B2 each include the outward channel 47 and the return channel 49 in the circumferential direction, the heating width can be expanded in the direction in which the outward channel 47 and the return channel 49 are aligned. The alignment direction here is the radial direction, but each channel may be shifted in the nozzle axial direction as described later, or may be shifted in both the radial direction and the nozzle axial direction. In either case, the temperature distribution of the nozzle arrangement part 13 can be made more uniform, and the range in which the plurality of nozzles 15 can be arranged can be expanded. In this case, the number of nozzles can be increased and the productivity of the resin pellets can be improved.

Since the first heating medium channel 21 and the second heating medium channel 23 each include one continuous channel from the inlets 25A and 25B to the outlets 27A and 27B, the flow speed of the heating medium can be stabilized and the temperature unevenness of the plurality of nozzles 15 can be improved. The heating channels 29A1, 29A2, 29B1, and 29B2 of the first heating medium channel 21 and the second heating medium channel 23 have a multi-layer structure in which at least some parts of the circumferential direction overlap each other in the axial direction ED. Therefore, the cross-sectional area of the channel is smaller than when the heating channels 29A1, 29A2, 29B1, and 29B2 are arranged in the same space in a single-layer structure. As a result, the flow speed of the heating medium increases, and the temperature rise performance of the nozzle walls 15a improves. Note that since the heating medium flows through one long channel in each of the above channels, there is a possibility that the temperature difference of the heating medium will be large between parts on the inlets 25A and 25B side and parts on the outlets 27A and 27B side of each channel. However, due to the above-described multi-layer structure, the heating medium channel with a relatively high temperature and the heating medium channel with a low temperature are arranged adjacent to each other in the axial direction ED. Therefore, by receiving heat transfer from adjacent channels, it is possible to reduce the expansion of the temperature difference between both channels.

As shown in FIGS. 3 and 4, in the present embodiment, the heating channel is arranged in the entire circumferential direction (entire region) in which the plurality of nozzles 15 is provided. In such a die plate 100, since the heating channel is arranged in the entire circumferential direction in the region where the nozzles 15 are arranged, all the nozzles 15 can be efficiently heated and the temperature unevenness can be reduced.

<Relationship Between Nozzle and Heating Channel>

Next, the procedure will be described for determining the flow direction of the heating medium in the heating channels 29A1, 29A2, 29B1, and 29B2 as either the circumferential direction as in the present embodiment or the radial direction as in a second embodiment described later. In the heating channels 29A1, 29A2, 29B1, and 29B2, a part that turns the flow direction of the heating medium is necessary. Since the pressure loss of the heating medium increases during this turn, it is preferable to reduce the number of turns. Therefore, by determining the flow direction of the heating medium under the following condition, the number of turns can be reduced and the increase in pressure loss of the heating medium can be suppressed.

When the plurality of nozzles 15 is arranged multiple-concentrically and radially from the center of the ring-shaped nozzle group (first nozzle group 17, second nozzle group 19), the number of nozzles 15 lined up in the radial direction from the center of the nozzle group is defined as n, and the number of nozzles 15 lined up in the circumferential direction on an outer periphery of the nozzle group is defined as m. At this time, when the integer value NM rounded off to the first decimal place of the value of m/4 is n or more, in the heating channel, the channel length in the circumferential direction of the nozzle group is set longer than the channel length in the radial direction of the nozzle group. On the other hand, when the integer value NM is less than n, in the heating channel, the channel length in the radial direction of the nozzle group is set longer than the channel length in the circumferential direction of the nozzle group.

Figure 11:
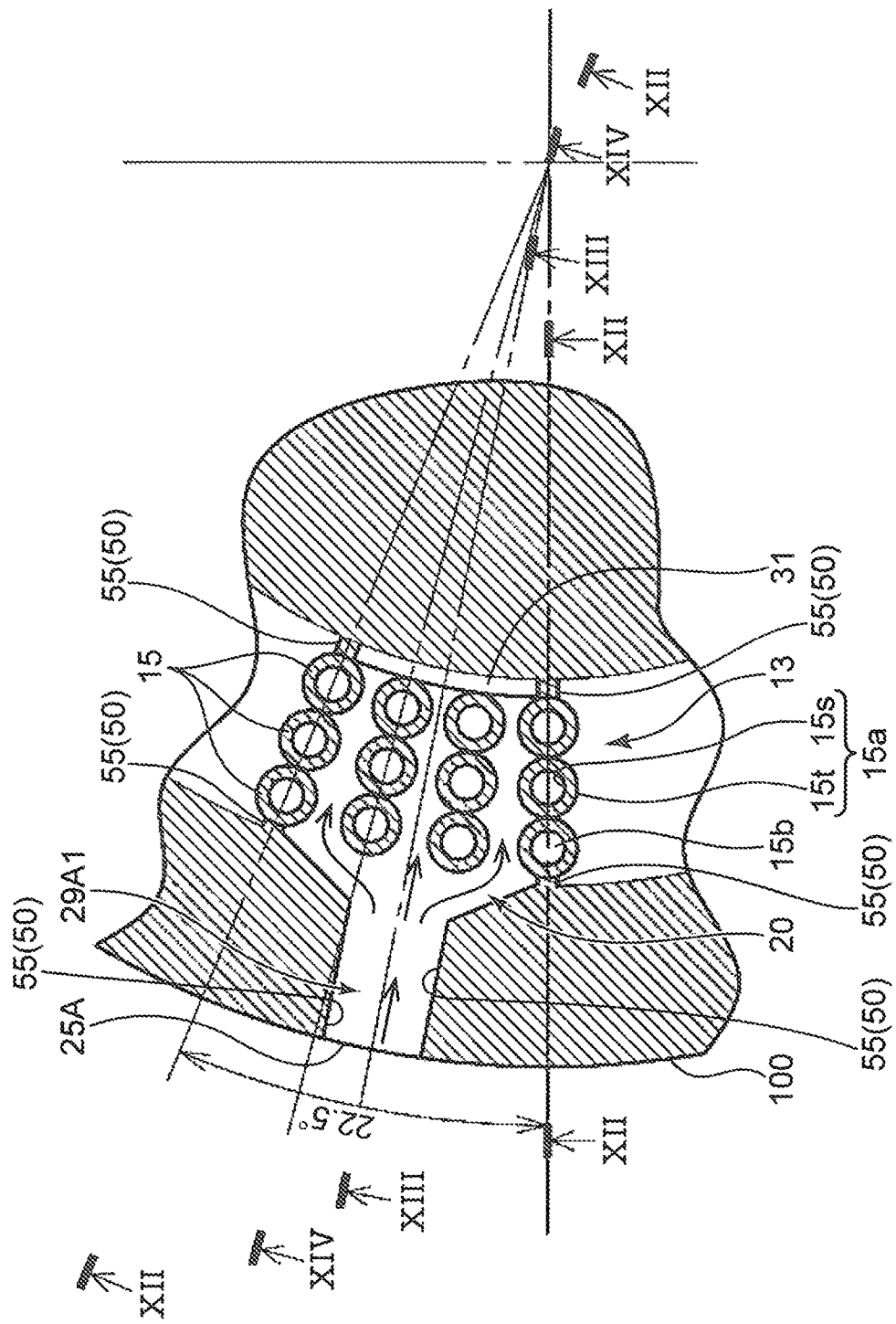
FIG. 11 is a horizontal sectional view of a nozzle arrangement part of the die plate according to a second embodiment of the present disclosure.
Figure 12:
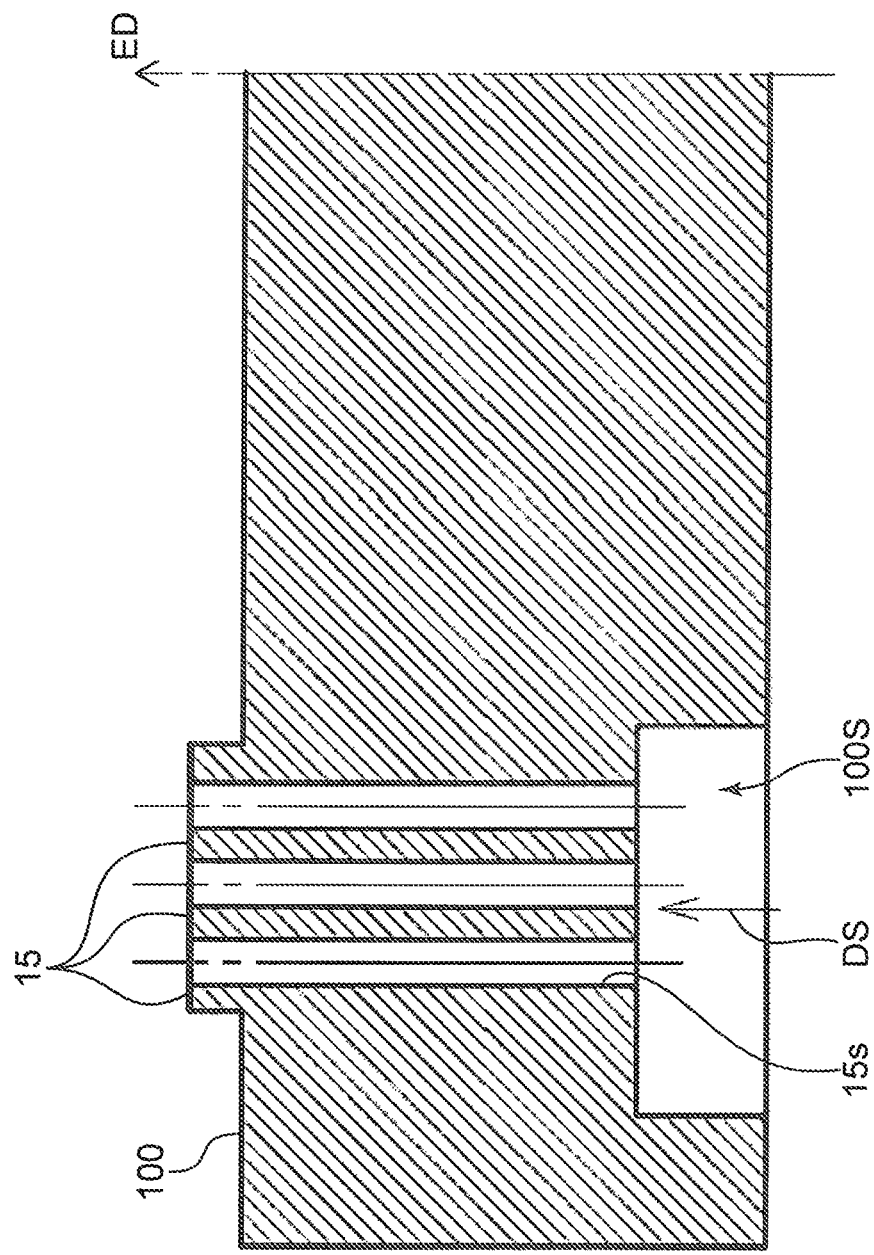
FIG. 12 is a cross sectional view of the die plate taken along the line XII-XII shown in FIG. 11.
Figure 13:
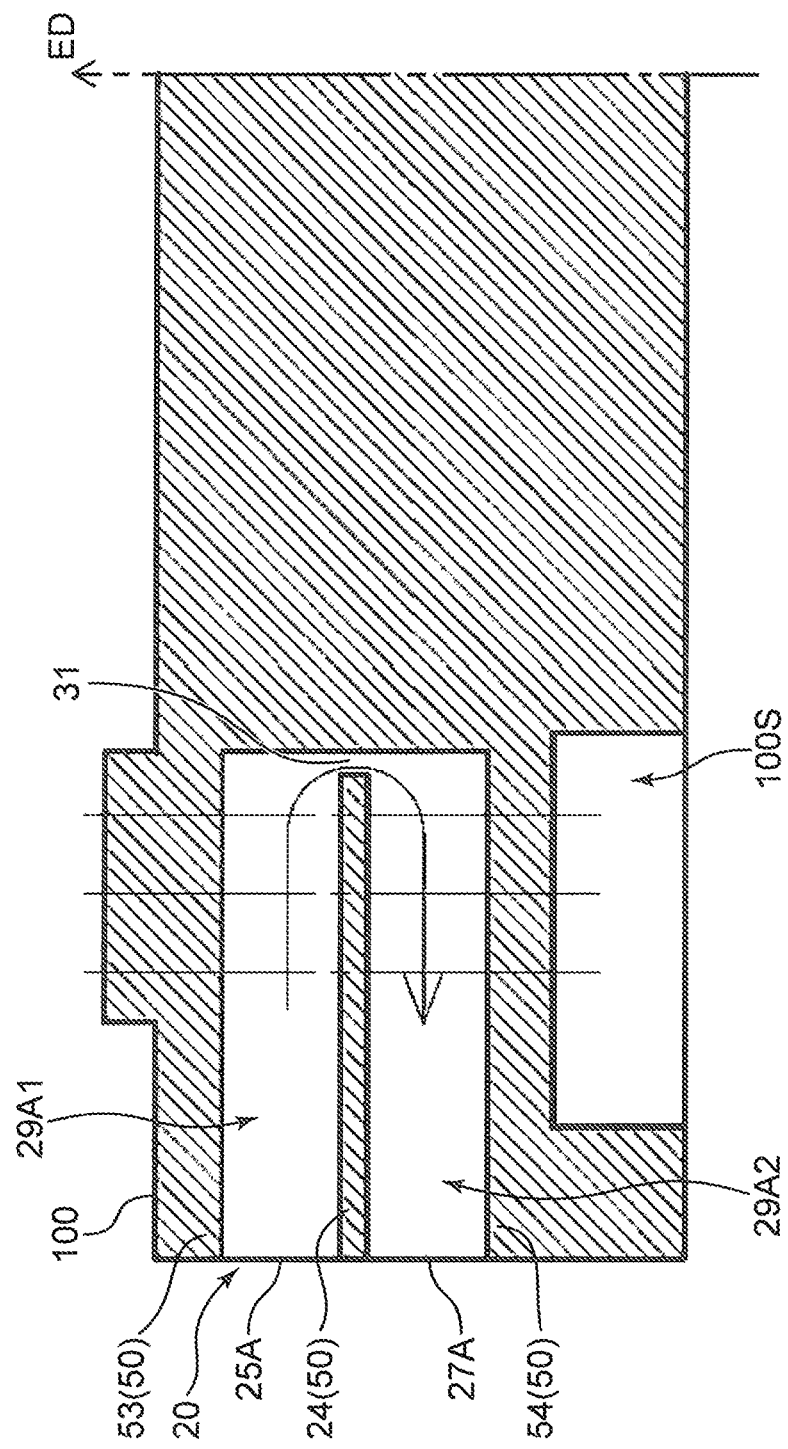
FIG. 13 is a cross sectional view of the die plate taken along the line XIII-XIII shown in FIG. 11.
Figure 14:
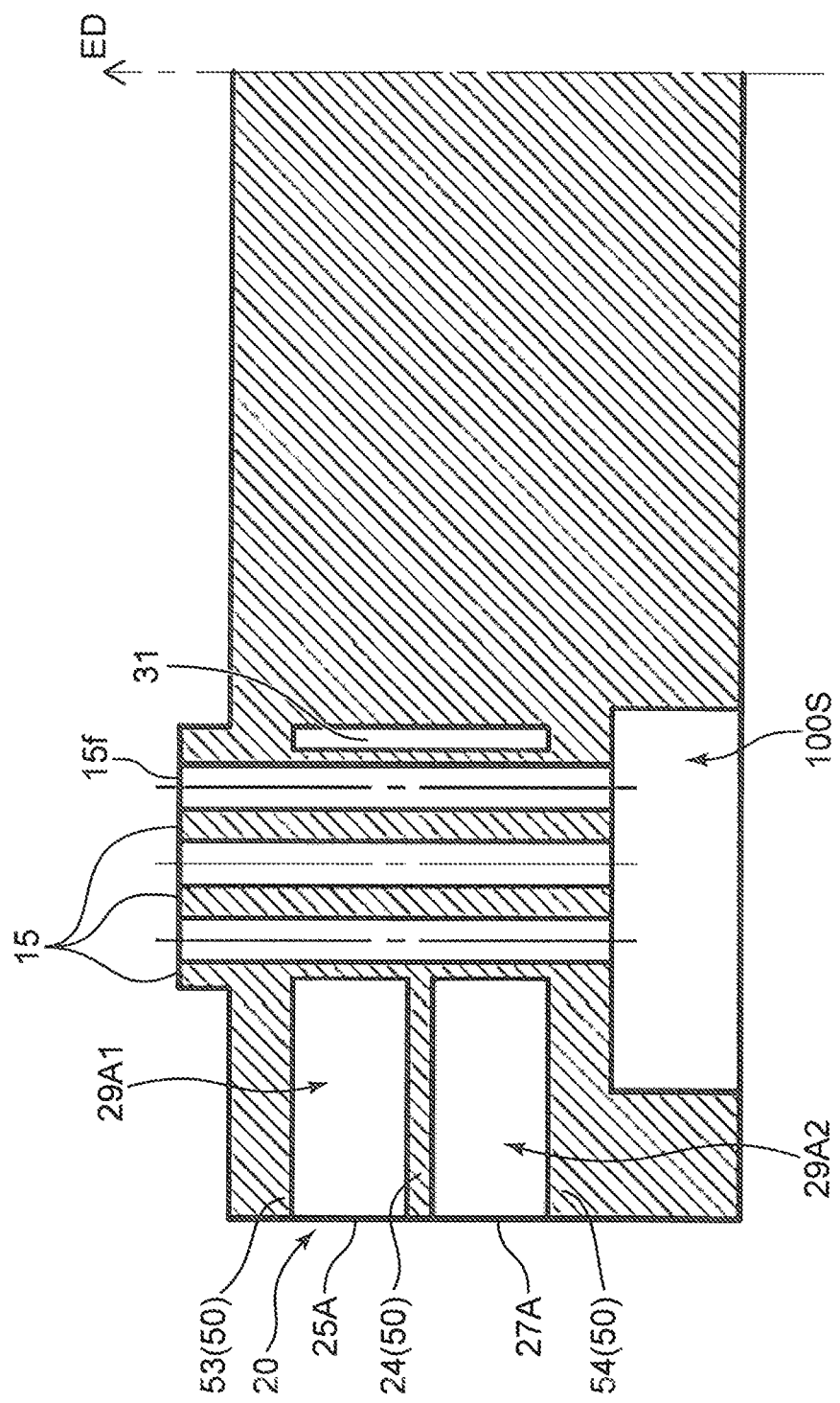
FIG. 14 is a cross sectional view of the die plate taken along the line XIV-XIV shown in FIG. 11.

Table 1 shows the direction in which the channel length through which the heating medium flows is set longer among the radial direction and the circumferential direction under the above-described condition in each of cases of m=1 to 16 and n=1 to 4. Note that in Table 1, "R" means the radial direction and "C" means the circumferential direction. For example, as shown in FIGS. 1 and 2, in a case where the plurality of nozzles 15 is arranged in three rows (n=3) of the outer diameter side nozzle row NL1, the intermediate nozzle row NL2, and the inner diameter side nozzle row NL3, preferably, if the number of nozzles 15 on the outer peripheral edge is 9 (m=9) or less, the channel length of the radial direction is set longer than the channel length of the circumferential direction, and if the number of nozzles 15 is 10 or more (m≥10), the channel length of the circumferential direction is set longer than the channel length of the radial direction. This makes it possible to reduce the number of turns of the flow of the heating medium and to suppress the increase in pressure loss of the heating medium.

horizontal sectional view of a nozzle arrangement part 13 of the die plate 100 according to the present embodiment. FIG. 12 is a cross sectional view of the die plate 100 taken along the line XII-XII shown in FIG. 11. FIG. 13 is a cross sectional view of the die plate 100 taken along the line XIII-XIII shown in FIG. 11. FIG. 14 is a cross sectional view

TABLE 1

| m | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| m/4 | 0.25 | 0.5 | 0.75 | 1 | 1.25 | 1.5 | 1.75 | 2 | 2.25 | 2.5 | 2.75 | 3 | 3.25 | 3.5 | 3.75 | 4 | |
| NM | 0 | 1 | 1 | 1 | 1 | 2 | 2 | 2 | 2 | 3 | 3 | 3 | 3 | 4 | 4 | 4 | |
| n = 1 | R | C | C | C | C | C | C | C | C | C | C | C | C | C | C | C | |
| n = 2 | R | R | R | R | R | C | C | C | C | C | C | C | C | C | C | C | |
| n = 3 | R | R | R | R | R | R | R | R | R | C | C | C | C | C | C | C | |
| n = 4 | R | R | R | R | R | R | R | R | R | R | R | R | R | C | C | C | |
| ... | | | | | | | | | | | | | | | | | |

<Flow of Heating Medium Inside Heating Channel>

Figure 10:
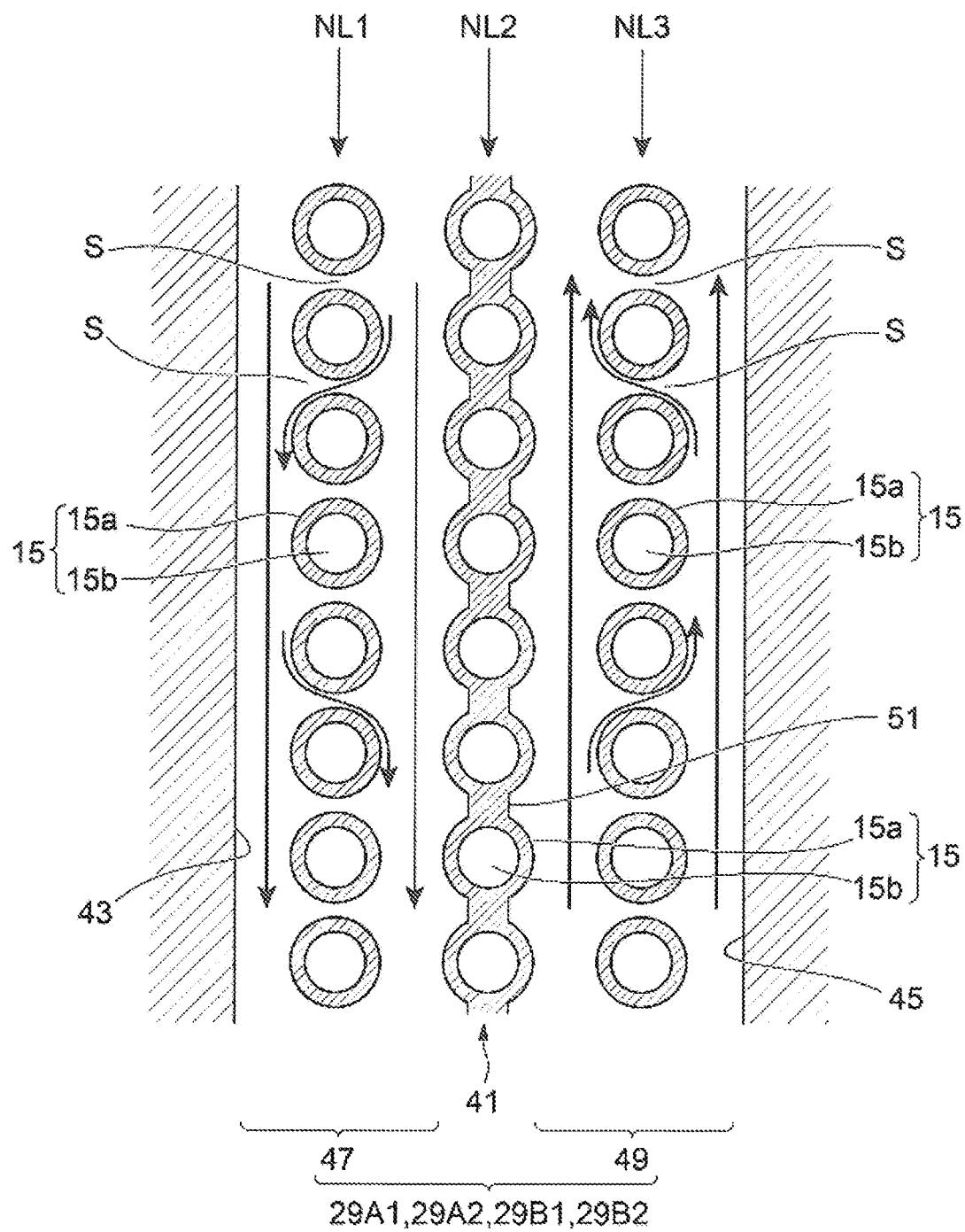
FIG. 10 is an explanatory diagram schematically showing how a heating medium flows around the nozzles arranged in the heating channel of the die plate according to the first embodiment of the present disclosure.

FIG. 10 is an explanatory diagram schematically showing how the heating medium flows around the nozzles 15 arranged in the heating channel. In each of the heating channels 29A1, 29A2, 29B1, and 29B2, the outer diameter side nozzle row NL1, the intermediate nozzle row NL2, and the inner diameter side nozzle row NL3 are arranged, and the heating medium flows along each nozzle row. In the outer diameter side nozzle row NL1 and the inner diameter side nozzle row NL3, if there is a gap S between the nozzles 15 adjacent to each other in the circumferential direction (indicated as the up-and-down direction in FIG. 10), the heating medium also flows into the gap S. This flow promotes heat exchange between the heating medium and the nozzle walls 15a, and enhances the heating effect of the nozzle walls.

The intermediate nozzle row NL2 forms the channel wall 41 continuously in the circumferential direction. As shown in FIGS. 7 and 8, the channel wall may be formed by joining the nozzle walls 15a to each other such that the outer peripheral surfaces 15t of the nozzle walls 15a of the intermediate nozzle row NL2 come into contact with each other. Meanwhile, as shown in FIG. 10, when the outer peripheral surfaces 15t of the nozzle walls 15a are arranged apart from each other, a partition wall 51 may be arranged between the nozzle walls 15a of the nozzles 15 adjacent in the circumferential direction. The partition wall 51 forms the channel wall 41 by connecting the nozzle walls 15a of the nozzles 15 arranged apart from each other. In particular, the partition wall 51 connects the nozzle walls 15a of the adjacent nozzles 15 among the plurality of nozzles 15 to each other such that at least a part of the outer peripheral surface 15t is exposed, and defines each heating channel in the flow direction of the heating medium together with the exposed outer peripheral surface 15t. With such a configuration, the outward channel 47 and the return channel 49 can be separated from each other by using the nozzle walls 15a of the intermediate nozzle row NL2, making it unnecessary to arrange continuous partition walls having a length exceeding the distance between the plurality of nozzles 15. Therefore, the structure of the die plate 100 can be simplified, the efficiency of channel arrangement in a limited space can be improved, and the number of nozzles 15 to arrange can be further increased. Note that even if the plurality of nozzles 15 is scatteredly arranged as described later, the partition wall 51 can form a continuous channel wall and channel by connecting adjacent nozzles to each other.

Next, a die plate 100 according to the second embodiment of the present disclosure will be described. FIG. 11 is a horizontal sectional view of a nozzle arrangement part 13 of the die plate 100 according to the present embodiment. FIG. 12 is a cross sectional view of the die plate 100 taken along the line XII-XII shown in FIG. 11. FIG. 13 is a cross sectional view of the die plate 100 taken along the line XIII-XIII shown in FIG. 11. FIG. 14 is a cross sectional view of the die plate 100 taken along the line XIV-XIV shown in FIG. 11. Note that in the present embodiment, differences from the above-described first embodiment will be mainly described, and description of common points will be omitted.

In the present embodiment as well, the die plate 100 includes a nozzle group including a plurality of nozzles 15 and a heating medium guidance part 20 each arranged in the nozzle arrangement part 13. The heating medium guidance part 20 includes an inlet 25A (reception port), an outlet 27A (discharge port) (FIG. 13), and a guidance wall 50. The guidance wall 50 defines a heating channel 29A1 (first sub-guidance part), a heating channel 29A2 (second sub-guidance part), and an up-and-down communicating channel 31 (communicating part). The heating channel 29A1, the heating channel 29A2, and the up-and-down communicating channel 31 are channels that cause the inlet 25A and the outlet 27A to be in communication with each other. The up-and-down communicating channel 31 (FIG. 13) causes the heating channel 29A1 and the heating channel 29A2 to be in communication with each other in the up-and-down direction.

As shown in FIG. 11, in the present embodiment as well, the nozzle group is arranged in a ring shape around a center line parallel to an axial direction ED. Nozzle rows of the plurality of nozzles 15 extending in the radial direction are arranged in four rows at intervals in the circumferential direction. Three nozzles 15 are arranged in each row such that outer peripheral surfaces 15t of nozzle walls 15a come into contact with each other. In other words, in the present embodiment, the plurality of nozzles 15 includes a plurality of contact nozzles (one aspect of connection nozzles) arranged such that the outer peripheral surfaces 15t of the nozzle walls 15a come into contact with each other. At least a part of the heating channels 29A1 and 29A2 is defined by the outer peripheral surfaces 15t of the plurality of contact nozzles.

Note that in the present embodiment, a plurality of nozzle groups and heating medium guidance parts 20 shown in FIG. 11 are arranged in the circumferential direction of the die plate 100. When one set of nozzle group and heating medium guidance part 20 occupies a range of 22.5 degrees in the circumferential direction as in FIG. 11, 16 nozzle groups and heating medium guidance parts 20 can be arranged in the circumferential direction.

As described above, the guidance wall 50 defines each heating channel through which the heating medium flows together with the outer peripheral surfaces 15t of the plurality of nozzles 15. The guidance wall 50 guides the heating medium such that the heating medium flowing in from the inlet 25A comes into contact with the outer peripheral surfaces 15t of the plurality of nozzles 15 in a flow direction crossing the axial direction ED and then the heating medium is discharged from the outlet 27A. In particular, in the present embodiment, the guidance wall 50 defines the heating channels 29A1 and 29A2 in the radial direction together with the outer peripheral surfaces 15t of the plurality of nozzles 15 such that the heating medium moves in the radial direction of the nozzle group while coming into contact with the outer peripheral surfaces 15t of the plurality of nozzles 15.

In the present embodiment, the guidance wall 50 includes a plurality of channel walls 55 (FIG. 11), a top wall 53 (base wall), a bottom wall 54 (base wall), and a partition part 24 (base wall).

The plurality of channel walls 55 defines the heating channel 29A1 and the heating channel 29A2 in the flow direction of the heating medium. In the present embodiment, the plurality of channel walls 55 includes a part of the nozzle arrangement part 13.

The top wall 53 defines an upper surface portion (ceiling portion) of the heating channel 29A1 in the range from the inlet 25A to the up-and-down communicating channel 31. The bottom wall 54 defines a lower surface portion (bottom portion) of the heating channel 29A2 in the range from the up-and-down communicating channel 31 to the outlet 27A. The partition part 24 defines a lower surface portion of the heating channel 29A1 and an upper surface portion of the heating channel 29A2. The plurality of base walls has a function of partitioning both side portions (upper and lower portions in FIGS. 13 and 14) of the axial direction ED of the heating channel 29A1 and the heating channel 29A2. Meanwhile, the nozzle walls 15a of the plurality of nozzles 15 connect the plurality of base walls to each other in the axial direction ED to isolate each nozzle hole 15b (resin channel) from the heating channel 29A1 and the heating channel 29A2. In the present embodiment, the plurality of base walls also includes a part of the nozzle arrangement part 13. At least some of the channel walls 55 extends in the flow direction, are arranged opposite the nozzle walls 15a of the plurality of nozzles 15 in a direction crossing the axial direction ED, and connects the plurality of base walls to each other in the axial direction ED.

The up-and-down communicating channel 31 causes the heating channel 29A1 and the heating channel 29A2 to be in communication with each other, as shown in FIG. 13. The heating medium flowing in from the inlet 25A is split into three flows as shown in FIG. 11, comes into contact with the outer peripheral surface 15t on the discharge part 15f (discharge side outer peripheral surface) (FIG. 14) side of the nozzle walls 15a of the plurality of nozzles 15, and then reaches the up-and-down communicating channel 31. Then, as shown in FIG. 13, the heating medium flows into the heating channel 29A2 through the up-and-down communicating channel 31. Furthermore, the heating medium comes into contact with the outer peripheral surface 15t on the opposite side of the discharge part 15f (upstream side outer peripheral surface) of the nozzle walls 15a of the plurality of nozzles 15, and is then discharged from the outlet 27A.

In this way, in the present embodiment as well, the outer peripheral surface 15t of each of the plurality of nozzles 15 defines a part of the heating channel 29A1 and the heating channel 29A2. Therefore, heat is reliably and stably transferred from the heating medium flowing through each heating channel to the nozzle wall 15a of each nozzle 15, and the temperature rise performance of each nozzle 15 can be improved. The temperature difference between the plurality of nozzles 15 can also be reduced. Then, molten resin flowing into a resin supply port 100S of FIG. 12 in an arrow DS direction is extruded from the discharge part 15f of each nozzle 15 (FIG. 4) and formed into pellets as described above.

In the present embodiment as well, the heating medium flowing into the heating channel 29A1 of the heating medium guidance part 20 first comes into contact with the outer peripheral surface 15t on the discharge part 15f side for heating. Therefore, in a similar manner to the above-described first embodiment, the nozzle walls 15a on the resin injection side can be heated while supplementing the heat removal from a top surface 13a side of the die plate 100. The heating medium flowing through the heating channel 29A1 flows into the heating channel 29A2 via the up-and-down communicating channel 31, thereby further heating the outer peripheral surface 15t on the resin entry side of the plurality of nozzles 15.

Note that the present embodiment has described an aspect as shown in FIG. 11 in which the outer peripheral surfaces 15t of the nozzle walls 15a of the adjacent nozzles 15 come into contact with each other to form a part of the heating channel 29A1 and the heating channel 29A2. However, the present embodiment may be an aspect in which the heating medium guidance part 20 includes the partition wall 51, as in an intermediate nozzle row NL2 of FIG. 10. In this case, the partition wall 51 is required at least to connect the nozzle walls 15a of the adjacent nozzles 15 to each other such that at least a part of the outer peripheral surface 15t is exposed. In this case as well, the partition wall 51 can promote the inflow of heat from the heating medium to the nozzle walls 15a by defining each heating channel in the flow direction together with the exposed outer peripheral surface 15t.

In the present embodiment as well, the heating channel 29A1 and the heating channel 29A2 are arranged in two stages so as to overlap each other in the axial direction ED. In particular, when viewed in the axial direction ED, the inlet 25A and the inlet 25B are arranged so as to overlap each other, making it possible to reduce dead space in the nozzle arrangement part 13 of the die plate 100.

Furthermore, in the inner two nozzle rows out of the four nozzle rows shown in FIG. 11, as in an outer diameter side nozzle row NL1 and an inner diameter side nozzle row NL3 of FIG. 10, the plurality of nozzles 15 (independent nozzles) in which the outer peripheral surfaces 15t of the nozzle walls 15a are arranged independently of each other may be provided.

<Nozzle Arrangement>

Figure 15:
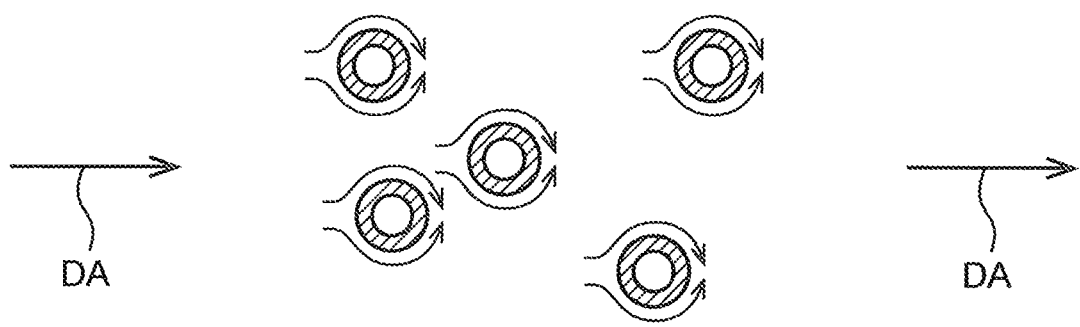
FIG. 15 is a horizontal sectional view showing another example of nozzle arrangement.
Figure 16:
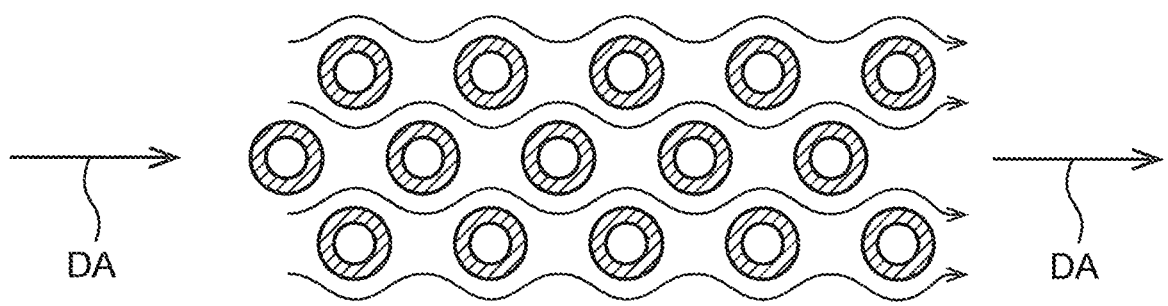
FIG. 16 is a horizontal sectional view showing another example of nozzle arrangement.

FIGS. 15 to 20 show modifications of the arrangement of the plurality of nozzles 15 shown in each of the above-described embodiments. As shown in FIG. 15, the plurality of nozzles 15 that defines a part of each heating channel may be arranged discretely (random arrangement) and receive heat from the heating medium flowing in a flow direction DA. Furthermore, as shown in FIG. 16, all of the plurality of nozzles 15 may be regularly arranged at intervals (regular arrangement). In this case, a channel wall (guidance wall) that determines the flow direction of the heating medium is preferably arranged around the plurality of nozzles 15.

Figure 17:
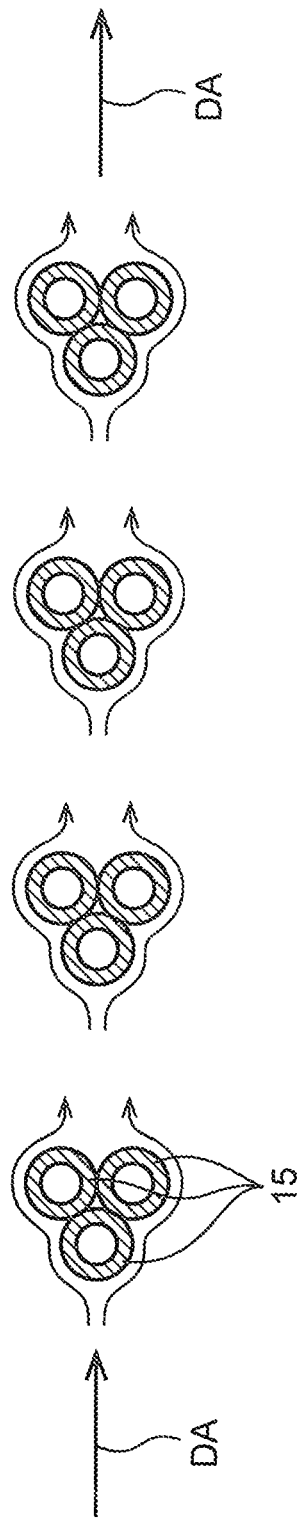
FIG. 17 is a horizontal sectional view showing another example of nozzle arrangement.
Figure 18:
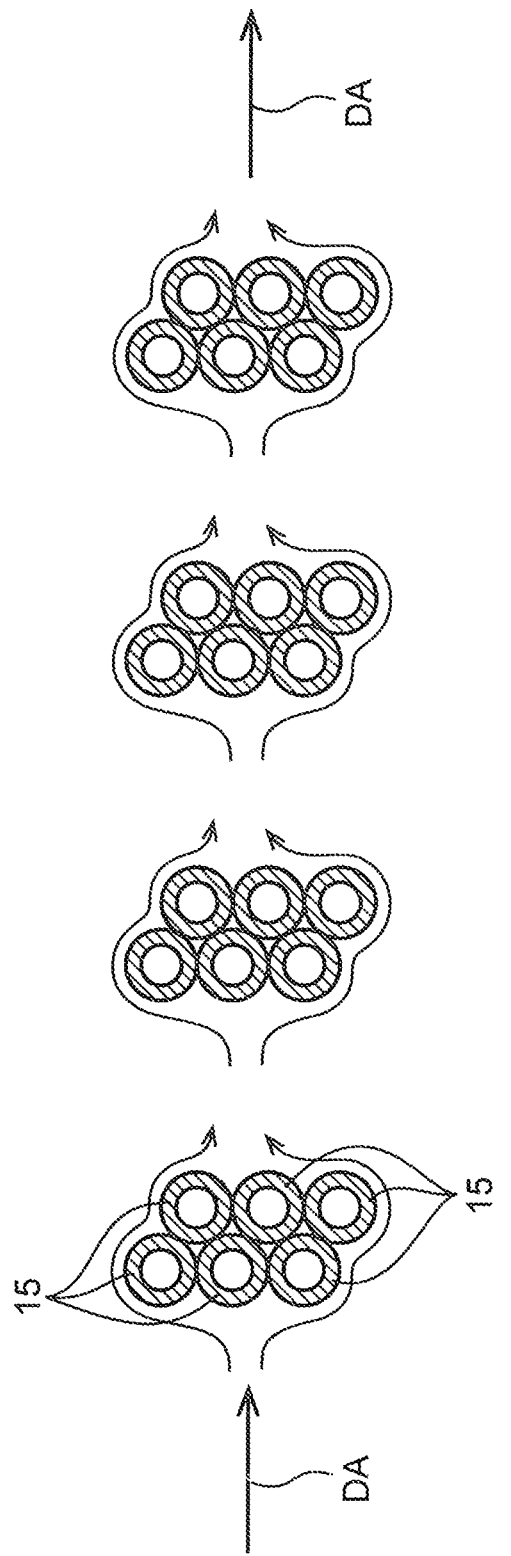
FIG. 18 is a horizontal sectional view showing another example of nozzle arrangement.
Figure 19:
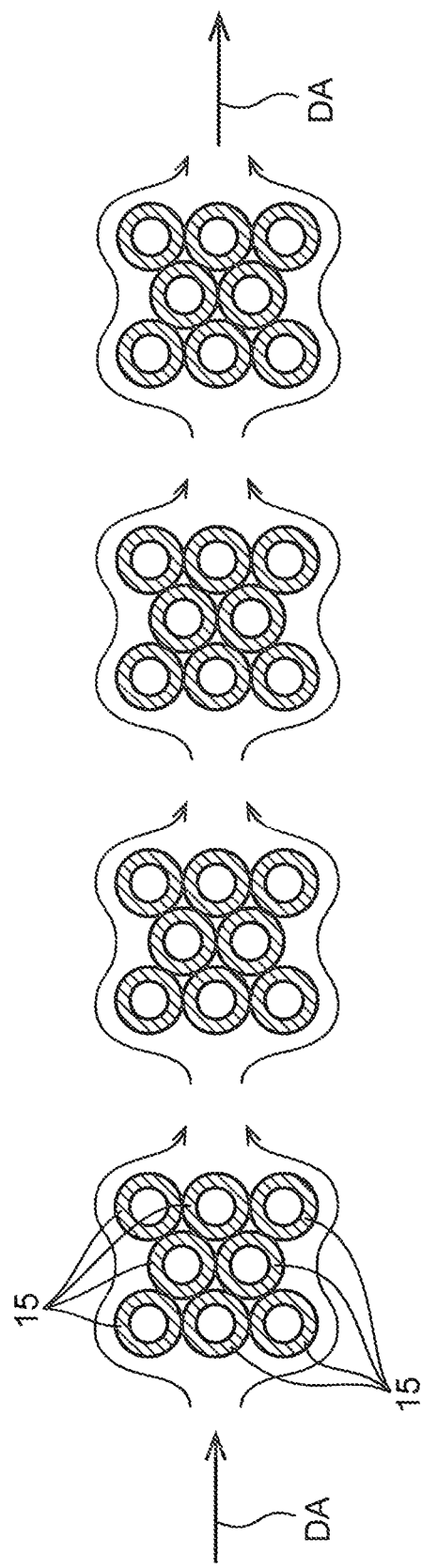
FIG. 19 is a horizontal sectional view showing another example of nozzle arrangement.

The plurality of nozzles 15 may be arranged in close contact with each other as shown in FIGS. 17, 18, and 19. The nozzles 15 are preferably arranged such that the density of the nozzles per unit area is high. However, in this case as well, at least a part of the outer peripheral surface 15t of each nozzle 15 is arranged so as to be exposed to the heating channel, thereby making it possible to reduce the temperature difference between the nozzles 15 and maintain the temperature rise performance.

Figure 20:
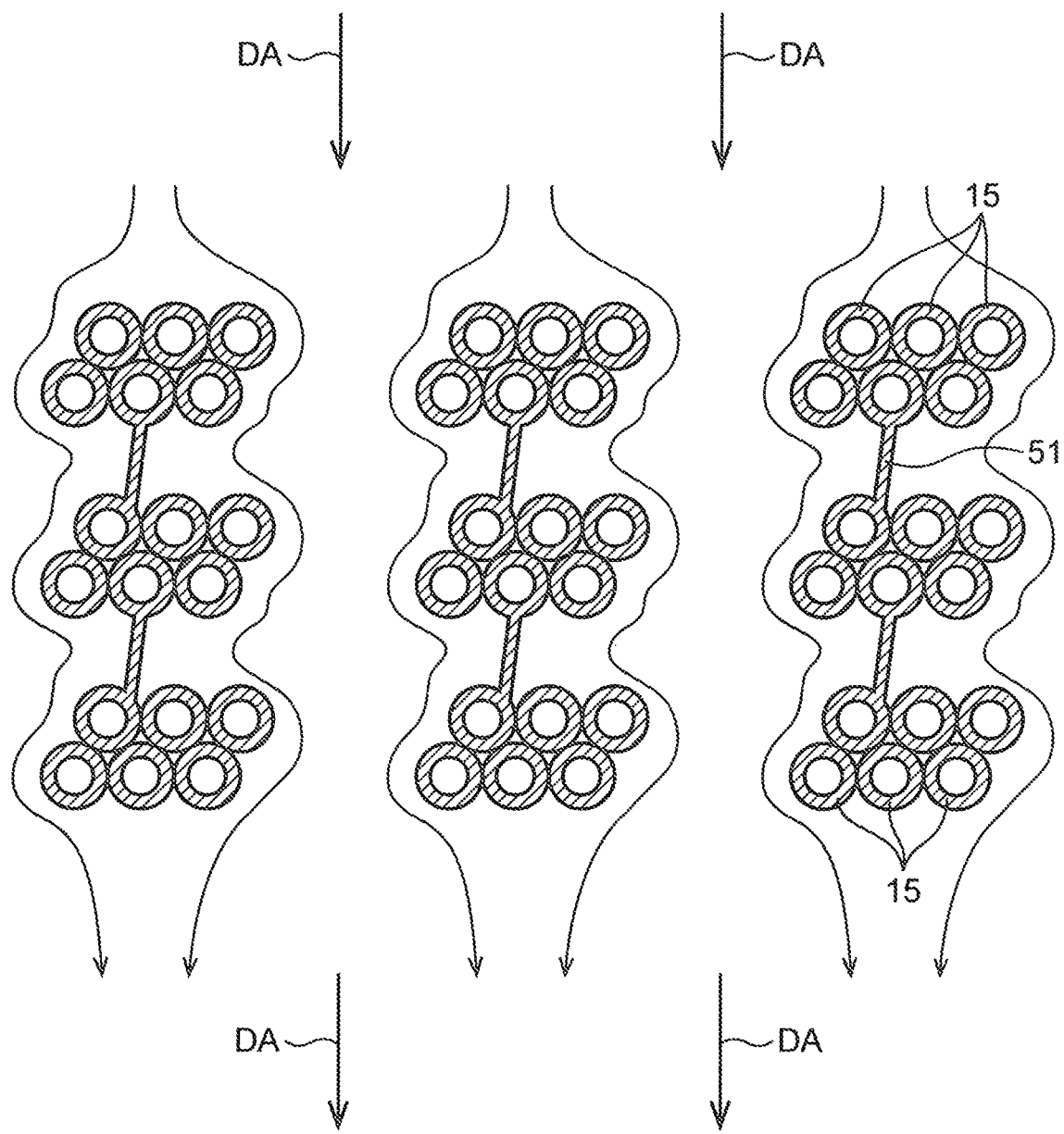
FIG. 20 is a horizontal sectional view showing another example of nozzle arrangement.

As shown in FIG. 20, the flow direction DA of the heating medium may be determined by connecting groups in each of which the plurality of nozzles 15 is in close contact with each other by the partition wall 51. In this case, the nozzle walls 15a of the plurality of nozzles 15 can function as a baffle.

<Nozzle Shape>

Figure 21A:
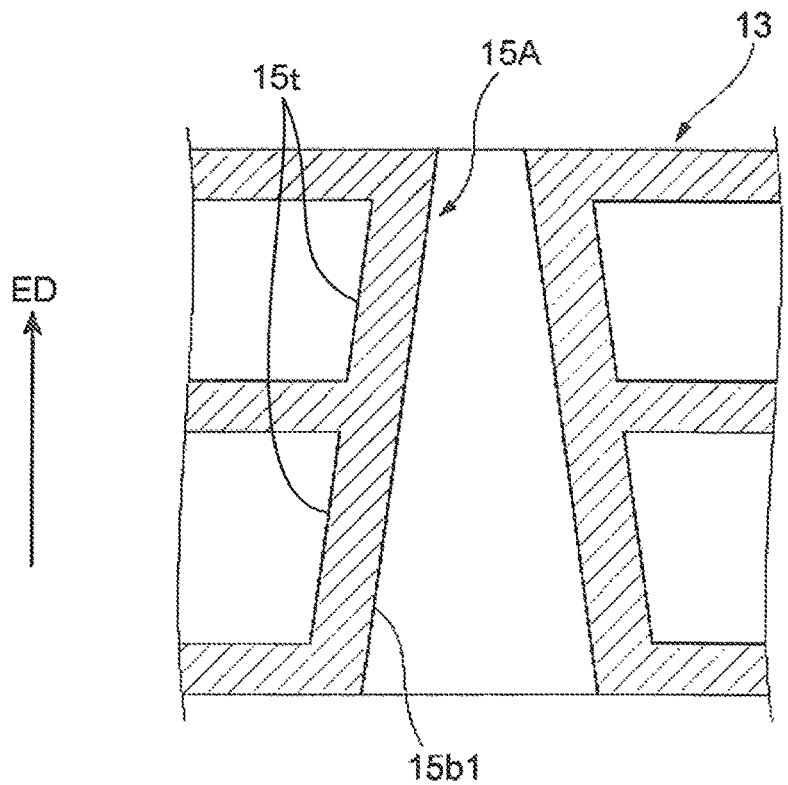
FIG. 21A is a cross sectional view of the nozzle showing another example of the nozzle shape.
Figure 21B:
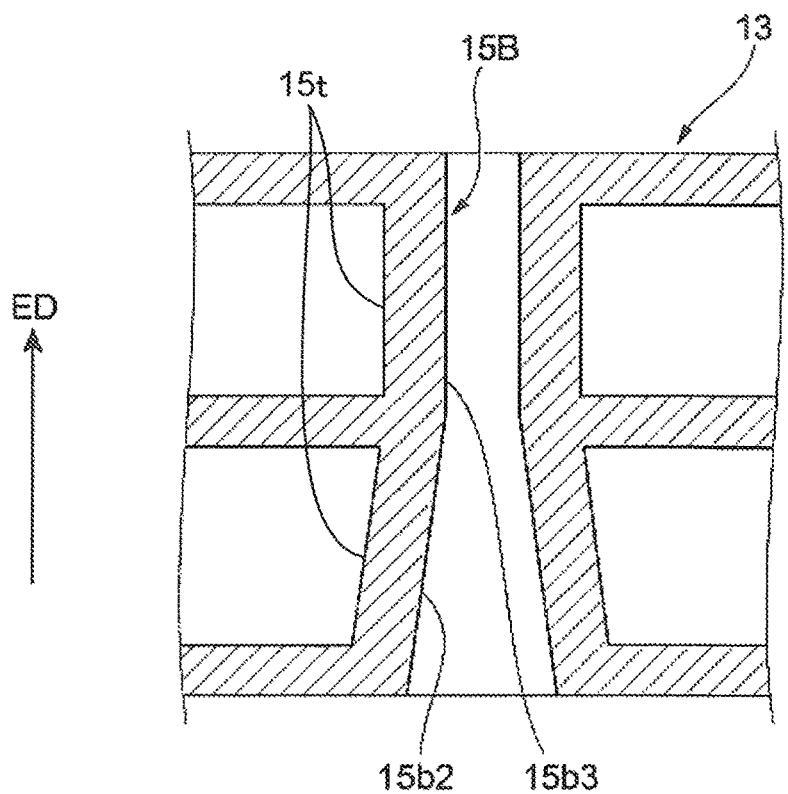
FIG. 21B is a cross sectional view of the nozzle showing another example of the nozzle shape.

The shape of the nozzle 15 provided in the die plate 100 is not limited to the nozzle hole 15b having a constant diameter, and can be changed to various forms. FIGS. 21A and 21B are cross sectional views of the nozzle showing another example of the nozzle shape. Like a nozzle 15A shown in FIG. 21A, a nozzle hole 15b1 may have a conical surface that tapers off toward the resin injection side. In this case, the injection speed of the molten resin at the nozzle tip can be increased, and the resin can be injected more stably.

Like a nozzle 15B shown in FIG. 21B, a nozzle hole 15b2 that tapers off toward the resin injection side and a nozzle hole 15b3 having a constant diameter may be connected in this order toward the resin injection side in a two-stage structure. In this case, the resin flow is stabilized while increasing the injection speed of the molten resin, and thus the variation in the shape of the resin pellet to be granulated is small.

Note that in FIGS. 21A and 21B, the flow of the molten resin may be set in a direction opposite to the arrow ED. In this way, by setting a large cross-sectional area of the molten resin exit (discharge part), even if the resin with low viscosity solidifies in the discharge part, the pressure from the upstream side makes it possible to extrude the solidified resin along the inclination (taper) of the nozzle.

The cross-sectional shape of the nozzle wall 15a of each nozzle 15 is not limited to a circular shape, but may be another cross-sectional shape such as a polygonal shape. In this case as well, because of the arrangement of the outer peripheral surface 15t along the inner peripheral surface 15s of the nozzle wall 15a, the nozzle wall 15a of the nozzle 15 can be stably heated by the heat transferred from the heating medium to the outer peripheral surface 15t.

As described above, in the die plate 100 according to the first embodiment of the present disclosure, a first heating medium channel 21 and a second heating medium channel 23 are arranged in the circumferential direction and overlap each other in the axial direction ED of the nozzles 15. However, the arrangement of the heating channels is not limited to this example, and various forms can be adopted. Various arrangement forms of the heating channels will be described below.

<Modifications of Heating Channel>

FIGS. 22 to 30 are schematic diagrams showing modifications of the heating channel according to the above-described first embodiment. Although detailed illustrations are omitted, it is assumed that the nozzles are arranged in the circumferential direction in all the cases. Note that dotted lines shown in FIGS. 22 to 30 represent the nozzle arrangement part 13 of the die plate 100. The heating channels are formed inside the nozzle arrangement part 13, such as the heating channels 29A1, 29A2, 29B1, and 29B2 described above. An inlet and an outlet (not shown) are provided at channel ends in a similar manner to the inlets 25A and 25B and outlets 27A and 27B described above.

Figure 22:
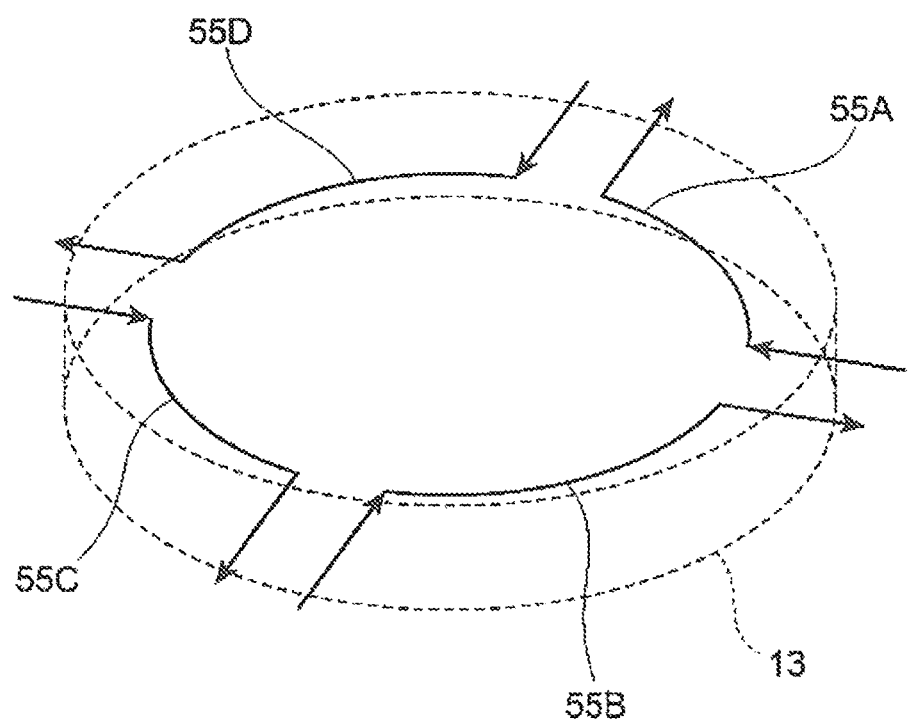
FIG. 22 is a schematic diagram showing a modification of the heating channel.

Heating channels 55A, 55B, 55C, and 55D shown in FIG. 22 are single-layer channels with respect to the nozzle axial direction, and are divided into a plurality of regions in the circumferential direction. Here, the heating channels 55A, 55B, 55C, and 55D divided into four equally spaced channels in the circumferential direction are shown, but the number of divisions is arbitrary, and the heating channels may be equally or unequally spaced.

In this way, since the heating channels 55A, 55B, 55C, and 55D are arranged in the circumferential direction, the heating medium flows in the arrangement direction of the nozzles (not shown) to efficiently heat a large number of nozzles. Moreover, since the heating medium flows into each of the plurality of independent heating channels, the heat input amount can be increased to improve the temperature rise performance.

Figure 23:
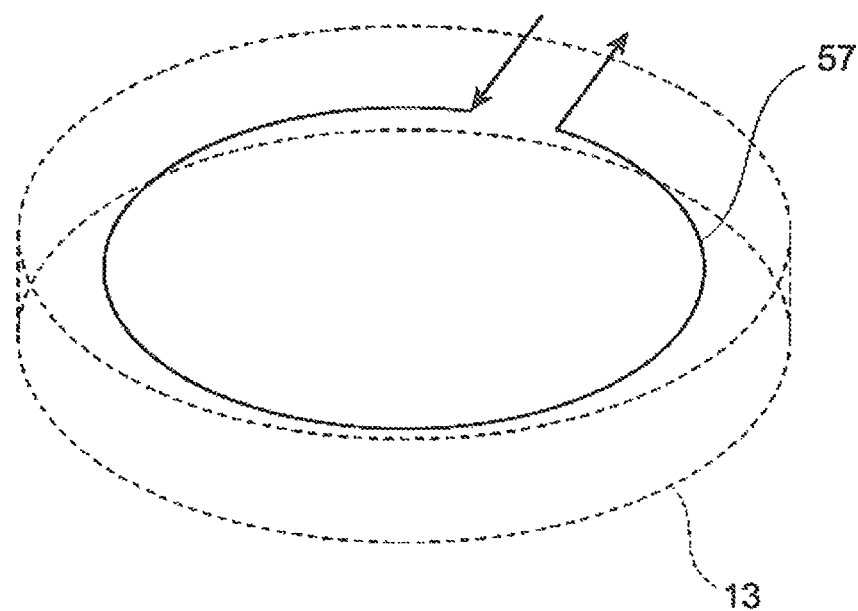
FIG. 23 is a schematic diagram showing a modification of the heating channel.

A heating channel 57 shown in FIG. 23 is a single-layer, one continuous ring-shaped channel, and is arranged in the entire circumferential region where the plurality of nozzles (not shown) is provided. With this heating channel 57, the flow rate of the heating channel 57 can be kept constant regardless of the location because there is no branching in the channel. By keeping the cross-sectional area of the channel constant, the flow speed can be maintained at a constant level, and the temperature rise performance of each nozzle 15 can be made uniform. Since the heating channel 57 is arranged in the entire circumferential region in the arrangement region of the nozzles, all the nozzles can be efficiently heated and the temperature unevenness can be reduced.

Figure 24:
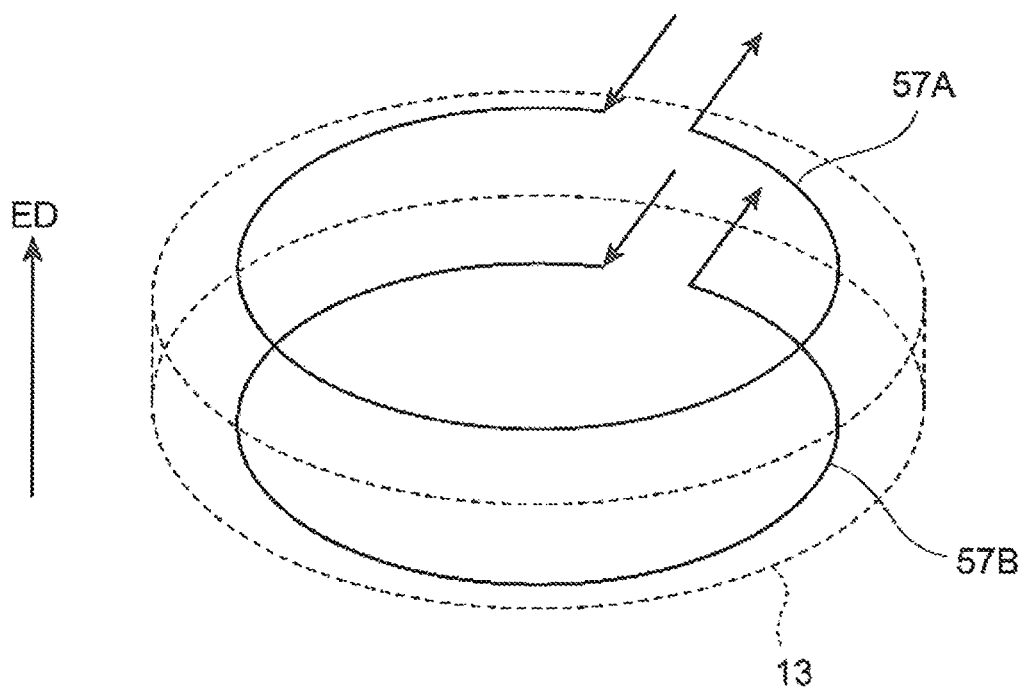
FIG. 24 is a schematic diagram showing a modification of the heating channel.
Figure 25:
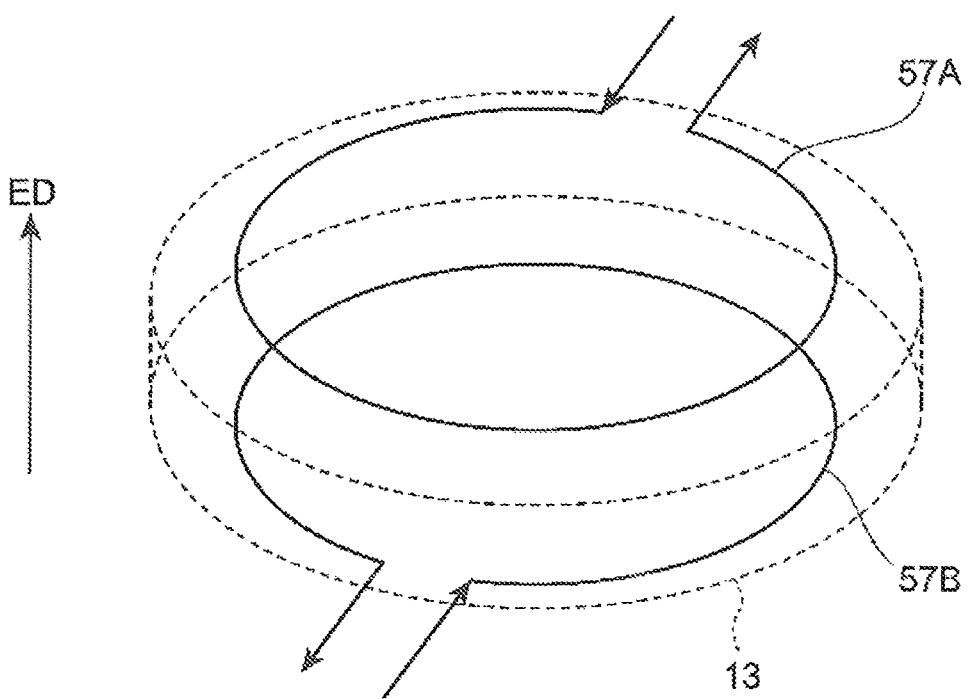
FIG. 25 is a schematic diagram showing a modification of the heating channel.

As shown in FIG. 24, two-stage heating channels 57A and 57B, which overlap each other in the axial direction ED of the nozzles 15, may be arranged. This allows the heat input amount to be increased to improve the temperature rise performance, and also improves the temperature uniformity in the axial direction ED. Furthermore, as shown in FIG. 25, the inlets and outlets of the two-stage heating channels 57A and 57B may be arranged opposite each other across the ring center of the heating channels 57A, 57B (ring center of the ring-shaped nozzle group). In this case, interference in the inlets and the outlets in the axial direction ED can be prevented, and the die plate 100 can be made thinner. In FIG. 25, the inlet and outlet of the heating channel 57A are arranged at positions 180° inverted with respect to the inlet and outlet of the heating channel 57B, but may be arranged at positions that are circumferentially out of phase at an arbitrary angle.

Heating media of temperatures different from each other may flow through the heating channels 57A and 57B shown in FIGS. 24 and 25. For example, by causing the heating medium at a higher temperature to flow through the heating channel 57A on the resin injection side than through the heating channel 57B on the resin entry side, the heat input on the side near the top surface 13a of the die plate 100 (see FIG. 1), which is exposed to water and susceptible to heat removal, can be increased. This makes it possible to make the temperature distribution of the die plate 100 more uniform and to prevent the resin from sticking due to heat removal by water.

Figure 26:
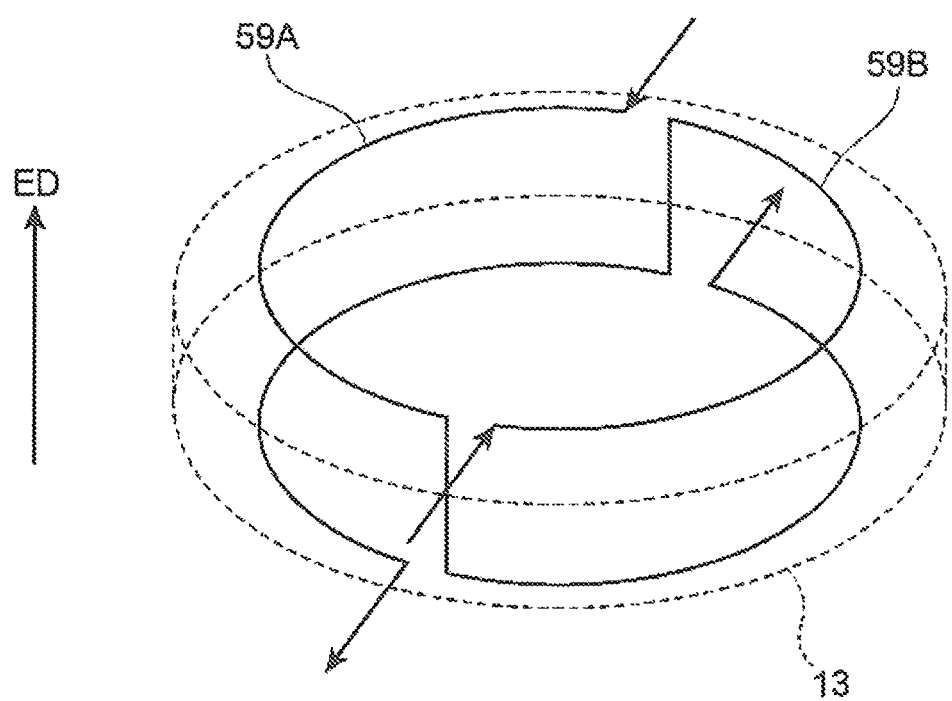
FIG. 26 is a schematic diagram showing a modification of the heating channel.

In heating channels 59A and 59B shown in FIG. 26, positions of the channels in the axial direction ED are switched with each other every semicircle of the ring-shaped channel. That is, the heating channel 59A has a semicircle channel on the resin injection side of the nozzles, and the remaining semicircle channel is arranged on the resin entry side of the nozzles. The heating channel 59B similarly has a semicircle channel on the resin injection side of the nozzles, and the remaining semicircle channel is arranged on the resin entry side of the nozzles. The position of the heating channel 59B in the axial direction ED is switched at the position where the position of the heating channel 59A in the axial direction ED is switched.

With the heating channels 59A and 59B, the heated heating medium is first supplied to the resin injection side portion of the nozzles, and thus the heat input into the resin injection side can be increased more than on the resin entry side. In this way, the heat input distribution in the axial direction ED can be arbitrarily adjusted.

Figure 27:
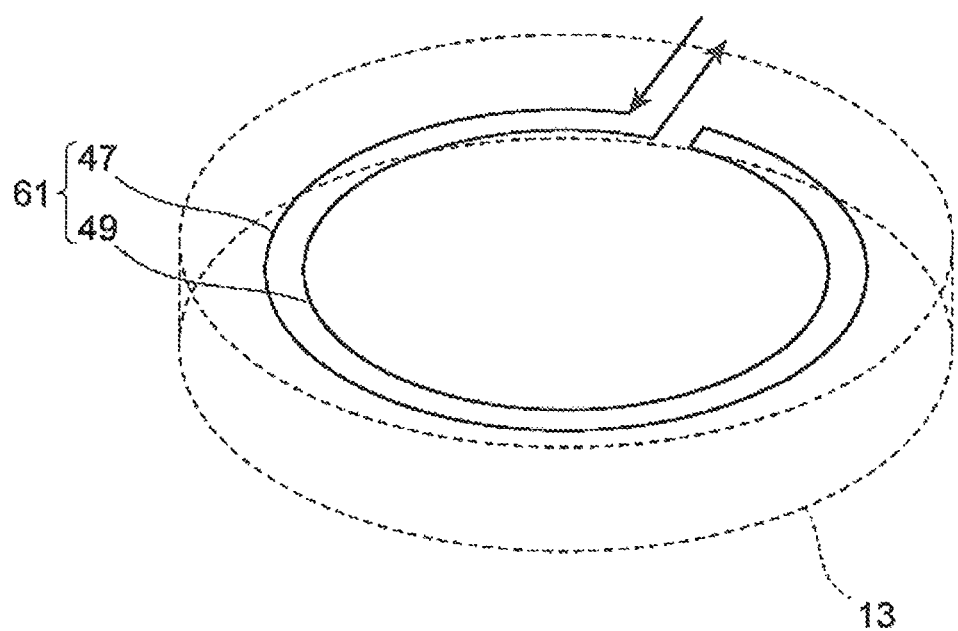
FIG. 27 is a schematic diagram showing a modification of the heating channel.

A heating channel 61 shown in FIG. 27 is a single-layer, one continuous ring-shaped channel. The heating channel 61 includes an outward channel 47 extending in the circumferential direction, and a return channel 49 obtained by, after the outward channel 47 extends in a ring-shaped manner for substantially one round, turning back at the forward end of the channel and extending in the opposite direction of the circumferential direction along the outward channel 47. With the heating channel 61, the heating range in the radial direction increases and more uniform temperature distribution is obtained because dual channels are formed in the radial direction.

Figure 28:
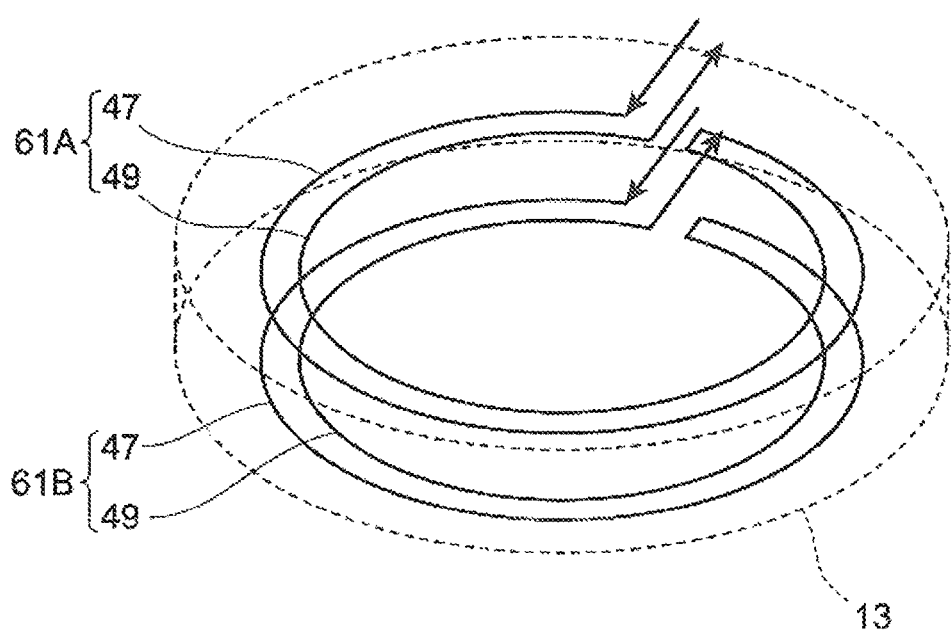
FIG. 28 is a schematic diagram showing a modification of the heating channel.
Figure 29:
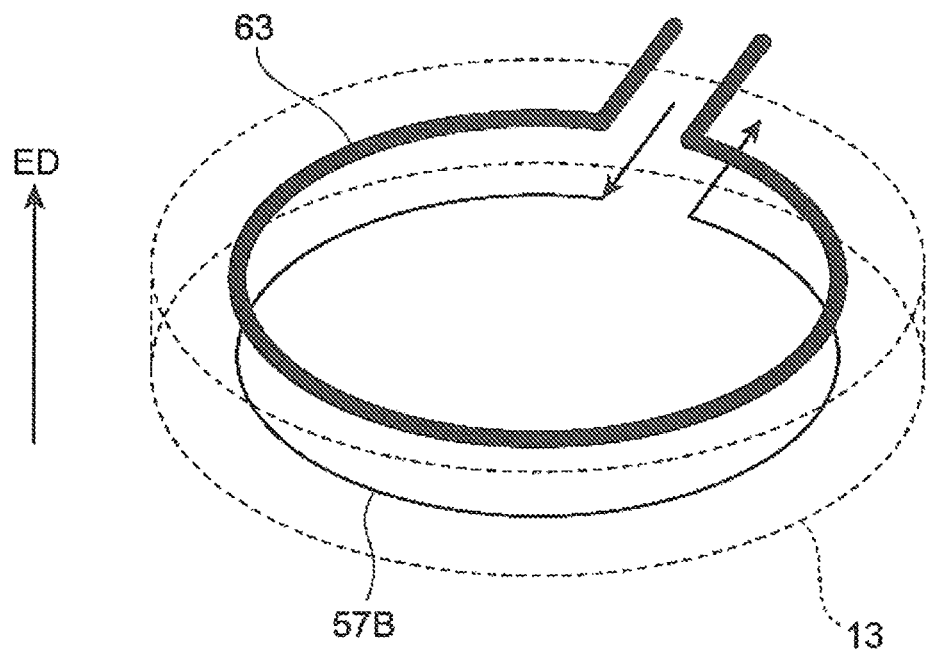
FIG. 29 is a schematic diagram showing a modification of the heating channel.

As shown in FIG. 28, two-stage heating channels 61A and 61B that overlap each other in the axial direction ED may be provided. This allows the heat input amount to be increased to improve the temperature rise performance, and also improves the temperature uniformity in the axial direction ED.

Note that the forms of the heating channels in FIGS. 22 to 28 can be combined with each other. For example, each of the heating channels 55A, 55B, 55C, and 55D divided into four sections shown in FIG. 22 may include the outward channel 47 and the return channel 49 shown in FIG. 27, or may have a multi-stage structure in the axial direction ED as shown in FIGS. 24 to 26 and 28.

As the channel on the resin injection side out of the heating channels 57A and 57B arranged in multiple stages in the axial direction ED shown in FIG. 24, a heat-insulating cavity with the channel filled with air may be provided instead of a heating channel. In the heating channel shown in FIG. 29, a heat-insulating cavity 63 is arranged in the channel portion on one side of the axial direction ED. In this case, the heat-insulating cavity 63 arranged on the resin injection side suppresses heat removal from the side of the die plate 100 that is close to the surface exposed to water. This allows the temperature distribution of the die plate 100 to be more uniform. The heat-insulating cavity 63 can be set appropriately according to the required heat-insulating effect, such as air sealed configuration, air circulating configuration, and configuration of causing air at constant temperature to flow.

Figure 30:
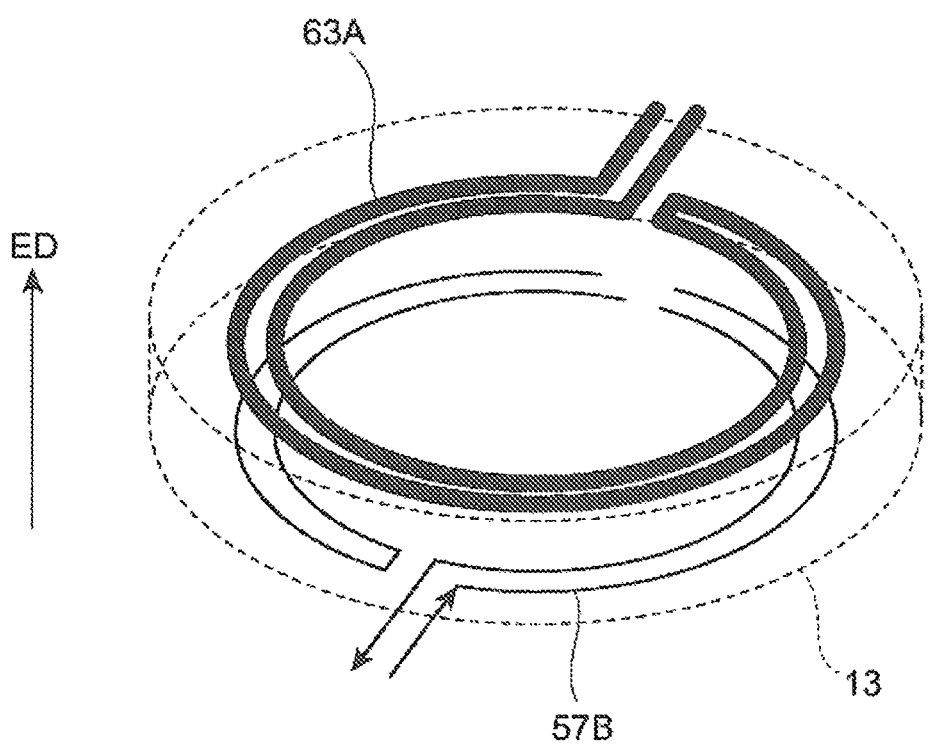
FIG. 30 is a schematic diagram showing a modification of the heating channel.

In addition to being similar in shape to the heating channel 57A shown in FIG. 24, the heat-insulating cavity 63 may be one ring-shaped cavity with no inlet or outlet. Furthermore, as shown in FIG. 30, the arrangement of the heat-insulating cavity 63A with the outward channel and the return channel can increase the insulation width in the radial direction and improve the heat-insulating effect. Note that the above-described form of the heat-insulating cavity 63 is one example, and the shape thereof is arbitrary as long as the heat-insulating effect is obtained.

Note that in the above-described first embodiment, instead of either one of the first heating medium channel 21 or the second heating medium channel 23, a heat-insulating cavity with the channel filled with air as described above may be arranged.

FIGS. 31 to 44 are schematic diagrams showing modifications of the heating channel according to the above-described second embodiment. Although detailed illustrations are omitted, it is assumed that the nozzles are arranged in the radial direction in all the cases. Note that disc-shaped dotted lines shown in some of the figures represent the nozzle arrangement part 13 of the die plate 100. The heating channels are formed inside the nozzle arrangement part 13, such as the heating channels 29A1 and 29A2 of the second embodiment described above. An inlet and an outlet are provided at channel ends. In each of the following figures, heating channels provided in a part of the circumferential direction will be described, but similar heating channels are arranged in other parts of the circumferential direction.

Figure 31:
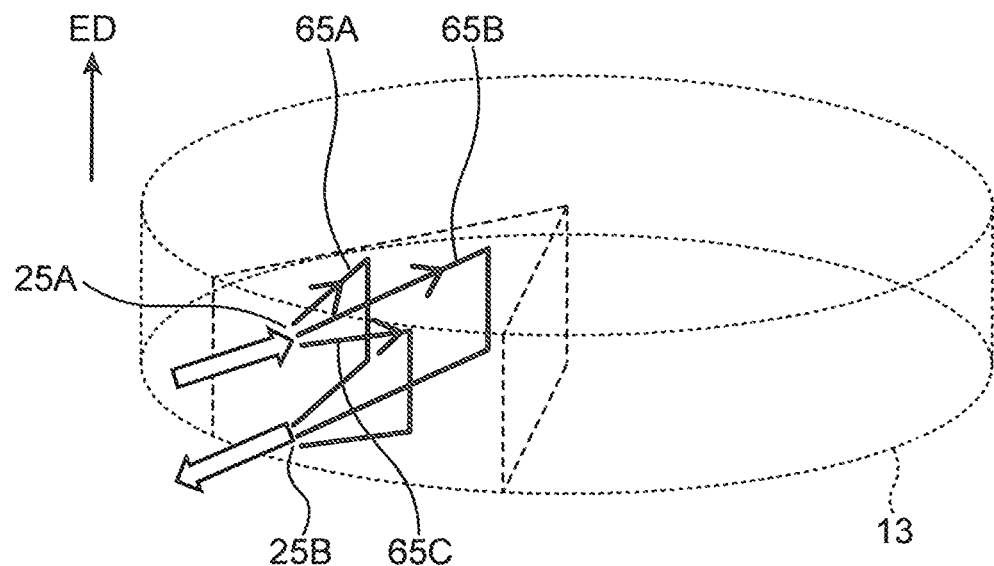
FIG. 31 is a schematic diagram showing a modification of the heating channel.

In FIG. 31, the heating medium flowing in from the inlet 25A is split radially inside into three heating channels 65A, 65B, and 65C. Each heating medium moves downward via a communicating channel (not shown), flows radially outside, merges again, and is discharged from the outlet 25B (two-stage system with one entrance and one exit radially outside). In the present modification, the inlet 25A and the inlet 25B are arranged so as to overlap each other when viewed in the axial direction ED.

Figure 32:
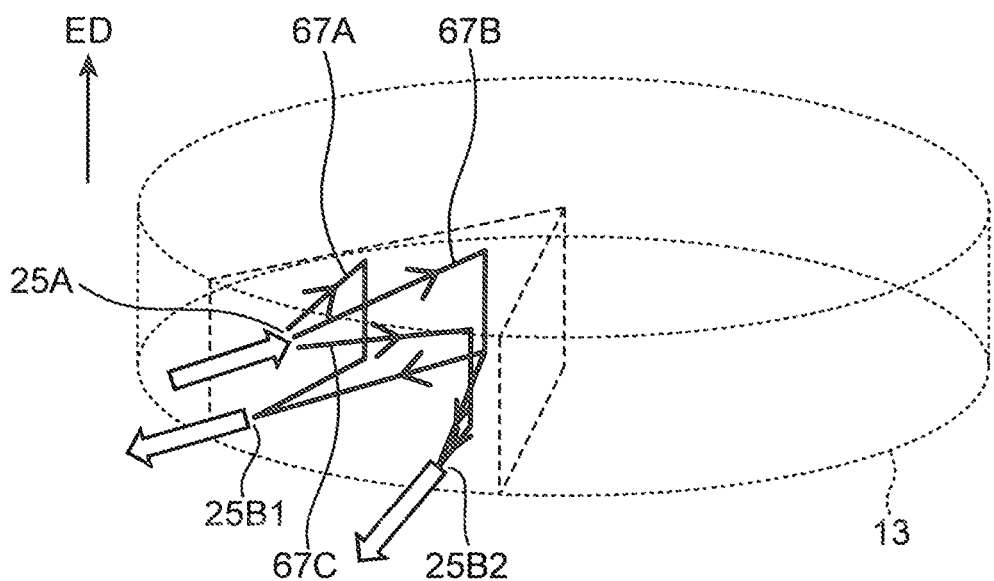
FIG. 32 is a schematic diagram showing a modification of the heating channel.

In FIG. 32, the heating medium flowing in from the inlet 25A is split radially inside into three heating channels 67A, 67B, and 67C. Each heating medium moves downward via a communicating channel (not shown). Only the heating medium flowing through the heating channel 67B is split into two heating channels. The two heating media flow radially outside, merge with the heating media flowing through the heating channels 67A and 67C, and then are discharged from the outlets 25B1 and 25B2 (two-stage system with one entrance and two exits radially outside).

Figure 33:
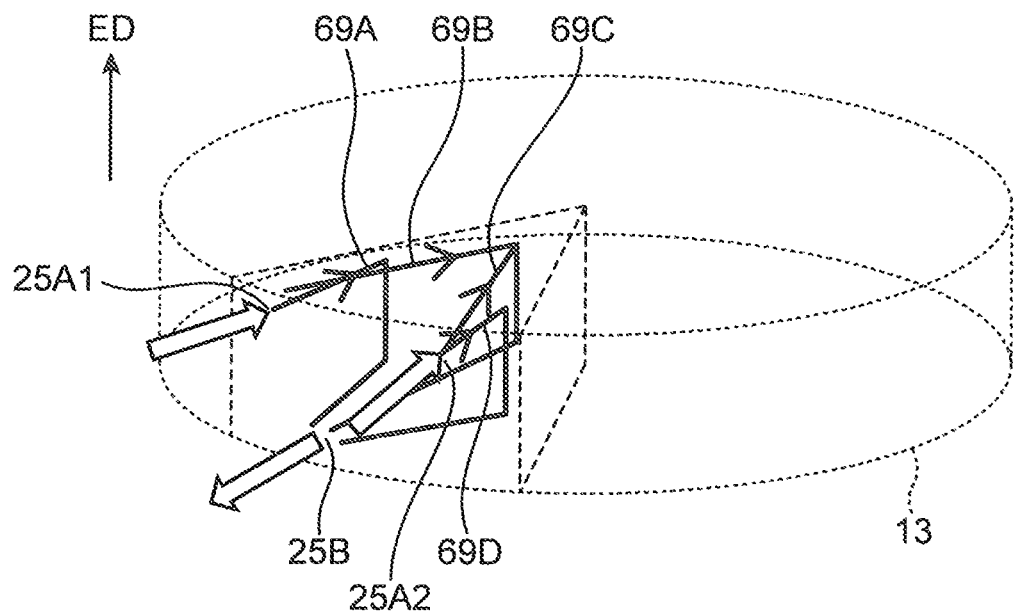
FIG. 33 is a schematic diagram showing a modification of the heating channel.

In FIG. 33, the heating media flowing in from two inlets 25A1 and 25A2 are each split into two heating channels. Of these heating media, the heating media flowing through two heating channels 69B and 69C circumferentially inside merge at the radially inner portion and move downward. Meanwhile, the heating media flowing through two heating channels 69A and 69D circumferentially outside each also move downward, flow radially outside, merge with the heating media described above, and are discharged from the outlet 25B (two-stage system with two entrances and one exit radially outside).

Figure 34:
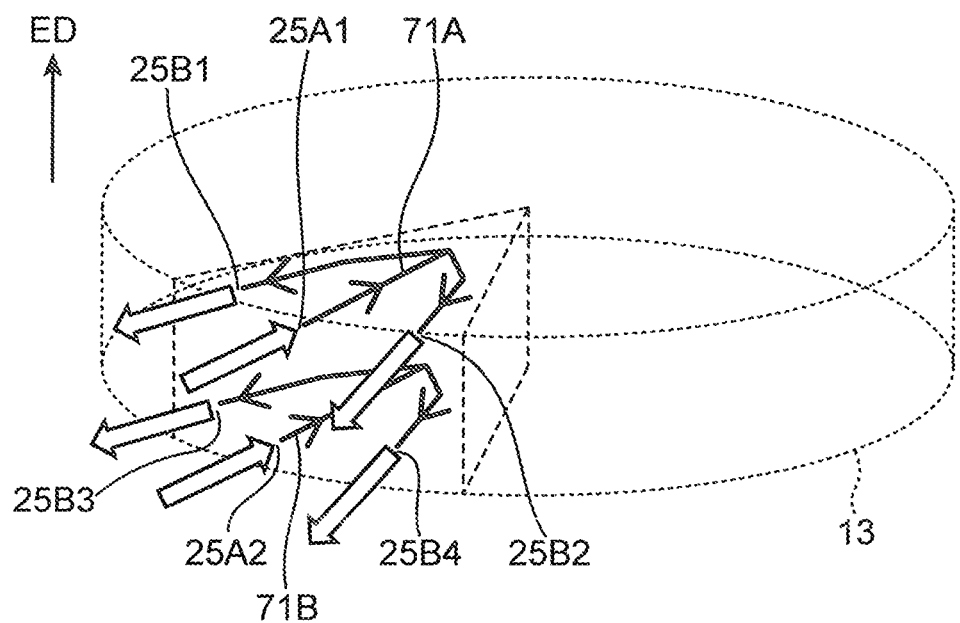
FIG. 34 is a schematic diagram showing a modification of the heating channel.

In FIG. 34, vertically independent heating channels are formed. In the upper stage, the heating medium flowing in from the inlet 25A1 into the heating channel 71A is split into two flows radially inside. The heating media each flow radially outside through circumferentially outer portions, and then are discharged from outlets 25B1 and 25B2. Similarly, in the lower stage, the heating medium flowing in from the inlet 25A2 into the heating channel 71B is split into two flows radially inside. The heating media each flow radially outside through circumferentially outer portions, and then are discharged from outlets 25B3 and 25B4 (two-stage system with two entrances and four exits radially outside).

Figure 35:
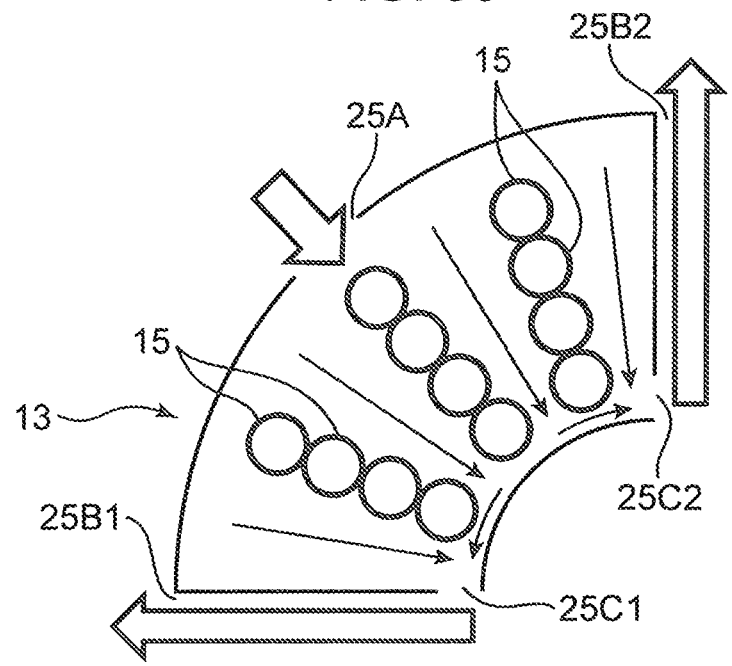
FIG. 35 is a schematic diagram showing a modification of the heating channel.
Figure 36:
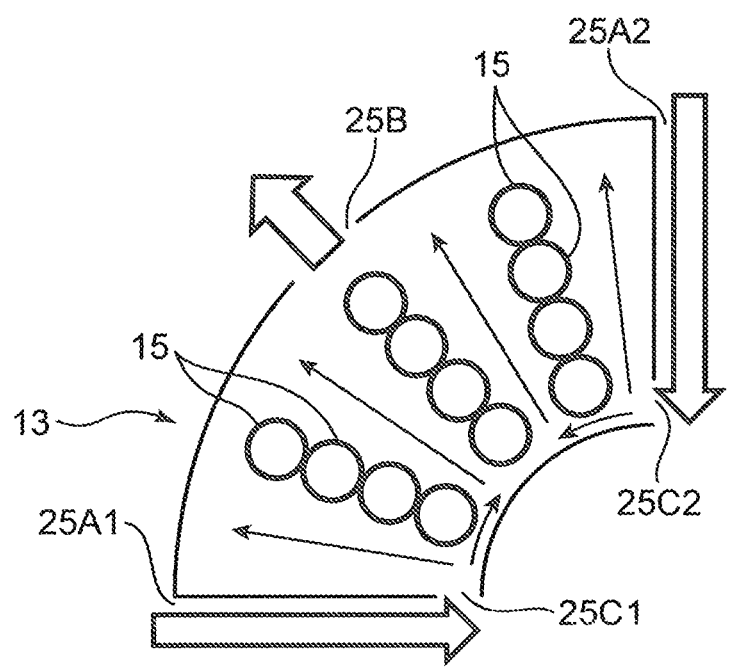
FIG. 36 is a schematic diagram showing a modification of the heating channel.
Figure 37:
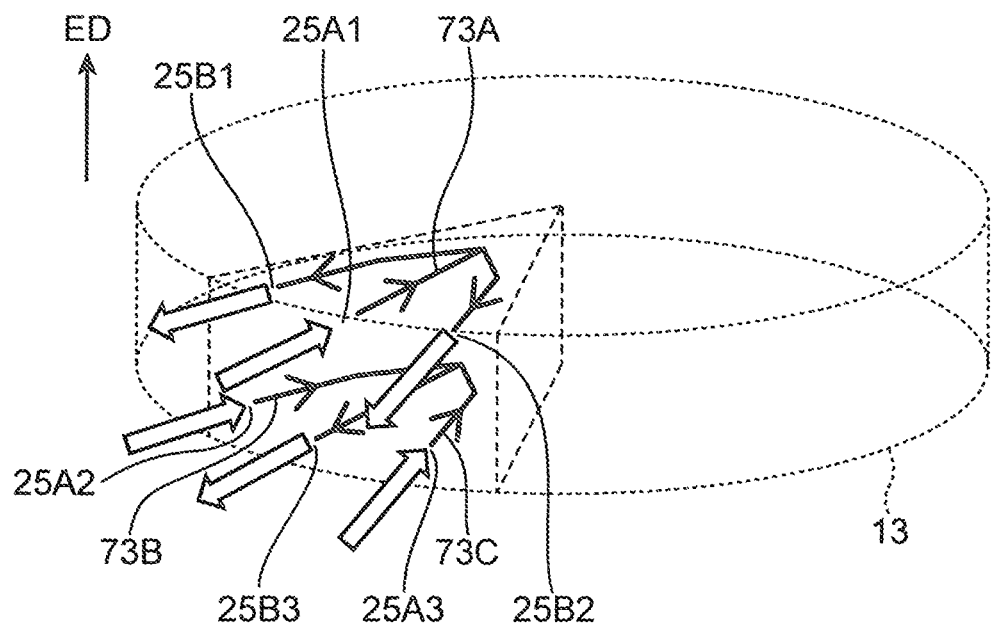
FIG. 37 is a schematic diagram showing a modification of the heating channel.

FIGS. 35 and 36 schematically show horizontal cross-sectional views of the nozzle arrangement part 13 according to the modifications. In FIG. 35, the heating medium flowing in from the inlet 25A proceeds radially inside among three rows of nozzles and outside thereof, moves further circumferentially outside from apertures 25C1 and 25C2, flows radially outside, and is discharged from the outlets 25B1 and 25B2, respectively (one-stage system with one entrance and two exits radially outside).

Meanwhile, in FIG. 36, the heating media flowing in from the inlets 25A1 and 25A2 proceed radially inside, move circumferentially inside from the apertures 25C1 and 25C2, proceed radially outside among three rows of nozzles and outside thereof, and are discharged from the outlet 25B, respectively (one-stage system with two entrances and one exit radially outside).

With reference to the schematic perspective view of FIG. 37 again, FIG. 37 also shows formation of vertically independent heating channels. In the upper stage, the heating medium flowing in from the inlet 25A1 into the heating channel 73A is split into two flows radially inside. The heating media each flow radially outside through circumferentially outer portions, and then are discharged from outlets 25B1 and 25B2. Meanwhile, in the lower stage, the heating media flowing in from the inlets 25A2 and 25A3 into the heating channels 73B and 73C merge radially inside, flow radially outside, and then are discharged from the outlet 25B3 (two-stage system with three entrances and three exits radially outside). In the present modification, the flows of the heating media in the upper and lower stages are opposite (counterflow).

Figure 38:
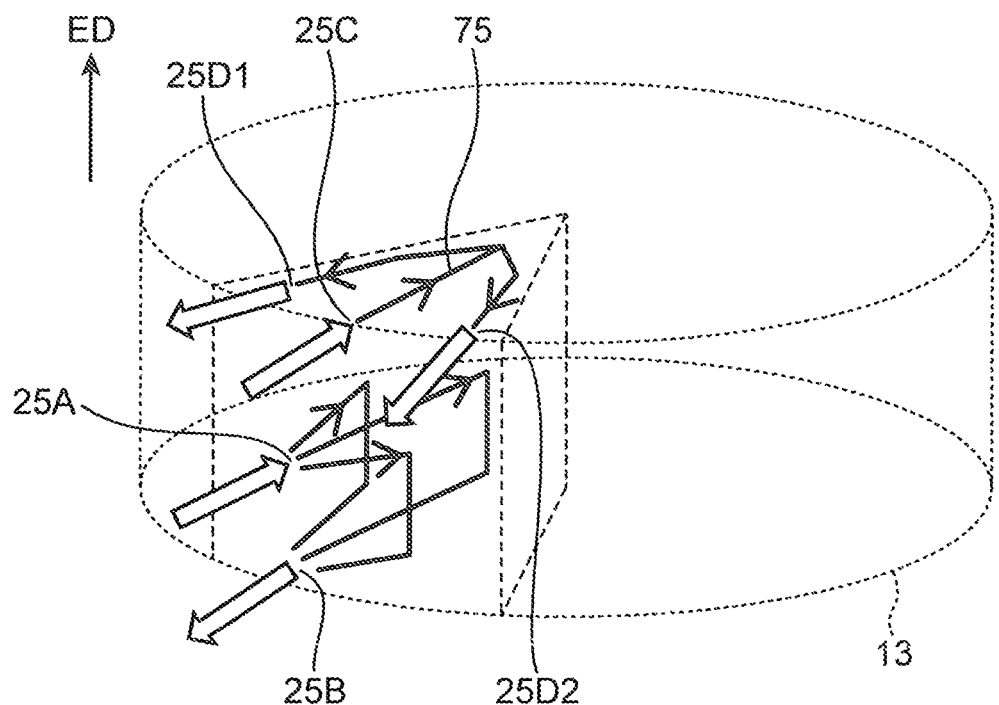
FIG. 38 is a schematic diagram showing a modification of the heating channel.

In FIG. 38, vertically independent two-stage heating channels are formed, and the lower heating channel includes two more stages (three stages in total). The heating medium flowing in from the inlet 25A into the heating channel is discharged from the outlet 25B via the same heating channels as in FIG. 31. Meanwhile, in an uppermost heating channel 75, the heating medium flowing in from an inlet 25C is split radially inside, flows radially outside, and then is discharged from outlets 25D1 and 25D2. In the present modification, it is possible to use the temperature or type of the heating medium flowing into the heating channel 75 different from the temperature or type of the heating medium flowing into the heating channel. The heating channel 75 may be maintained in a vacuum. In this way, the heating channels in the die plate 100 according to the modification of the present disclosure may be arranged in a plurality of stages in the axial direction ED. At this time, the heating channels may be in communication with each other or may be arranged independently.

Each of the above-described modifications has described an aspect in which the inlet and the outlet are provided in the radially outer portion of the nozzle arrangement part 13, but the present disclosure is not limited to this aspect. In FIGS. 39 to 44, at least one of the inlet and the outlet is arranged in the radially inner portion of the nozzle arrangement part 13.

Figure 39:
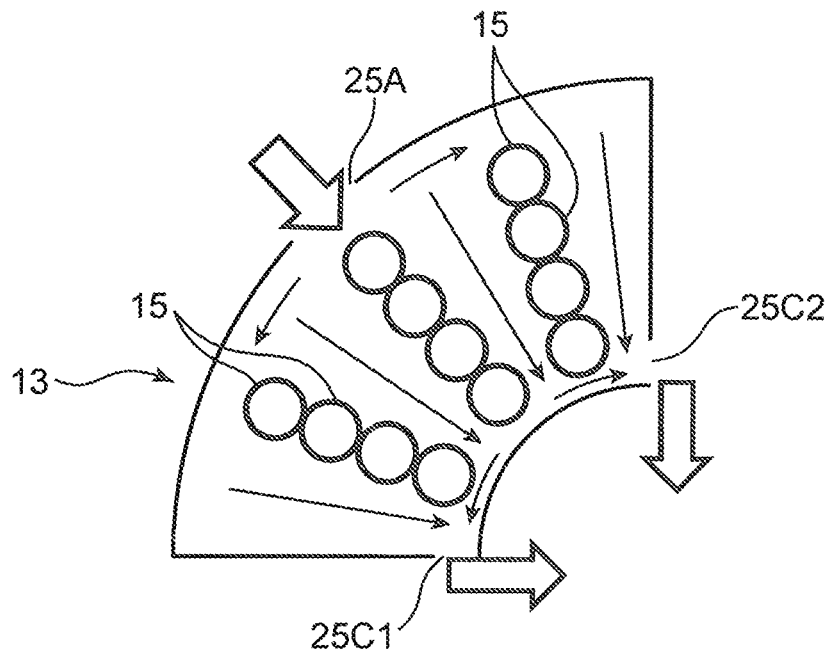
FIG. 39 is a schematic diagram showing a modification of the heating channel.

In FIG. 39, the heating medium flowing in from the inlet 25A arranged in the radially outer portion of the nozzle arrangement part 13 proceeds radially inside among three rows of nozzles and outside thereof, moves further circumferentially outside, and is discharged from outlets 25C1 and 25C2 arranged in the radially inner portion of the nozzle arrangement part 13 (one entrance radially outside and two exits radially inside).

Figure 40:
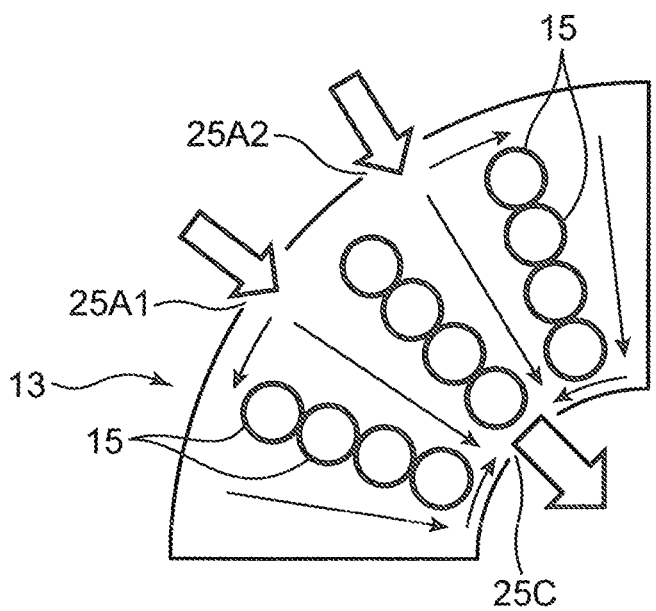
FIG. 40 is a schematic diagram showing a modification of the heating channel.

In FIG. 40, the heating media flowing in from the two inlets 25A1 and 25A2 arranged in the radially outer portion of the nozzle arrangement part 13 proceed radially inside among three rows of nozzles and outside thereof, move further circumferentially inside, and are discharged from the outlet 25C arranged on the radially inner portion of the nozzle arrangement part 13 (two entrances radially outside and one exit radially inside).

Figure 41:
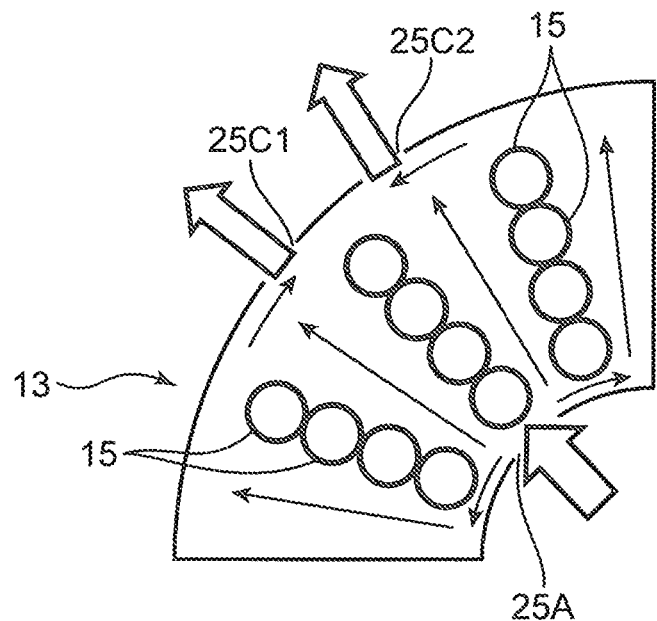
FIG. 41 is a schematic diagram showing a modification of the heating channel.

Meanwhile, in FIG. 41, the heating medium flowing in from the inlet 25A arranged in the radially inner portion of the nozzle arrangement part 13 proceeds radially outside among three rows of nozzles and outside thereof, moves further circumferentially inside, and is discharged from outlets 25C1 and 25C2 arranged in the radially outer portion of the nozzle arrangement part 13 (one entrance radially inside and two exits radially outside).

Figure 42:
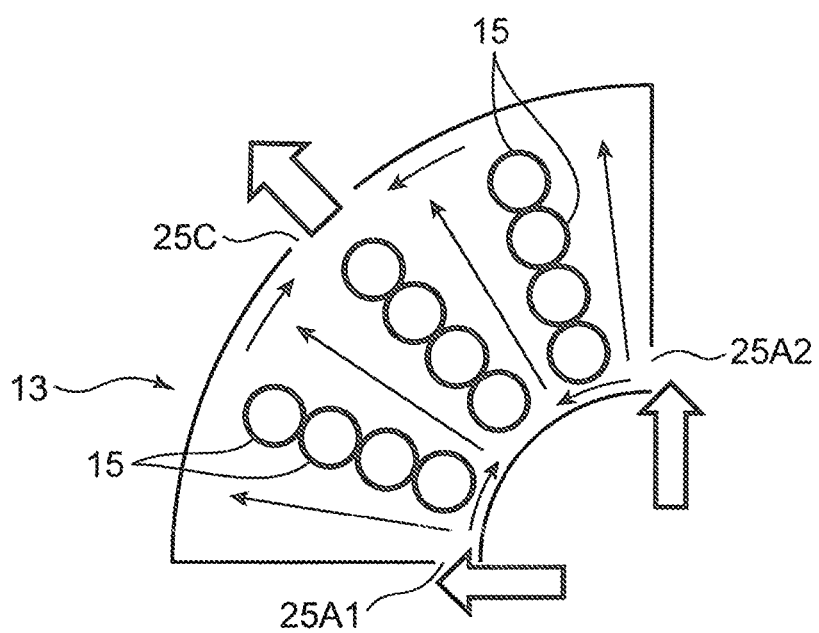
FIG. 42 is a schematic diagram showing a modification of the heating channel.

In FIG. 42, the heating media flowing in from the two inlets 25A1 and 25A2 arranged in the radially inner portion of the nozzle arrangement part 13 proceed radially outside among three rows of nozzles and outside thereof, move further circumferentially inside, and are discharged from the outlet 25C arranged in the radially outer portion of the nozzle arrangement part 13 (two entrances radially inside and one exit radially outside).

Note that FIGS. 39 to 42 may show a so-called one-path channel in which the heating medium flowing into each inlet can be discharged from each outlet after moving in the radial direction.

Figure 43:
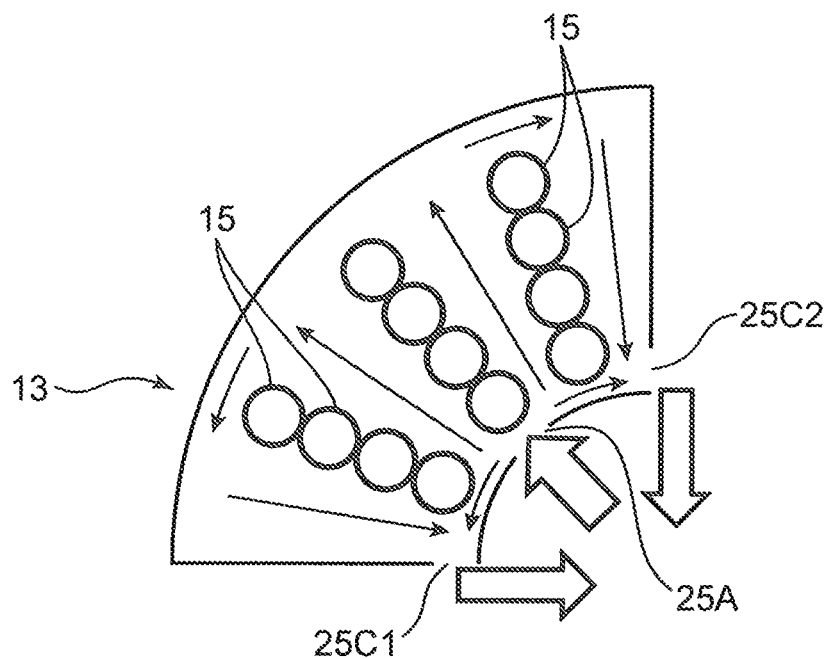
FIG. 43 is a schematic diagram showing a modification of the heating channel.

In FIG. 43, the heating medium flowing in from the inlet 25A arranged in the radially inner portion of the nozzle arrangement part 13 proceeds radially outside among three rows of nozzles and outside thereof, further moves circumferentially inside again through the circumferentially outside of the three rows of nozzles, and is discharged from the two outlets 25C1 and 25C2 arranged in the radially inner portion of the nozzle arrangement part 13 (one entrance radially inside and two exits radially inside).

Figure 44:
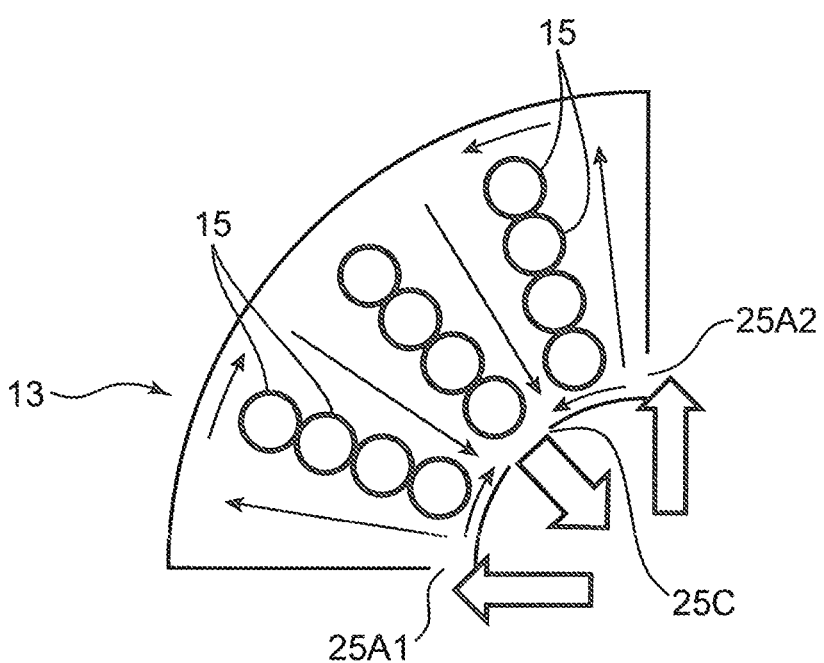
FIG. 44 is a schematic diagram showing a modification of the heating channel.

Furthermore, in FIG. 44, the heating media flowing in from the two inlets 25A1 and 25A2 arranged in the radially inner portion of the nozzle arrangement part 13 into the heating channels proceed radially outside through the circumferentially outside of the three rows of nozzles, further return radially inside again among the three rows of nozzles, and are discharged from the outlet 25C arranged in the radially inner portion of the nozzle arrangement part 13 (two entrances radially inside and one exit radially inside).

In the die plate 100 including the nozzle arrangement part 13 according to each of the modifications as well, the heating medium flows while coming into contact with the outer peripheral surfaces 15t of the nozzle walls 15a of the plurality of nozzles 15, thereby stably and reliably heating the plurality of nozzles 15. Note that in a case where the inlet or the outlet is arranged in the radially inner portion of the nozzle arrangement part 13, an external channel for supplying or collecting the heating medium is connected to the radially inner portion. If the heating medium is steam, the steam may be discharged directly from the outlet to the outside of the die plate 100.

As described above, with the die plate 100 of each embodiment of the present disclosure and modifications thereof, each guidance wall 50 forms each heating channel together with the outer peripheral surfaces 15t of the nozzle walls 15a of the plurality of nozzles 15, and the heating medium passing through the heating channel can come into contact with the outer peripheral surfaces 15t of the plurality of nozzles 15. This makes it possible to stably heat each of the plurality of nozzles 15 with the heating medium, suppress temperature unevenness between the plurality of nozzles 15, and enhance the temperature rise performance of the nozzles 15. In particular, this makes it possible to perform heat exchange to the nozzle walls 15a of the plurality of nozzles 15 continuously and efficiently in the flow direction of the heating medium.

In each die plate 100, both side portions of the axial direction ED of the heating channel are each defined by the base wall in a direction parallel to the flow direction of the heating medium. Each nozzle wall 15a of the plurality of nozzles 15 connects the plurality of base walls to each other in the axial direction ED to isolate the resin channel from the heating channel. This allows the heating medium to flow stably along the plurality of base walls in the heating channel and prevents the heating medium from mixing into the molten resin.

The guidance wall 50 includes the channel wall that defines the heating channel together with the plurality of base walls. The channel wall extends in the flow direction of the heating medium, connects the plurality of base walls to each other in the axial direction ED, and are arranged opposite each of the nozzle walls 15*a* of the plurality of nozzles 15 in a direction crossing the axial direction ED. With such a configuration, the heating medium flows through the heating channel along the channel wall and comes into contact with the nozzle walls 15*a* of the plurality of nozzles 15 to stably heat the nozzle walls 15*a*.

In the above-described first embodiment, the guidance wall 50 includes the channel wall 43, which functions as the outward route guidance wall, and the channel wall 45, which functions as the return route guidance wall, as shown in FIG. 7. Meanwhile, between both channel walls, a part of the plurality of nozzles 15 constitutes a plurality of connection nozzles in which the outer peripheral surfaces 15*t* of the nozzle walls 15*a* are connected to each other in a direction crossing the axial direction ED, and forms the channel wall 41. In other words, a part of the outer peripheral surface of one of the plurality of connection nozzles and a part of the outer peripheral surface of another connection nozzle adjacent to the one connection nozzle are connected to each other in a connection direction crossing the axial direction ED. The channel wall 43 is arranged opposite the plurality of connection nozzles, and guides the heating medium in a first flow direction (arrows F1, F2, F3 in FIG. 7) between the channel wall 43 and the plurality of connection nozzles. Meanwhile, the channel wall 45 is arranged opposite the plurality of connection nozzles on the opposite side of the channel wall 43 with respect to the plurality of connecting nozzles, and guides the heating medium guided by the channel wall 43 in a second flow direction opposite the first flow direction (arrows F5 and F6 in FIG. 7) between the channel wall 45 and the plurality of connection nozzles. With such a configuration, the plurality of connection nozzles can be stably heated from both sides of the channel wall 43 and the channel wall 45 with the flow of the same heating medium. Note that the first embodiment shown in FIG. 7 has described an aspect in which the channel walls and the plurality of connection nozzles are arranged in the circumferential direction of the die plate 100. However, as in the second embodiment shown in FIG. 11, the channel walls and the plurality of connection nozzles may be arranged in the radial direction of the die plate 100. The plurality of connection nozzles described above may be parallel nozzles that are spaced apart from each other in parallel. That is, a small gap may be formed between the nozzles of the plurality of nozzles 15 constituting the channel wall 41. In this case as well, the plurality of parallel nozzles can be stably heated from both sides of the channel wall 41.

Note that as described above, when the heating channel includes the outward channel 47 and the return channel 49 that turns back at the channel forward end of the outward channel 47 and heads for the other side along the outward channel 47, the heating width can be expanded in the alignment direction of the outward channel 47 and the return channel 49. Therefore, the temperature distribution of the nozzle arrangement part 13 can be made more uniform, and the range in which the nozzles 15 can be arranged can be extended. Therefore, the number of nozzles can be increased and the productivity of the resin pellets can be improved.

Like the intermediate nozzle row NL2 in FIG. 10, when the outer peripheral surfaces 15*t* of the adjacent nozzles 15 (part of the outer peripheral surface of one of the plurality of connection nozzles and part of the outer peripheral surface of another connection nozzle) are connected to each other by the partition wall 51, the heating medium can be stably guided in the flow direction while coming into contact with the outer peripheral surface 15*t* of each nozzle 15 in each heating channel.

By providing the partition wall 51 between the adjacent nozzles 15 in this way, it becomes unnecessary to arrange a new continuous partition wall longer than the space of the nozzles 15, the structure of the die plate 100 can be simplified, the space efficiency of the channel arrangement increases, and the number of nozzles to arrange can be further increased.

The plurality of nozzles 15 shown in FIG. 11 corresponds to the plurality of contact nozzles in which the outer peripheral surfaces 15*t* of the nozzle walls 15*a* are directly connected to each other. In this case, since a part of the heating region can be defined by the plurality of contact nozzles, the plurality of nozzles 15 can be densely arranged in the region, and the need to arrange other walls for guiding the heating medium in the region is reduced.

In the outer diameter side nozzle row NL1 and the inner diameter side nozzle row NL3 of FIG. 10, the plurality of nozzles 15 corresponds to a plurality of independent nozzles in which the outer peripheral surfaces 15*t* of the nozzle walls 15*a* are arranged independently of each other in the heating channel. With such a configuration, when the heating medium flows into the gap between the plurality of independent nozzles, each independent nozzle efficiently absorbs heat from the heating medium through the outer peripheral surface 15*t*, thereby enhancing the heating effect of the nozzle wall 15*a*. Therefore, even if there is a region in the heating channel where the flow rate of the heating medium is relatively small, by arranging the independent nozzles in the region, temperature unevenness between the plurality of nozzles 15 in the die plate 100 can be reduced.

An aspect of the die plate 100 according to the above-described first embodiment has been described in which the heating channels of the first heating medium guidance part 20A are arranged at different positions in the axial direction ED with respect to the heating channels of the second heating medium guidance part 20B. With such a configuration, the plurality of heating channels independent of each other can be arranged in the die plate 100, and thus the amount of heating for the plurality of nozzles 15 can be increased. It is also possible to cause heating media different from each other or heating media having temperatures different from each other to flow through each heating channel. The size of the die plate 100 in a direction crossing (orthogonal to) the axial direction ED can be made smaller than in a case where the first heating medium guidance part 20A and the second heating medium guidance part 20B are arranged at the same position in the axial direction ED.

As described above, when the heating channels of the first heating medium guidance part 20A are arranged at positions different from positions of the heating channels of the second heating medium guidance part 20B in the axial direction ED, the temperature uniformity of the plurality of nozzles 15 in the axial direction ED can be improved. The cross-sectional area of the channels is smaller than when the heating channels are arranged in a single-layer structure in the axial direction ED in the same space, and thus the flow speed of the heating medium increases, and the temperature rise performance of the nozzles 15 can be improved.

As in the above-described first embodiment, when at least part of the heating channels of the first heating medium guidance part 20A is arranged to overlap the heating channels of the second heating medium guidance part 20B in the axial direction ED, it is possible to exchange heat between the heating media flowing through the heating channels of the first heating medium guidance part 20A and the heating channels of the second heating medium guidance part 20B, and the temperature difference between the two heating media can be reduced.

Furthermore, in the above-described first embodiment, the first nozzle group 17 and the second nozzle group 19 can be heated cooperatively by the two heating channels 29A1 and 29A2 (first sub-guidance part and second sub-guidance part) of the first heating medium guidance part 20A, and the two heating channels 29B1 and 29B2 (third sub-guidance part and fourth sub-guidance part) of the second heating medium guidance part 20B. Therefore, even if the flow of the heating medium in one heating medium guidance part is stagnant, significant decrease in the heating performance of one of the two nozzle groups is prevented.

Furthermore, in the above-described first embodiment, the inlet 25A of the first heating medium guidance part 20A is in communication with the heating channel 29A1 so as to cause the heating medium to flow into the heating channel 29A1, and the inlet 25B of the second heating medium guidance part 20B is in communication with the heating channel 29B1 so as to cause the heating medium to flow into the heating channel 29B1. With such a configuration, the pre-heated heating medium can first heat the discharge side outer peripheral surface of the first nozzle group 17 through the heating channel 29A1, and can first heat the discharge side outer peripheral surface of the second nozzle group 19 through the heating channel 29B1. Therefore, the temperature drop around the discharge part 15f of each nozzle 15 can be suppressed and the molten resin can be discharged stably. Even if the surface of the die plate 100 on the discharge part 15f side (top surface 13a) is exposed to water and the temperature is likely to decrease, the temperature difference between the nozzles 15 in the axial direction ED can be suppressed.

In the above-described first embodiment, in the first heating medium channel 21 and the second heating medium channel 23, the communication channels are formed between the first nozzle group 17 and the second nozzle group 19 to reverse the order of arrangement of the heating channels in the axial direction ED between the first nozzle group 17 side and the second nozzle group 19 side. With such a configuration, the heating channels along the first nozzle group 17 and the heating channels along the second nozzle group 19 can be interchanged with each other in the axial direction ED by the communication channels. That is, the heating channel arranged on the resin injection side of the first nozzle group 17 side can be connected to the heating channel arranged on the resin entry side of the second nozzle group 19 side through the communication channel.

Furthermore, in the above-described first embodiment, the inlet 25A of the first heating medium channel 21 and the inlet 25B of the second heating medium channel 23 are arranged on the resin injection side of the nozzles 15 in the axial direction ED, and the outlet 27A of the first heating medium channel 21 and the outlet 27B of the second heating medium channel 23 are arranged on the resin entry side of the nozzles 15 in the axial direction ED. With such a die plate 100, the heated heating medium is first supplied from the resin injection side of the nozzles 15 and then discharged from the resin entry side of the nozzles 15, thereby increasing the amount of heat input on the resin injection side. Therefore, more uniform temperature distribution can be obtained by suppressing the temperature drop on the resin injection side of the die plate 100 that is exposed to water and heat is removed.

Furthermore, in the above-described first embodiment, the inlet 25A of the first heating medium channel 21 and the inlet 25B of the second heating medium channel 23 are arranged opposite each other across the ring center of the ring-shaped nozzle group, and the outlet 27A of the first heating medium channel 21 and the outlet 27B of the second heating medium channel 23 are arranged opposite each other across the ring center of the ring-shaped nozzle group and circumferentially out of phase with respect to each inlet. With such a die plate 100, interference between the inlet and the outlet in the axial direction ED can be prevented, and the die plate can be made thinner.

Note that the arrangement of the first heating medium guidance part 20A and the second heating medium guidance part 20B as described above is not limited to the arrangement applied to two nozzle groups mutually divided in the circumferential direction. That is, the arrangement of the first heating medium guidance part 20A and the second heating medium guidance part 20B as described above may be applied to two nozzle groups mutually divided in the radial direction.

Meanwhile, in the die plate 100 according to the above-described second embodiment (FIG. 11), the heating medium guidance part 20 includes: the heating channel 29A1 (first sub-guidance part) that receives the heating medium flowing in from the inlet 25A (FIG. 13) and guides the heating medium so as to bring the heating medium into contact with the discharge side outer peripheral surface of the plurality of nozzles 15; the heating channel 29A2 (second sub-guidance part) that receives the heating medium that has passed through the heating channel 29A1 and guides the heating medium so as to bring the heating medium into contact with the upstream side outer peripheral surface of the plurality of nozzles 15; and the up-and-down communicating channel 31 (communicating part) that causes the heating channel 29A1 and the heating channel 29A2 to be in communication with each other. With such a configuration as well, since the pre-heated heating medium can first heat the discharge side outer peripheral surface of the plurality of nozzles 15 through the heating channel 29A1, the temperature drop around the discharge part 15f (FIG. 14) of each nozzle 15 can be suppressed, and the molten resin can be discharged stably. Even if the surface of the die plate 100 on the discharge part 15f side is exposed to water and the temperature is likely to decrease, the temperature difference between the nozzles 15 in the axial direction ED can be suppressed.

Note that the guidance wall 50 provided in each heating medium guidance part of the die plate 100 is not limited to the aspect of guiding the heating medium in the circumferential direction as in the first embodiment or the aspect of guiding the heating medium in the radial direction as in the second embodiment. The guidance wall 50 is required at least to guide the heating medium in a direction crossing the axial direction ED, and there may be a portion within each heating channel where the guidance wall 50 guides the heating medium in the axial direction ED. Note that when guiding the heating medium in the circumferential direction of the nozzle group as in the first embodiment, the arrangement density of the nozzles 15 can be improved without creating unnecessary space in the die plate 100.

<Shape and Manufacturing Method of Die Plate>

The shape of the die plate 100 is not limited to the above-described disc shape, but may be another shape such as an oval shape or a polygonal shape. In that case, the shape of the heating channel can also be an oval ring shape, a polygonal ring shape, or the like.

The die plate 100 is formed using a material having a melting point higher than the resin to be granulated. For example, the die plate 100 is formed using a material including an iron-based material such as carbon steel and stainless steel, an aluminum alloy material, a metal material such as titanium or titanium alloy, nickel-based alloy, cobalt-based alloy, or tungsten alloy, and a high melting point resin material such as high melting point type special polyamide resin.

The die plate 100 may be manufactured by assembling a plurality of machined parts, or may be manufactured by die-casting, casting, or processing by cutting. The die plate 100 can also be manufactured by an additive manufacturing method using a 3D printer or the like.

Furthermore, the additive manufacturing method includes, for example, the laser additive manufacturing (LAM) method and the electron beam melting (EBM) method. When a laser is used as a heat source, the additive manufacturing method includes the selective laser melting (SLM) method, the laser metal deposition (LMD) method, the direct metal laser sintering (DMLS) method, and the like. The method using an arc as a heat source includes a method of creating an additive manufacturing object (hereinafter referred to as an object) by melting and solidifying a filler material with the arc to form a weld bead and then laminating the weld bead into multiple layers. Any of these additive manufacturing methods can be used to manufacture the die plate 100.

For example, by the SLM method, the object (die plate 100) can be manufactured as follows. Spherical powder, which is used as a raw material for the object, is laid in a manufacturing tank. A laser beam, which serves as a heat source for melting the powder, is emitted on a predetermined region of the powder surface where the powder has been leveled off. Then, the powder on which the laser beam is emitted is sintered or melted and solidified, and the manufacturing layer that constitutes the object is formed. The predetermined region on which the laser beam is emitted is a region that shows a two-dimensional planar shape of one of a plurality of cross-sectional shapes that is divided by thinly slicing the shape of the die plate (target shape) that will be the object horizontally.

Thereafter, the powder is again supplied onto the manufacturing layer and leveled off, and the laser beam is emitted on the predetermined region of the powder surface. By this operation, the next manufacturing layer is formed. By repeating such a procedure, the desired object can finally be formed. That is, the die plate 100 is formed with the object in which layers of molten and solidified metal materials are laminated.

Other additive manufacturing methods are also basically based on slicing the target shape of the object into multiple layers and laminating the layers sequentially to form the object. Since the manufacturing method itself is known, a detailed description will be omitted here.

In this way, by manufacturing the die plate 100 by the additive manufacturing method, even if the nozzle shape or the shape of the channel for the heating medium is complicated, the die plate 100 can be easily formed without complicated machining, leading to fewer restrictions on machining and greater design flexibility. Therefore, the channel shape for the heating medium is not limited to a simple straight channel that is easy to machine, and even a curved channel with many nozzles arranged in the channel can be easily manufactured. Therefore, optimum design that can improve the number of resin nozzles (pellet productivity), temperature rise performance, and heating performance is possible, contributing to improvement in the performance of the die plate 100.

In particular, when viewed in the flow direction of the heating medium as represented in FIGS. 3 and 11, the die plate 100 having a complicated channel in which the cross-sectional area of the channel expands and contracts can be manufactured by the additive manufacturing method. Although the die plate 100 as described above may be formed and manufactured by cutting a base material of metal, when manufactured by the additive manufacturing method, it is superior in terms of machining accuracy and manufacturing time.

In particular, the nozzle group and at least one heating medium guidance part in the die plate 100 according to each of the above-described embodiments and modifications preferably include the object obtained by laminating the layers of molten and solidified metal material in the axial direction ED. For example, the lower portion of the plurality of nozzles 15 (upstream portion, resin entry side portion) is formed on the bottom wall 54 shown in FIG. 2, and melted and solidified. Next, the partition part 24 and the upper portion (discharge side portion) of the plurality of nozzles 15 are formed thereon, melted and solidified. Furthermore, the top wall 53 is formed thereon, melted and solidified. Such a process makes it possible to manufacture the die plate 100 having complicated channels as described above.

<Resin Machine>

The resin machine according to the embodiments of the present disclosure includes the die plate 100 described above, a resin supply unit, a medium supply unit, and a processing unit. The resin machine is represented by the above-described resin pellet granulation device. The resin supply unit supplies molten resin to the nozzle holes of the plurality of nozzles 15 (resin channels) of the die plate 100. The medium supply unit supplies the heating medium to at least one heating medium guidance part of the die plate 100. The processing unit performs a predetermined process on the molten resin discharged from the discharge parts 15$f$ of the plurality of nozzles 15. The processing unit includes the cutter device and the like as described above. Such a configuration makes it possible to stably heat the plurality of nozzles 15 of the die plate 100 with the heating medium, suppress temperature unevenness between the plurality of nozzles 15, and enhance the temperature rise performance of the nozzles 15. As a result, the molten resin can be stably discharged from the discharge parts 15$f$ of the plurality of nozzles 15, and a predetermined process such as cutting can be performed.

<Method of Heating Nozzles of Die Plate>

The method of heating nozzles of the die plate 100 as described above includes preparing the die plate 100 (preparation process) and heating the nozzles 15 by sharing the heating medium with the die plate 100 (heating process). The preparation process includes preparing the die plate 100 including the plurality of nozzles 15 each including: the nozzle wall 15$a$ extending in the axial direction and including the inner peripheral surface 15$s$ that defines the resin channel that allows the molten resin to flow and the outer peripheral surface 15$t$ arranged along the inner peripheral surface 15$s$ on the opposite side of the inner peripheral surface 15$s$; and the discharge part 15$f$ arranged at the tip of the axial direction of the nozzle wall 15a and discharging the molten resin; and the guidance wall 50 that defines the heating channel through which the heating medium flows together with at least each outer peripheral surface 15t of the plurality of nozzles 15. The heating process includes causing the heating medium to flow into the entrance (inlet, reception port) of the heating channel, heating the nozzles 15 by bringing the heating medium into contact with the outer peripheral surfaces 15t of the plurality of nozzles 15, and then discharging the heating medium from the exit (outlet, discharge port) of the heating channel.

Such a method makes it possible to stably heat the plurality of nozzles 15 of the die plate 100 with the heating medium, suppress temperature unevenness between the plurality of nozzles 15, and enhance the temperature rise performance of the nozzles 15.

Note that the preparation process may include, as the heating medium channel, preparing the die plate 100 including the first heating medium channel and the second heating medium channel arranged at positions different from each other in the axial direction ED. The heating process may include supplying the heating medium individually to each of the first heating medium channel and the second heating medium channel By such a method, the temperature uniformity of the nozzles 15 in the axial direction ED can be improved. The channel cross-sectional area of each heating medium channel is smaller than when the heating medium channels are arranged in a single layer structure in the axial direction ED in the same space. Therefore, the flow speed of the heating medium in the heating process increases, and the temperature rise performance of the nozzles 15 is improved.

The preparation process may include, as the heating medium channel, preparing the die plate 100 in which at least part of the circumferential direction of the heating channels of the first heating medium channel and the second heating medium channel is arranged so as to overlap each other in the axial direction ED. By such a method, at least part of the heating channel in the circumferential direction overlaps each other in the axial direction ED. Therefore, even if a temperature difference occurs in the heating media flowing through the channels in the heating process, the temperature difference between the heating media can be reduced by heat transfer (heat exchange).

The preparation process may include, as the heating medium channel, preparing the die plate 100 with the heating medium flowing in the same direction as each other in the heating channels of the first heating medium channel and the second heating medium channel adjacent to each other. By such a method, the temperatures of adjacent heating channels are made uniform, and the temperature uniformity can be improved.

The preparation process may include, as the heating medium channel, preparing the die plate 100 with the heating medium flowing in opposite directions in the heating channels of the first heating medium channel and the second heating medium channel adjacent to each other. By such a method, the temperature difference generated in the heating channels can be reduced by heat transfer from one heating channel to the other heating channel.

The heating process may include, as the heating medium channel, raising the temperature of the heating medium flowing through the heating channel of the first heating medium channel and the temperature of the heating medium flowing through the heating channel of the second heating medium channel to temperatures different from each other. By such a method, the temperature of the heating medium flowing through one heating channel becomes high, whereas the temperature of the heating medium flowing through the other heating channel becomes low, thereby allowing the temperature distribution of the die plate to be arbitrarily adjusted according to the arrangement of the heating channels.

The die plate provided by the present disclosure includes a nozzle group and at least one heating medium guidance part. The nozzle group includes a plurality of nozzles that each discharges molten resin in an axial direction. The plurality of nozzles includes a plurality of nozzle walls and a plurality of discharge parts. The plurality of nozzle walls each extends in the axial direction and includes an inner peripheral surface surrounding a resin channel that allows the molten resin to flow, and an outer peripheral surface arranged on an opposite side of the inner peripheral surface and along the inner peripheral surface. The plurality of discharge parts is arranged at tips of the plurality of nozzle walls in the axial direction and each discharges the molten resin. The at least one heating medium guidance part receives a heating medium and brings the heating medium into contact with the outer peripheral surface to heat the plurality of nozzles from outside. The at least one heating medium guidance part includes at least one reception port that receives the heating medium, at least one discharge port that discharges the heating medium, and at least one guidance wall. The guidance wall defines a heating channel through which the heating medium flows together with the outer peripheral surface of each of the plurality of nozzle walls. The guidance wall guides the heating medium to cause the heating medium flowing in from the at least one reception port to come into contact with the outer peripheral surface of each of the plurality of nozzle walls in a flow direction crossing the axial direction, and then to be discharged from the at least one discharge port.

With this configuration, the guidance wall forms the heating channel together with the outer peripheral surfaces of the nozzle walls of the plurality of nozzles. The heating medium passing through the heating channel can come into contact with the outer peripheral surface of each of the plurality of nozzle walls. This makes it possible to stably heat each of the plurality of nozzles with the heating medium, and suppress temperature unevenness between the plurality of nozzles.

In the above-described configuration, preferably, the at least one guidance wall includes a plurality of base walls spaced apart from each other in the axial direction, the heating channel is arranged between the plurality of base walls, and the plurality of nozzle walls connects the plurality of base walls to each other in the axial direction to isolate the resin channel from the heating channel.

This configuration allows the heating medium to flow stably along the plurality of base walls in the heating channel and prevents the heating medium from mixing into the molten resin.

In the above-described configuration, preferably, the at least one guidance wall includes at least one channel wall that defines the heating channel together with the plurality of base walls, and the at least one channel wall extends in the flow direction and connects the plurality of base walls to each other in the axial direction, and is arranged opposite the plurality of nozzle walls in a direction crossing the axial direction.

With this configuration, the heating medium comes into contact with the nozzle walls of the plurality of nozzles while flowing through the heating channel along the channel wall, and can heat the nozzle walls.

In the above-described configuration, preferably, the plurality of nozzles includes a plurality of parallel nozzles aligned in an alignment direction crossing the axial direction, and the at least one channel wall includes: an outward route guidance wall arranged opposite the plurality of parallel nozzles in a direction crossing the alignment direction and guiding the heating medium in a first flow direction with the plurality of parallel nozzles; and a return route guidance wall arranged on an opposite side of the outward route guidance wall with respect to the plurality of parallel nozzles and opposite the plurality of parallel nozzles, the return route guidance wall guiding the heating medium guided by the outward route guidance wall in a second flow direction opposite the first flow direction with the plurality of parallel nozzles.

With this configuration, the plurality of parallel nozzles can be stably heated from both sides of the outward route guidance wall and the return route guidance wall by the same heating medium flow.

In the above-described configuration, preferably, the plurality of nozzles includes a plurality of connection nozzles, and a part of the outer peripheral surface of a first connection nozzle of the plurality of connection nozzles and a part of the outer peripheral surface of a second connection nozzle adjacent to the first connection nozzle are connected to each other in a connection direction crossing the axial direction.

With this configuration, the heating medium can be guided in a predetermined direction by the outer peripheral surface of each of the plurality of connection nozzles inside the heating channel.

In the above-described configuration, preferably, the at least one guidance wall includes at least one partition wall that connects the part of the outer peripheral surface of the first connection nozzle of the plurality of connection nozzles and the part of the outer peripheral surface of the second connection nozzle to each other, and the at least one partition wall defines the heating channel in the flow direction together with the outer peripheral surface of the first connection nozzle and the outer peripheral surface of the second connection nozzle.

With this configuration, the heating medium can be stably guided along the partition wall while bringing the heating medium into contact with the outer peripheral surface of each nozzle inside the heating channel.

In the above-described configuration, preferably, the part of the outer peripheral surface of the first connection nozzle of the plurality of connection nozzles and the part of the outer peripheral surface of the second connection nozzle are directly connected to each other.

With this configuration, since a part of the heating region can be defined by the plurality of contact nozzles, the plurality of nozzles can be densely arranged in the part of the region, and the need to arrange another wall for guiding the heating medium into the region is reduced.

In the above-described configuration, preferably, the plurality of nozzles includes a plurality of independent nozzles, and the nozzle wall of each of the plurality of independent nozzles is arranged independently of each other inside the heating channel.

With this configuration, the plurality of independent nozzles can efficiently absorb heat from the heating medium through the outer peripheral surface. Therefore, even if there is a region in the heating channel where the flow rate of the heating medium is relatively small, by arranging the independent nozzles in the region, temperature unevenness between the plurality of nozzles can be reduced.

In the above-described configuration, preferably, the at least one heating medium guidance part includes a first heating medium guidance part and a second heating medium guidance part each including the reception port, the discharge port, and the guidance wall, and defining the heating channel independent of each other. Preferably, the heating channel of the first heating medium guidance part is arranged at a different position in the axial direction from a position of the heating channel of the second heating medium guidance part.

With this configuration, the plurality of heating channels independent of each other can be arranged in the die plate, and thus the amount of heating for the plurality of nozzles can be increased. It is also possible to cause heating media different from each other or heating media having temperatures different from each other to flow through each heating channel according to required heating characteristics. The size of the die plate in a direction crossing the axial direction can be made smaller than in a case where the first heating medium guidance part and the second heating medium guidance part are arranged at the same position in the axial direction.

In the above-described configuration, preferably, at least a part of the heating channel of the first heating medium guidance part is arranged to overlap the heating channel of the second heating medium guidance part in the axial direction.

With this configuration, it is possible to exchange heat between the heating media flowing through the heating channel of the first heating medium guidance part and the heating channel of the second heating medium guidance part, and to reduce the temperature difference between the two heating media.

In the above-described configuration, the nozzle group may include a first nozzle group and a second nozzle group mutually divided in the direction crossing the axial direction. The outer peripheral surface of each of the plurality of nozzle walls included in each of the first nozzle group and the second nozzle group may include a discharge side outer peripheral surface arranged at a position close to the discharge part in the axial direction, and an upstream side outer peripheral surface arranged at a position farther from the discharge part than the discharge side outer peripheral surface in the axial direction. In this case, preferably, the at least one heating medium guidance part includes a first heating medium guidance part and a second heating medium guidance part each including the reception port, the discharge port, and the guidance wall, and defining the heating channel independent of each other, the first heating medium guidance part includes: a first sub-guidance part that guides the heating medium to bring the heating medium into contact with the discharge side outer peripheral surface of each of the plurality of nozzle walls of the first nozzle group; a second sub-guidance part that guides the heating medium to bring the heating medium into contact with the upstream side outer peripheral surface of each of the plurality of nozzle walls of the second nozzle group; and a first communicating part that causes the first sub-guidance part and the second sub-guidance part to be in communication with each other. Preferably, the second heating medium guidance part includes: a third sub-guidance part that guides the heating medium to bring the heating medium into contact with the upstream side outer peripheral surface of each of the plurality of nozzle walls of the first nozzle group; a fourth sub-guidance part that guides the heating medium to bring the heating medium into contact with the discharge side outer peripheral surface of each of the plurality of nozzle walls of the second nozzle group; and a second communicating part that causes the third sub-guidance part and the fourth sub-guidance part to be in communication with each other.

With this configuration, the two sub-guidance parts of the first heating medium guidance part and the two sub-guidance parts of the second heating medium guidance part can cooperatively heat the first nozzle group and the second nozzle group. Therefore, even if the flow of the heating medium in one heating medium guidance part is stagnant, significant decrease in the heating performance of one of the two nozzle groups is prevented.

In the above-described configuration, preferably, the reception port of the first heating medium guidance part is in communication with the first sub-guidance part to allow the heating medium to flow into the first sub-guidance part, and the reception port of the second heating medium guidance part is in communication with the fourth sub-guidance part to allow the heating medium to flow into the fourth sub-guidance part.

With this configuration, the pre-heated heating medium can first heat the discharge side outer peripheral surface of the first nozzle group through the first sub-guidance part, whereas the heating medium can first heat the discharge side outer peripheral surface of the second nozzle group through the fourth sub-guidance part. Therefore, the temperature drop around the discharge part of each nozzle can be suppressed and the molten resin can be discharged stably. Even if the surface of the die plate on the discharge part side is exposed to water and the temperature is likely to drop, the temperature difference between the nozzles in the axial direction can be suppressed.

In the above-described configuration, the outer peripheral surface of each of the plurality of nozzle walls may include a discharge side outer peripheral surface arranged at a position close to the discharge part in the axial direction, and an upstream side outer peripheral surface arranged at a position farther from the discharge part than the discharge side outer peripheral surface in the axial direction, and the at least one heating medium guidance part may include: a first sub-guidance part that receives the heating medium flowing in from the reception port and guides the heating medium to bring the heating medium into contact with the discharge side outer peripheral surface of each of the plurality of nozzle walls; a second sub-guidance part that receives the heating medium that has passed through the first sub-guidance part and guides the heating medium to bring the heating medium into contact with the upstream side outer peripheral surface of each of the plurality of nozzle walls; and a communicating part that causes the first sub-guidance part and the second sub-guidance part to be in communication with each other.

With this configuration, since the pre-heated heating medium can first heat the discharge side outer peripheral surface of the plurality of nozzles through the first sub-guidance part, the temperature drop around the discharge part of each nozzle can be suppressed, and the molten resin can be discharged stably. Even if the surface of the die plate on the discharge part side is exposed to water and the temperature is likely to drop, the temperature difference between the nozzles in the axial direction can be suppressed.

In the above-described configuration, the nozzle group may be arranged in a ring shape around a center line parallel to the axial direction, the guidance wall of the at least one heating medium guidance part may define the heating channel in a circumferential direction together with the outer peripheral surface of each of the plurality of nozzle walls to allow the heating medium to move in the circumferential direction of the nozzle group while coming into contact with the outer peripheral surface of each of the plurality of nozzle walls.

In the above-described configuration, the nozzle group may be arranged in a ring shape around a center line parallel to the axial direction, the guidance wall of the at least one heating medium guidance part may define the heating channel together with the outer peripheral surface of each of the plurality of nozzle walls to allow the heating medium to move in a radial direction of the nozzle group while coming into contact with the outer peripheral surface of each of the plurality of nozzle walls.

In the above-described configuration, preferably, the nozzle group and the at least one heating medium guidance part include an additive manufacturing object in which layers obtained by melting and solidifying a metal material are laminated.

With this configuration, even if the shape of each nozzle or the shape of the heating channel is complicated, it is possible to form the nozzle or heating channel without complicated machining, leading to fewer restrictions on machining the die plate and greater design flexibility.

The present disclosure also provides a resin machine. The resin machine includes: the die plate described above; a resin supply unit that supplies molten resin to the resin channel of the plurality of nozzles of the die plate; a medium supply unit that supplies the heating medium to the at least one heating medium guidance part of the die plate; and a processing unit that processes the molten resin discharged from the plurality of discharge parts.

With this configuration, it is possible to stably heat the plurality of nozzles of the die plate with the heating medium, and suppress temperature unevenness between the plurality of nozzles. As a result, molten resin can be stably discharged from the discharge parts of the plurality of nozzles, and a predetermined process can be performed.

The present disclosure also provides a method of heating nozzles of a die plate. The method of heating nozzles includes: preparing the die plate including: a plurality of nozzles including: a plurality of nozzle walls each extending in an axial direction and including an inner peripheral surface defining a resin channel that allows molten resin to flow, and an outer peripheral surface arranged on an opposite side of the inner peripheral surface and along the inner peripheral surface; and a plurality of discharge parts arranged at tips of the plurality of nozzle walls in the axial direction and each discharging the molten resin; and a guidance wall that defines a heating channel through which a heating medium flows together with at least the outer peripheral surface of each of the plurality of nozzle walls; and causing the heating medium to flow into an entrance of the heating channel, bringing the heating medium into contact with the outer peripheral surface of each of the plurality of nozzle walls along the guidance wall to heat the plurality of nozzles, and then discharging the heating medium from an exit of the heating channel.

By this method, it is possible to stably heat the plurality of nozzles of the die plate with the heating medium, and suppress temperature unevenness between the plurality of nozzles.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A die plate comprising:
a nozzle group including a plurality of nozzles that each discharge molten resin in an axial direction; and
at least one heating medium guidance part that receives a heating medium, guides the heating medium, and heats the plurality of nozzles from outside,
wherein the plurality of nozzles includes:
a plurality of nozzle walls each extending in the axial direction and including an inner peripheral surface surrounding a resin channel that allows the molten resin to flow, and an outer peripheral surface arranged along the inner peripheral surface to surround the inner peripheral surface in a cross section orthogonal to the axial direction; and
a plurality of discharge parts arranged at tips of the plurality of nozzle walls in the axial direction and each discharging the molten resin, and
the at least one heating medium guidance part includes:
at least one reception port that receives the heating medium;
at least one discharge port that discharges the heating medium; and
at least one guidance wall that defines a heating channel through which the heating medium flows together with the outer peripheral surface of each of the plurality of nozzle walls, the at least one guidance wall guiding the heating medium to cause the heating medium flowing in from the at least one reception port to come into contact with the outer peripheral surface of each of the plurality of nozzle walls in a flow direction of the heating medium crossing the axial direction, and then to be discharged from the at least one discharge port;
wherein the plurality of nozzles includes a plurality of independent nozzles, and each respective one of the plurality of nozzle walls of the plurality of independent nozzles is arranged independently of each other inside the heating channel such that its outer peripheral surface is separate from the outer peripheral surface of adjacent ones of the plurality of independent nozzles, and the heating medium flows between the adjacent ones of the plurality of independent nozzles; and
wherein the plurality of nozzles includes a plurality of connection nozzles, and a part of the outer peripheral surface of a first connection nozzle of the plurality of connection nozzles and a part of the outer peripheral surface of a second connection nozzle adjacent to the first connection nozzle are connected to each other in a connection direction crossing the axial direction.

2. The die plate according to claim 1, wherein
the at least one guidance wall includes a plurality of base walls spaced apart from each other in the axial direction,
the heating channel is arranged between the plurality of base walls, and
the plurality of nozzle walls connects the plurality of base walls to each other in the axial direction to isolate the resin channel from the heating channel.

3. The die plate according to claim 2, wherein
the at least one guidance wall includes at least one channel wall that defines the heating channel together with the plurality of base walls, and
the at least one channel wall extends in the flow direction and connects the plurality of base walls to each other in the axial direction, and is arranged opposite the plurality of nozzle walls in a direction crossing the axial direction.

4. The die plate according to claim 3, wherein
the plurality of nozzles includes a plurality of parallel nozzles aligned in an alignment direction crossing the axial direction, and
the at least one channel wall includes:
an outward route guidance wall arranged opposite the plurality of parallel nozzles in a direction crossing the alignment direction and guiding the heating medium in a first flow direction with the plurality of parallel nozzles; and
a return route guidance wall arranged on an opposite side of the outward route guidance wall with respect to the plurality of parallel nozzles and opposite the plurality of parallel nozzles, the return route guidance wall guiding the heating medium guided by the outward route guidance wall in a second flow direction opposite the first flow direction with the plurality of parallel nozzles.

5. The die plate according to claim 1, wherein
the at least one guidance wall includes at least one partition wall that connects the part of the outer peripheral surface of the first connection nozzle of the plurality of connection nozzles and the part of the outer peripheral surface of the second connection nozzle to each other, and
the at least one partition wall defines the heating channel in the flow direction together with the outer peripheral surface of the first connection nozzle and the outer peripheral surface of the second connection nozzle.

6. The die plate according to claim 1, wherein the part of the outer peripheral surface of the first connection nozzle of the plurality of connection nozzles and the part of the outer peripheral surface of the second connection nozzle are directly connected to each other.

7. The die plate according to claim 1, wherein
the at least one heating medium guidance part includes a first heating medium guidance part and a second heating medium guidance part each including the at least one reception port, the at least one discharge port, and the guidance wall, and defining the heating channel independent of each other, and
the heating channel of the first heating medium guidance part is arranged at a different position in the axial direction from a position of the heating channel of the second heating medium guidance part.

8. The die plate according to claim 7, wherein at least a part of the heating channel of the first heating medium guidance part is arranged to overlap the heating channel of the second heating medium guidance part in the axial direction.

9. The die plate according to claim 1, wherein
the nozzle group includes a first nozzle group and a second nozzle group mutually divided in the direction crossing the axial direction,
the outer peripheral surface of each of the plurality of nozzle walls included in each of the first nozzle group and the second nozzle group includes a discharge side outer peripheral surface adjacent to one of the plurality of discharge parts in the axial direction, and an upstream side outer peripheral surface arranged at a position farther from the respective one of the plurality of discharge parts than the discharge side outer peripheral surface in the axial direction, the at least one heating medium guidance part includes a first heating medium guidance part and a second heating medium guidance part each including the at least one reception port, the at least one discharge port, and the guidance wall, and defining the heating channel independent of each other, the first heating medium guidance part includes:

a first sub-guidance part that guides the heating medium to bring the heating medium into contact with the discharge side outer peripheral surface of each of the plurality of nozzle walls of the first nozzle group;

a second sub-guidance part that guides the heating medium to bring the heating medium into contact with the upstream side outer peripheral surface of each of the plurality of nozzle walls of the second nozzle group; and a first communicating part that causes the first sub-guidance part and the second sub-guidance part to be in communication with each other, and the second heating medium guidance part includes:

a third sub-guidance part that guides the heating medium to bring the heating medium into contact with the upstream side outer peripheral surface of each of the plurality of nozzle walls of the first nozzle group;

a fourth sub-guidance part that guides the heating medium to bring the heating medium into contact with the discharge side outer peripheral surface of each of the plurality of nozzle walls of the second nozzle group; and a second communicating part that causes the third sub-guidance part and the fourth sub-guidance part to be in communication with each other.

10. The die plate according to claim 9, wherein the at least one reception port of the first heating medium guidance part is in communication with the first sub-guidance part to allow the heating medium to flow into the first sub-guidance part, and the at least one reception port of the second heating medium guidance part is in communication with the fourth sub-guidance part to allow the heating medium to flow into the fourth sub-guidance part.

11. The die plate according to claim 1, wherein the outer peripheral surface of each of the plurality of nozzle walls includes a discharge side outer peripheral surface adjacent to a respective one of the plurality of discharge parts in the axial direction, and an upstream side outer peripheral surface arranged at a position farther from the respective one of the plurality of discharge parts than the discharge side outer peripheral surface in the axial direction, and the at least one heating medium guidance part includes:

a first sub-guidance part that receives the heating medium flowing in from the at least one reception port and guides the heating medium to bring the heating medium into contact with the discharge side outer peripheral surface of each of the plurality of nozzle walls;

a second sub-guidance part that receives the heating medium that has passed through the first sub-guidance part and guides the heating medium to bring the heating medium into contact with the upstream side outer peripheral surface of each of the plurality of nozzle walls; and a communicating part that causes the first sub-guidance part and the second sub-guidance part to be in communication with each other.

12. The die plate according to claim 1, wherein the nozzle group is arranged in a ring shape around a center line parallel to the axial direction, and the at least one guidance wall of the at least one heating medium guidance part defines the heating channel in a circumferential direction together with the outer peripheral surface of each of the plurality of nozzle walls to allow the heating medium to move in the circumferential direction of the nozzle group while coming into contact with the outer peripheral surface of each of the plurality of nozzle walls.

13. The die plate according to claim 1, wherein the nozzle group is arranged in a ring shape around a center line parallel to the axial direction, and the at least one guidance wall of the at least one heating medium guidance part defines the heating channel together with the outer peripheral surface of each of the plurality of nozzle walls to allow the heating medium to move in a radial direction of the nozzle group while coming into contact with the outer peripheral surface of each of the plurality of nozzle walls.

14. The die plate according to claim 1, wherein the nozzle group and the at least one heating medium guidance part include an additive manufacturing object in which layers obtained by melting and solidifying a metal material are laminated.

15. A die plate comprising:

a nozzle group including a plurality of nozzles that each discharge molten resin in an axial direction; and at least one heating medium guidance part that receives a heating medium, guides the heating medium, and heats the plurality of nozzles from outside, wherein the plurality of nozzles includes:

a plurality of nozzle walls each extending in the axial direction and including an inner peripheral surface surrounding a resin channel that allows the molten resin to flow, and an outer peripheral surface arranged on an opposite side of the inner peripheral surface and along the inner peripheral surface; and a plurality of discharge parts arranged at tips of the plurality of nozzle walls in the axial direction and each discharging the molten resin, and the at least one heating medium guidance part includes:

at least one reception port that receives the heating medium;

at least one discharge port that discharges the heating medium; and at least one guidance wall that defines a heating channel through which the heating medium flows together with the outer peripheral surface of each of the plurality of nozzle walls, the at least one guidance wall guiding the heating medium to cause the heating medium flowing in from the at least one reception port to come into contact with the outer peripheral surface of each of the plurality of nozzle walls in a flow direction of the heating medium crossing the axial direction, and then to be discharged from the at least one discharge port; wherein the outer peripheral surface of each of the plurality of nozzle walls includes a discharge side outer peripheral surface adjacent to a respective one of the plurality of discharge parts in the axial direction, and an upstream side outer peripheral surface arranged at a position farther from the respective one of the plurality of discharge parts than the discharge side outer peripheral surface in the axial direction, the at least one heating medium guidance part includes:
- a first sub-guidance part that receives the heating medium flowing in from the at least one reception port and guides the heating medium to bring the heating medium into contact with the discharge side outer peripheral surface of each of the plurality of nozzle walls;
- a second sub-guidance part that receives the heating medium that has passed through the first sub-guidance part and guides the heating medium to bring the heating medium into contact with the upstream side outer peripheral surface of each of the plurality of nozzle walls; and
- a communicating part that causes the first sub-guidance part and the second sub-guidance part to be in communication with each other;

the first sub-guidance part and the second sub-guidance part are aligned with each other in the axial direction;
the first sub-guidance part includes a first pair of base walls spaced apart from each other in the axial direction,
the second sub-guidance part includes a second pair of base walls spaced apart from each other in the axial direction,
the heating channel is arranged between the first and second pairs of base walls, and
the plurality of nozzle walls connects the first and second pairs of base walls to each other in the axial direction to isolate the resin channel from the heating channel.

16. A die plate comprising:
a nozzle group including a plurality of nozzles that each discharge molten resin in an axial direction; and
at least one heating medium guidance part that receives a heating medium, guides the heating medium, and heats the plurality of nozzles from outside,
wherein the plurality of nozzles includes:
- a plurality of nozzle walls each extending in the axial direction and including an inner peripheral surface surrounding a resin channel that allows the molten resin to flow, and an outer peripheral surface arranged on an opposite side of the inner peripheral surface and along the inner peripheral surface; and
- a plurality of discharge parts arranged at tips of the plurality of nozzle walls in the axial direction and each discharging the molten resin, and the at least one heating medium guidance part includes:
- at least one reception port that receives the heating medium;
- at least one discharge port that discharges the heating medium; and
- at least one guidance wall that defines a heating channel through which the heating medium flows together with the outer peripheral surface of each of the plurality of nozzle walls, the guidance wall guiding the heating medium to cause the heating medium flowing in from the at least one reception port to come into contact with the outer peripheral surface of each of the plurality of nozzle walls in a flow direction crossing the axial direction, and then to be discharged from the at least one discharge port, wherein the plurality of nozzles includes a plurality of connection nozzles, and
a part of the outer peripheral surface of a first connection nozzle of the plurality of connection nozzles and a part of the outer peripheral surface of a second connection nozzle adjacent to the first connection nozzle are connected to each other in a connection direction crossing the axial direction by a connecting portion that has a width narrower than an outer diameter of the first and second connection nozzles when viewed in the axial direction.

* * * * *